US008442919B2

(12) United States Patent
Al-Herz et al.

(10) Patent No.: US 8,442,919 B2
(45) Date of Patent: May 14, 2013

(54) TOKEN BASED NEW DIGITAL CASH PROTOCOLS WITH COMBINED BLIND DIGITAL SIGNATURE AND PSEUDONYM AUTHENTICATION

(75) Inventors: Ahmed Ibrahim Al-Herz, Los Angeles, CA (US); Mohammad K. Ibrahim, Leicester (GB)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 12/967,678

(22) Filed: Dec. 14, 2010

(65) Prior Publication Data

US 2011/0191251 A1      Aug. 4, 2011

Related U.S. Application Data

(62) Division of application No. 11/851,265, filed on Sep. 6, 2007, now Pat. No. 7,877,331.

(51) Int. Cl.
*G06Q 20/00*      (2006.01)
(52) U.S. Cl.
USPC ............. 705/69; 705/64; 705/75; 705/14.23; 705/35; 705/42; 705/70
(58) Field of Classification Search ............... 705/14.23, 705/35, 42, 64, 69, 70, 75
See application file for complete search history.

(56) References Cited

U.S. PATENT DOCUMENTS

| 5,878,140 | A  | * | 3/1999  | Chaum ........................... 705/74 |
| 6,299,062 | B1 | * | 10/2001 | Hwang ......................... 235/379 |
| 2006/0155985 | A1 | * | 7/2006 | Canard et al. ................. 713/156 |
| 2007/0143608 | A1 | * | 6/2007 | Zeng et al. .................... 713/168 |
| 2008/0154782 | A1 | * | 6/2008 | Kang et al. ...................... 705/74 |
| 2008/0307223 | A1 | * | 12/2008 | Brickell et al. ............... 713/158 |
| 2010/0325441 | A1 | * | 12/2010 | Laurie et al. ................. 713/185 |
| 2011/0302412 | A1 | * | 12/2011 | Deng et al. ................... 713/159 |

OTHER PUBLICATIONS

Chaum, David (1983). "Blind signatures for untraceable payments". Advances in Cryptology Proceedings of Crypto 82 (3): 199-203. http://www.hit.bme.hu/~buttyan/courses/BMEVIHIM219/2009/Chaum.BlindSigForPayment.1982.PDF.*
The Authoritative Dictionary of IEEE Standards Terms, 7th Ed., IEEE, Inc., New York, NY, Dec. 2000.*

* cited by examiner

*Primary Examiner* — Calvin Cheung
(74) *Attorney, Agent, or Firm* — Lowe Hauptman Ham & Berner, LLP

(57) ABSTRACT

Digital cash token protocols use a combination of blind digital signatures and pseudonym authentication with at least two pairs of public and private keys. A user is provided with one master pair of private and public keys and as many pseudonym pairs of private and public keys as desired. The resulting digital cash token based hybrid protocols combine the advantages of blind digital signature and pseudonym authentication. Blind digital signatures based on the master pair of keys are used to withdraw digital cash from the user's bank account under the user's real identity. A pseudonym pair of keys is used for converting digital cash into digital cash tokens by a digital cash issuer. All pseudonyms can be used for spending the digital cash tokens. These protocols ensure anonymity when withdrawing digital cash from the user's account under the user's real identity in addition to providing pseudonym authentication when spending digital cash tokens under a pseudonym.

9 Claims, 61 Drawing Sheets

TOKEN BASED NEW DIGITAL CASH PROTOCOLS WITH COMBINED BLIND DIGITAL SIGNATURE AND PSEUDONYM AUTHENTICATION

RELATED APPLICATIONS

This application is a Divisional of co-pending U.S. application Ser. No. 11/851,265, filed Sep. 6, 2007 herein incorporated by reference.

TECHNICAL FIELD

This invention relates to digital cash, and more specifically to digital cash tokens using more than one user public key.

BACKGROUND

In the near future digital cash will come into wider use and it is expected that people will use the Internet to make digital cash payments for their purchases. Electronic transactions should be convenient, reliable, accurate, and resistant to fraud. Certain electronic transactions also should protect the privacy of payees. For example, a customer purchasing a service from a vendor over a network should be able to pay for the service in an electronic transaction without revealing their identity.

Some schemes using on-line banking may prevent double spending by checking each coin against reuse during the time of payment on-line rather than detecting double spending afterwards. However, on-line banking is obviously not suitable for micro-payments of the average consumer. Banks are too few compared with the vast number of small cash transactions that would need to be processed if average consumer transactions were to be supported. Processing on-line requests for such transactions will result in banks becoming serious bottlenecks to handle these transactions.

Blind signature systems that use off-line digital cash techniques have high system complexity. In some other conventional techniques, a coin has a data size that is too big to be economically used since the coin contains a large number of challenge terms to detect cheating. In addition, some techniques also require using complex challenge-response interactions between the payer and payee for each coin spent. Again, such complex schemes are also not suitable for micro payments.

Some systems have implemented digital coins that are both secure (in the bank's interest) and afford a heightened assurance of consumer privacy by providing some anonymity to users with respect to both merchants and banks. Informally, a digital cash scheme is referred to as unconditionally blind or anonymous if the bank that issues a coin is unable to determine, either at the time of withdrawal or later upon examining circulating or deposited coins, which coin was withdrawn by which user. In a unconditionally blind scheme, the user can withdraw money from the bank, spend it at a merchant, and be confident that when the merchant deposits the money at the bank, the bank will not be able to recognize the money as the same cash given to the user.

However, researchers have observed that unconditional anonymity in payment systems might be exploited to facilitate crimes like blackmail. In addition, there is a fear that such schemes of unconditional anonymity may be abused to perfect crimes of money laundering and kidnapping because this system can make the flow of cash completely untraceable. This observation has spurred research into the idea of making anonymity in payment systems conditional, and, in particular, revocable by a third party. This notion is referred to as a trustee-based coin tracing.

One trustee-based tracing scheme is based on a blind Schnorr-like signature scheme that involves use of interactive proofs between trustees and the bank. Another trustee-based tracing scheme is based on blind RSA signatures, but makes use of a cut-and-choose protocol that results in a scheme that is flexible. Although this scheme may be somewhat flexible, it has rather large coin sizes and computational requirements.

According to another scheme that makes use of a blind signature, a user requests a pseudonym and registration information from a trustee. The user presents this registration information to the bank, and incorporates the information into the coins that are withdrawn.

Another scheme makes use of blind DSS signatures. In this scheme, signing and anonymity revocation may be conducted by differing quorums of trustees. However, the scheme is implemented on-line only and is rather computationally intensive for most operations.

A slightly different approach to trustee-based tracing is a system based on blind Schnorr signatures in which a user transfers funds from a non-anonymous to an anonymous account where a trustee is capable of linking the two accounts. The chief disadvantage of this approach is that once the two accounts are linked, anonymity is eliminated.

Another approach is based on blind Schnorr signatures in which the trustee is off-line. This system is complex and involves well over a dozen modular exponentiations by the user at each coin withdrawal. Later developments have reduced the computational required in the withdrawal protocol, as well as the database search requirements in owner tracing. However, the withdrawal protocol still requires over a dozen modular exponentiations on the part of the user.

The use of blinding alone that protects the anonymity of the customer is not sufficient to safeguard against certain types of fraud. For example, a customer can submit a blinded nonce (a nonce is a piece of data that, for practical purposes, is used only once, for example, a random number) to the certification authority along with $20, receive the blinded certificate, un-blind it, and then submit the un-blinded certificate as being worth $100. This is possible because the certification authority never really sees the actual certificate it is signing because of the blinding factor. Thus, although blinding alone protects privacy, it does not by itself provide adequate reliability against fraud and misuse.

Another problem of blind signature it is a homomorphism, i.e., $\text{Sign}(kx)=\text{Sign}(k)\text{Sign}(x)$. It is possible to create pairs r, $\text{Sign}(r)$ for a random message r. More precisely, anyone can choose $\text{Sign}(r)$ at random and then compute r as the function $\text{Sign}-1$ which is known publicly. The basic idea is as follows. Customer C chooses a message x which is going to be the coin. C also generates a pair, k and $\text{Sign}(k)$, for a random number k. C sends the product kx to a bank B which computes $\text{Sign}(kx)$. B then sends $\text{Sign}(kx)$ to C, using, for instance, a public encryption scheme provided by C (using some session key exchanged between C and B using a Diffie-Hellman session) or some other form of communication (e.g., delivery on a diskette transported by an armored carrier). C may then compute $\text{Sign}(x)$ by dividing $\text{Sign}(kx)$ by $\text{Sign}(k)$. The pair $(x, \text{Sign}(x))$ is now redeemable by B at a value usually determined by the signature being used, and B cannot recognize C when some payee P presents $(x, \text{Sign}(x))$ (since the knowledge of kx does not allow practical recognition of x nor of $\text{Sign}(x)$).

A problem with this approach is that a signature scheme with such properties is not secure. This scheme provides that (1) it is easy to forge signatures on random messages, and (2) after seeing the signatures on two messages x1 and x2, it is easy to compute the signature on the message x=x1x2. In order to overcome this problem, valid messages are required to have a special "structure" (e.g., the message x must be encoded using the PKCS#1 standard for digital signature). The hope is that messages with this structure are sparse and hard to forge even given properties (1) and (2) (since messages with that structure will not appear with a significant probability). However, this is simply a hope and is not a proven mathematical property of the signature scheme or of the encoding. The drawback is that it may be possible to discover an algorithm to forge messages even when we restrict them to this structured sparse set.

Schemes that use virtual accounts have several problems. For example, some virtual accounts do not provide adequate privacy of the user, while others are complex requiring a blind signature to protect the privacy of the user. Still other embodiments have the bank storing encrypted pseudonym corresponding to the user identification which makes linking identity to the pseudonym easy either by cooperation or leakage of the secret key of the issuer. Accordingly, the privacy of all users can be catastrophically destroyed. In addition, there is a problem of proving the ownership of the user identity between the user and the bank.

SUMMARY

In one general aspect, a method of providing digital cash tokens includes: providing a user with at least two pairs of keys including a master pair having a private and a public key and at least a pseudonym pair having a private and public key; blinding digital signatures based on the master pair of keys for withdrawal of digital cash from a bank account of the user associated with a real identity of the user; issuing digital cash into digital cash tokens from a digital cash issuer using the pseudonym pair or keys; and spending the digital cash tokens using the pseudonym pair of keys. Encrypting the information may include encrypting a digital cash amount and a random number both signed by the secret key of the issuer of digital tokens. A user identification may be associated with a certified master public key in the bank account to authenticate a user.

A license from a certificate authority may be issued for the pseudonym public key in response to a request that is signed by the master secret key of the user. The identity of the pseudonym public key may be revealed by the certificate authority when there is misuse of the digital cash token or fraud. The issuer of digital cash tokens may register the user known under one or more pseudonyms; issue a digital cash token to the registered user; and store information related to the issued digital cash token. A pseudonym may not be associated with the digital cash token.

A certificate authority may certify the pseudonym public key of the user given a master public key and identification of the user.

The user may have one pair of master keys and a plurality of pairs of pseudonym keys where each pubic key is certified by a certifying authority using separate certificates.

In another general aspect, a method is provided for implementing digital cash tokens for a user having two pairs of user keys, one pair linked to the real identity of the user including a master public key and a master secret key, and a second pair linked to the pseudonym identity of the user including a pseudonym public key and a pseudonym secret key. The method includes: registering, by the user, the master public key and pseudonym public key with a certificate authority; obtaining separate certificates for both keys that are signed by the certificate authority; sending the pseudonym public key and its certificate to an issuer of digital cash tokens for registration of a user; issuing, by the issuer of digital cash tokens, one or more digital cash tokens associated with the pseudonym identity; and sending to the user a pseudonym public key certificate that is signed by a private key of the issuer of digital tokens and encrypted with the pseudonym public key. The user may transfer the issued digital cash token to another user that has a certified pseudonym public key.

An account of the user at a bank may be decremented corresponding to a requested amount of money. A public key cryptography and a blind digital signature protocol may be used to obtain a blinded digital cash voucher from the bank corresponding to the requested amount of money. The digital cash voucher may be sent to the digital cash issuer together under the registered pseudonym pair of keys. The issuer of digital cash tokens may authenticate the digital cash voucher with the bank, where the one or more issued digital cash tokens correspond to the amount of the voucher.

The method may further include encrypting using pseudonym public key by the issuer of digital cash tokens information about the user's digital cash tokens under the user's pseudonym public key; and sending, by the issuer of digital cash virtual tokens, the information to the user together with a digital signature of the information using the public key of the issuer of digital tokens. In one example, encrypting the information includes encrypting a digital cash amount and a random number both signed by the secret key of the issuer of digital tokens. The user may decrypted the information about the digital cash tokens using the pseudonym private key; and the digital cash tokens may be authenticated using the public key of the issuer of digital cash tokens.

At the time of payment a request for payment may be sent to the shop including the one or more digital cash tokens and a certified user pseudonym public key, both encrypted with a public key of the shop. In one example, the certified user pseudonym public key is not associated with the digital cash token. The user may transfer the issued digital cash token to another user that has a certified pseudonym public key.

The method may further include: verifying the validity of a digital cash token using the public key of the issuer of digital cash tokens; sending a challenge to the user; signing, by the user, the challenge using the pseudonym private key; sending the signed challenged to the shop; sending, by the shop, the digital cash token, the certified user pseudonym public key, and the challenge to the issuer of digital cash tokens for verification; and sending, by the issuer of digital cash tokens, the shop id and the amount to a bank of the shop for settlement.

Other features will be apparent from the description, the drawings, and the claims.

DESCRIPTION OF DRAWINGS

Like reference symbols in the various drawings indicate like elements.

DETAILED DESCRIPTION

Overview

Figure 1:
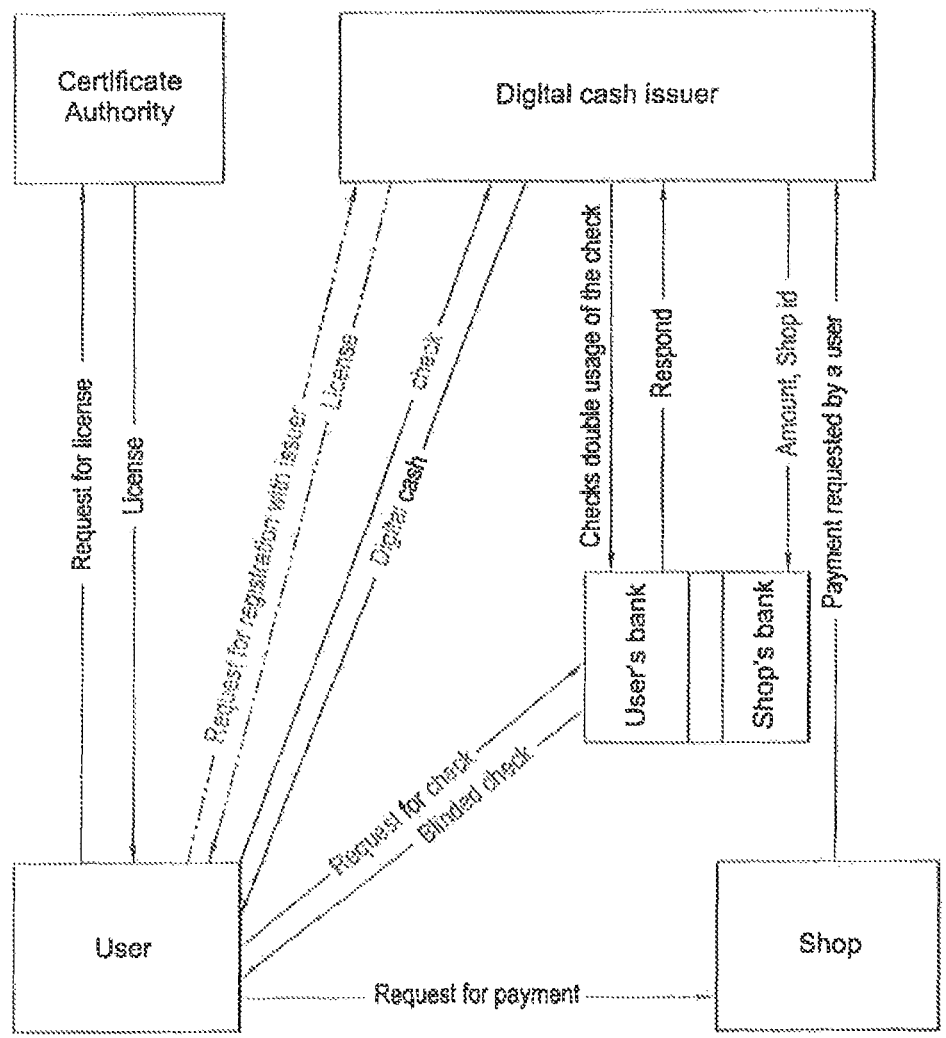
FIG. 1 is an exemplary system diagram for implementing the digital cash token protocol.

Digital cash token protocols are described below that use a combination of blind digital signatures and pseudonym authentication with at least two pairs of public and private keys. A user is provided with one master pair of private and public keys and as many pseudonym pairs of private and public keys as desired.

The resulting digital cash token hybrid protocols combine the advantages of blind digital signature and pseudonym authentication. Blind digital signatures based on the master pair of keys are used to withdraw digital cash from the user's bank account under the user's real identity. A pseudonym pair of keys is used for converting digital cash into digital tokens by a digital cash issuer. All pseudonyms can be used for spending the digital cash tokens. These protocols combine the advantage of ensuring anonymity when withdrawing digital cash from the user's account under the user's real identity in addition to providing the efficiency of pseudonym authentication when spending digital cash tokens under a pseudonym.

The disclosed protocols utilize the following entities: (i) a certificate authority, (ii) a user's bank, (iii) issuers of digital cash, and (iv) a shop and its bank. The certificate authority stores a pseudonym public key in connection with a user id and/or a master public key. The certificate authority also issues a license for the pseudonym public key in response to a request that is signed by the master secret key of the user. The certificate authority reveals the identity of the owner of a pseudonym public key only if there is misuse of digital cash tokens or fraud.

The user's bank stores the user's account in connection with the user identification and the certified user's maser public key (which may be used to authenticate a user).

The issuer of digital cash stores each registered user known under one or more pseudonyms, issues digital cash tokens, and stores information related to the issued digital cash tokens. The type of stored information about a digital cash tokens differs depending on whether traceable or untraceable digital cash tokens are being issued, as described below.

Most of the conventional digital cash protocols use either blind digital signatures or pseudonym based authentication. Digital cash protocols based on blind signatures suffer from low efficiency and high overhead associated with authentication, and digital cash protocols based on pseudonym authentication do not provide suitable user privacy.

The digital cash token implementations described below provide strong protection of user's privacy, an authenticated protocol, traceability, and efficiency of computation. The disclosed protocols provide strong protection of privacy for the user by separating withdrawal of digital cash from the bank accounts of the user (which are associated with the real identity of the user) from the depositing and expenditure of digital cash tokens. There is no link between the information about the digital cash withdrawn using the master pair of keys of the user and the digital cash tokens spent under the pseudonyms of the user. In addition, there is no link between the different pseudonyms of the same user. Therefore, there is no link between the real identity of the user and the user's pseudonyms, or between the different pseudonyms of the same user. The only exception is the certificate authority which certifies a pseudonym public key of a user given a user's master public key and id.

Blind digital signatures using the user's pair of master keys provides authentication of the user with an entity that holds information that is linked to the user's real identity, such as a bank. There is nothing to link the information about the user between the user's bank and an issuer of digital cash. The bank stores the user id, the amount of money, and the user's master pubic key in association with the user account information. The issuer of digital cash stores the user's pseudonym public key and the digital cash in the form of tokens that are issued to a user. The separation makes it very difficult to link the real identity of the user with the user's pseudonym pubic key. Furthermore, any leak of the secret key of the bank or an issuer of digital cash token is useless to break the privacy of the user. Since the user's master public key is not linked to digital cash tokens and is not used for payments, the user's privacy is maintained.

The user has one pair of master keys and may have many pairs of pseudonym keys. Each pubic key is certified by a certifying authority using separate certificates. Blind digital signatures with master keys are used to authenticate the user with the bank. Digital signatures with a pair of pseudonym keys are used to authenticate a user with an issuer of digital cash and shops. Since all transactions are authenticated using digital signatures, this prevents anyone from pretending to be someone else by providing information related to the real user.

Traceability may be ensured since all transactions are made with certified public keys, a certifying authority can link the master public key with a pseudonym public key, and keeping records of digital cash tokens issued to/spent by a user's pseudonym public key. Since a pseudonym pair of keys is used to authenticate a user during the spending of the digital cash tokens, the high overhead associated with conventional blind digital signatures is avoided.

As shown in FIG. 1, a system for implementing the protocols includes a number of entities, such as, for example, a user, a certificate authority, a digital cash issuer, a user bank, a shop bank, and a shop.

Each of these entities may send and receive data via any number of communications paths. Each entity may include one or more processing devices, such as, for example, a general or special-purpose computer, such as a processor, a microprocessor, a microcomputer, a personal computer ("PC"), a workstation, a mainframe, a server, a laptop, a mobile communications device/phone, a personal digital assistant ("PDA"), an on-board (i.e., vehicle-mounted) computer, or a combination of two or more of these devices capable of responding to, generating, and/or executing instructions in a defined manner. The processing device may include or be associated with any number of other devices, components, and/or peripherals, such as additional computing devices, memory/storage devices, input devices, output devices, user interfaces, and/or communications interfaces.

Each entity also may include one or more software applications including, for example, encryption decryption software, signature generating software, key generating software, random number generating software, signature verification software, in addition to other system and operating system software loaded to command and direct the processing device. Software applications may be implemented as a computer program, a piece of code, an instruction, or some combination thereof, for independently or collectively instructing the processing device to interact and operate as desired.

The applications may be embodied permanently or temporarily in any type of machine, component, physical or virtual equipment, storage medium, or propagated signal wave capable of providing instructions to the processing device. In particular, the applications may be stored on a storage medium or device including volatile and non-volatile (e.g., a read only memory (ROM), a random access memory (RAM), a flash memory, a floppy disk, a hard disk, a tape, a DROM, a flip-flop, a register, an SRAM, DRAM, PROM, EPROM, OPTROM, EEPROM, NOVRAM, or RAMBUS), such that if the storage medium or device is read by the processing device, the specified steps, processes, and/or instructions are performed.

The processing device also may include one or more communications interfaces that allow the processing device to send and receive information using the communications paths. The communications paths may be configured to send and receive signals (e.g., electrical, electromagnetic, or optical) that convey or carry data streams representing various types of analog and/or digital data. For example, the communications paths may be implemented using various communications media and one or more networks comprising one or more network devices (e.g., servers, routers, switches, hubs, repeaters, and storage devices). The one or more networks may include a local area network (LAN), a wide area network (WAN), a plain old telephone service (POTS) network, a digital subscriber line (DSL) network, an integrated services digital network (ISDN), a synchronous optical network (SONNET), or a combination of two or more of these networks. In addition, the communications paths may include one or more wireless links (e.g., cellular, mobile, GSM, CDMA, TDMA, and satellite) that transmit and receive electromagnetic signals, such as, for example, radio, infrared, and microwave signals, to convey information. Because the communications paths may cover any number of networks and media, generally, they are considered unsecured.

The user may be any entity (person, group, business, government and/or organization) that requires the issuance of digital cash for use a payment to a shop. The certificate authority comprises a storage device, a signature verifying program, an encryption program, a decryption program, and a signature generating program. The user may include a processing device, a storage device, an encryption program, a decryption program, a signature verifying program and a key generating program and a signature generating program.

The digital cash issuer provides digital currency or digital cash tokens for use by the user as payment to a shop. The issuer may include a processing device, a storage device, an encryption program, a decryption program, a signature generating program, a signature verifying program, and a random number generating program.

The user's bank may include a processing device, a storage device, a signature verifying program encryption program, a decryption program, and a signature generating program.

The shop may include a processing device, a storage device, a signature verifying program encryption program, a decryption program, a signature generating program, a random number generating program and a time generating program.

Each of the exemplary embodiments having traceability, described in detail below include at least three primary procedures: a user registration procedure; a withdrawal procedure (e.g., an electronic cash issuing procedure); and a payment procedure. The non-traceable embodiment includes two primary procedures: of a withdrawal procedure and a payment procedure.

In the following description PKy denotes the public key of the entity y, Sky denotes the private key of the entity y, mPKy and mSKy denotes the master public and private key of entity y respectively, pPKy and pSKy denotes the pseudonym public and private key of entity y respectively, PKy(.) indicates that the quantity between parenthesis is encrypted using the public key of entity y, Sky(.) indicates that the quantity between parenthesis is encrypted using the private key of entity y, and $[.]_{SKy}$ indicates that the quantity between square brackets is signed by the private key of entity y. The user public key PKC is known to all entities. The master public key mPKU is known to all entities. The issuer public key PKI is known to all entities. The bank's public key PKB are known to all entities. The shop public key PKS is known to all entities.

First Embodiment (1) User Registration Procedure

Figure 2:
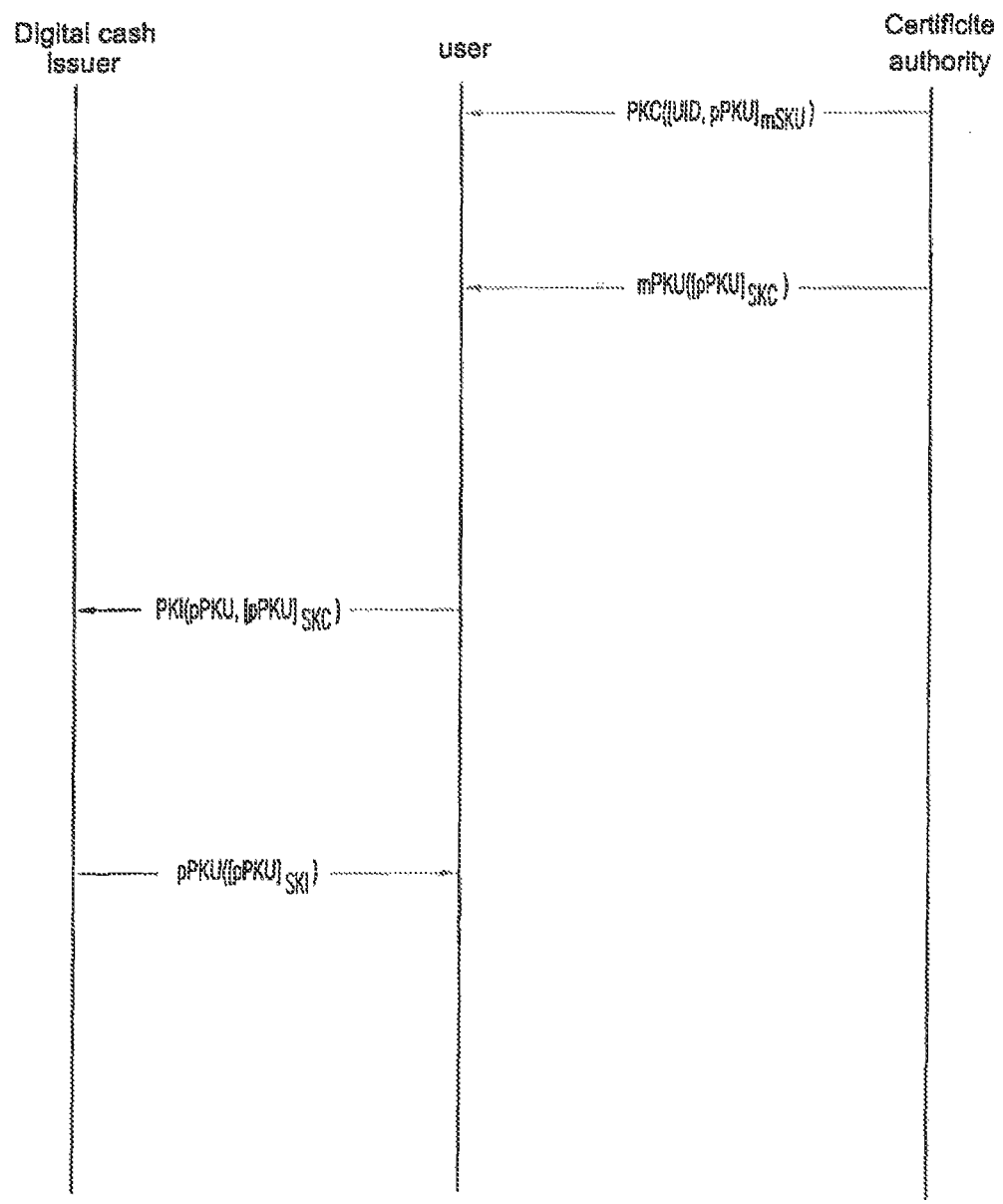
FIG. 2 is an exemplary user registration protocol according to the first embodiment.
Figure 3:
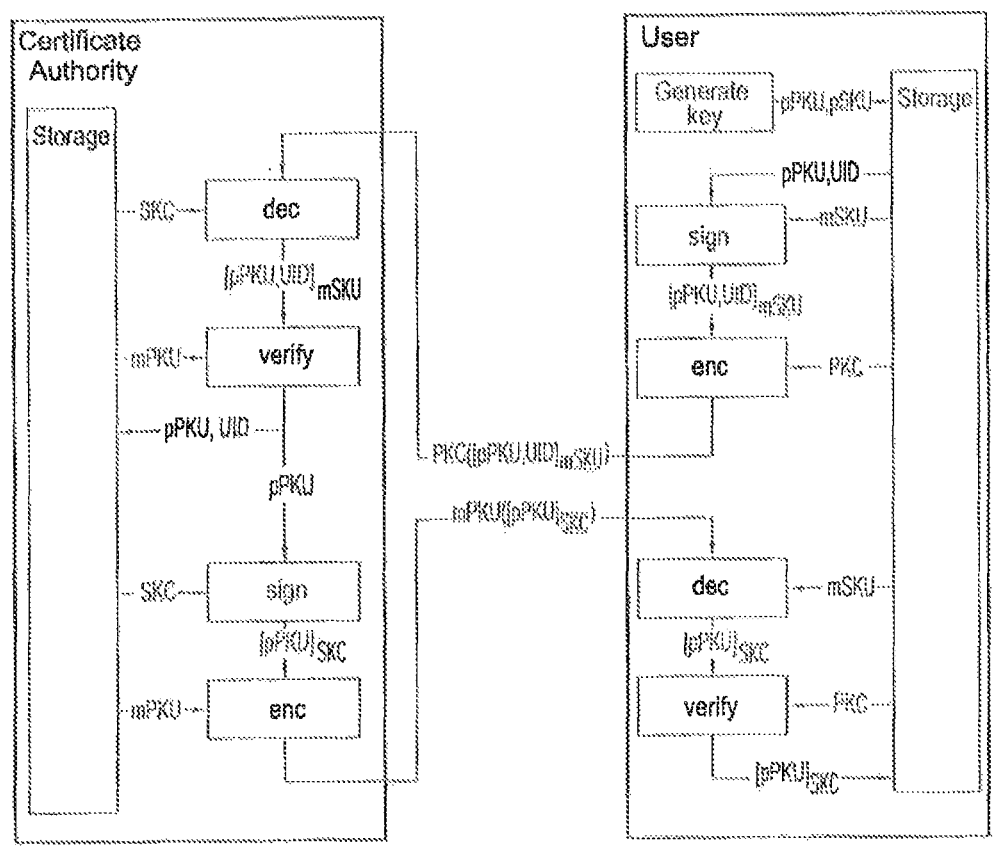
FIG. 3 is an exemplary user registration process part 1 according to the first embodiment.
Figure 4:
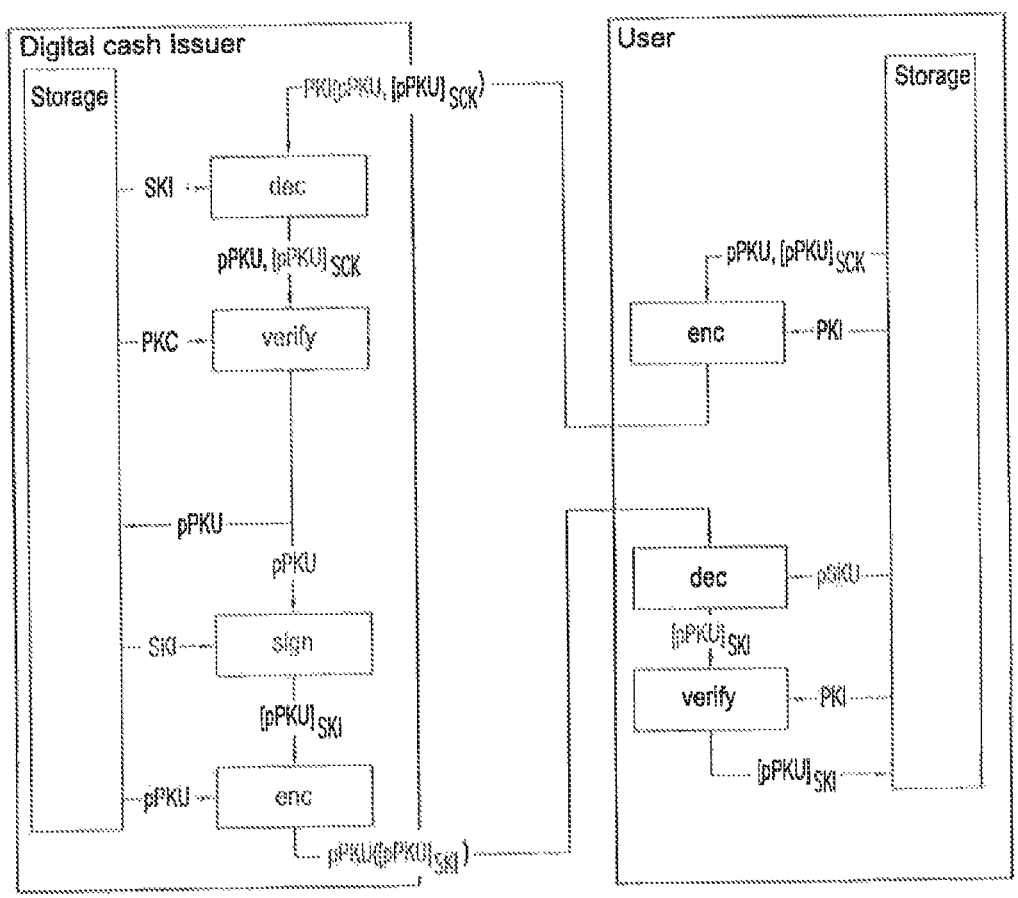
FIG. 4 is an exemplary user registration process part 2 according to the first embodiment.

FIGS. 2, 3, and 4 show the diagrammatic representation of the registration protocol. Referring to FIG. 3, the user key generating program generates a pseudonym public key and a pseudonym secret key. The signature generating program then signs the pseudonym public key and the user real identification using the user's master secret key. The encryption program encrypts $[UID,pPKU]_{mSKU}$ using the public key of the certificate authority and sends $PKC([UID,pPKU]_{mSKU})$ to the certificate authority via a communications path as a request for a certified pseudonym public key (i.e., a request for the issuance of a license).

The certificate authority receives the request $(PKC([UID, pPKU]_{mSKU}))$ and the decryption program decrypts request using the secret key SKC of the certificate authority. The signature verifying program verifies the validity of the user signature using the user's master public key mPKU. If the signature is valid, the certificate authority signature generating program generates a signature (license) $[pPKU]_{SKC}$ for the user's pseudonym public key using the certificate authority's secret key SKC, and stores the user's pseudonym public key in the storage device in connection with the user's master public key mPKU and the user's real identification UID. The certificate authority encryption program encrypts the license $[pPKU]_{SKC}$ using the user's master public key mPKU and sends the license $mPKU([pPKU]_{SKC})$ to the user via a communications path.

The user receives the encrypted license $mPKU([pPKU]_{SKC})$ and the decryption program decrypts the license using the user's master secret key mSKU. The signature verifying program verifies the validity of the license $[pPKU]_{SKC}$ using the public key PKC of the certificate authority. If the license is valid, the license is stored in the storage device.

Referring to FIG. 4, the user encryption program encrypts the license $[pPKU]_{SKC}$, pseudonym public key pPKU using the public key PKI of the digital cash issuer and sends the encrypted license $PKI([pPKU]_{SKC},pPKU)$ to the digital cash issuer via a communications path as a request for registration in the digital cash issuer and for the digital cash issuer license.

The digital cash issuer receives the request $PKI([pPKU]_{SKC},pPKU)$ and the decryption program decrypts the information using the secret key SKI of the digital cash issuer. The digital cash issuer searches for pPKU in its storage to prevent the use of another user's pseudonym public key. If the user's pseudonym public key pPKU is not registered, the digital cash issuer signature verifying program verifies the validity of the license $[pPKU]_{SKC}$ the using the certificate authority's public key PKC. If the license is valid, the digital cash issuer assigns a storage space to the user and stores the user's pseudonym public key pPKU. The digital cash issuer signature generating program signs the user's pseudonym public key pPKU the using the secret key of the digital cash issuer SKI. The encryption program encrypts the information using the user's pseudonym public key pPKU and sends $pPKU([pPKU]_{SKI})$ as a license to the user via a communications path.

The user receives $pPKU([pPKU]_{SKI})$, and the decryption program decrypts the license using the user's pseudonym secret key pSKU. The signature verifying program verifies the validity of the digital cash issuer signature using the digital cash issuer's public key PKI. If the signature is valid, the license $[pPKU]_{SKI}$ is stored in the storage device. The user may obtain additional certified pseudonym public keys without a limit.

(2) Withdrawal Procedure (i.e., the Electronic Cash Issuing Procedure)

Figure 5:
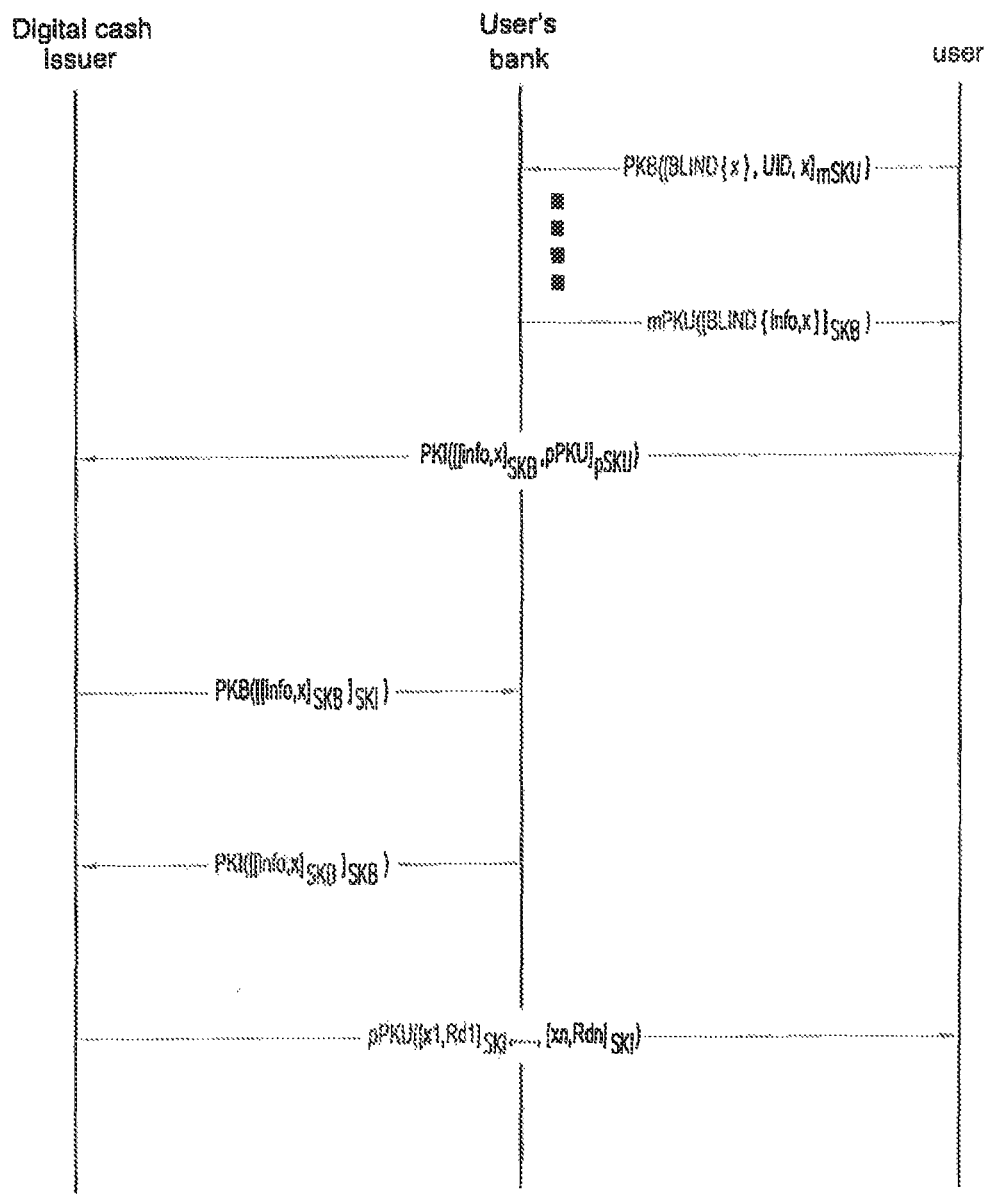
FIG. 5 is an exemplary withdrawal protocol according to the first embodiment.
Figure 6:
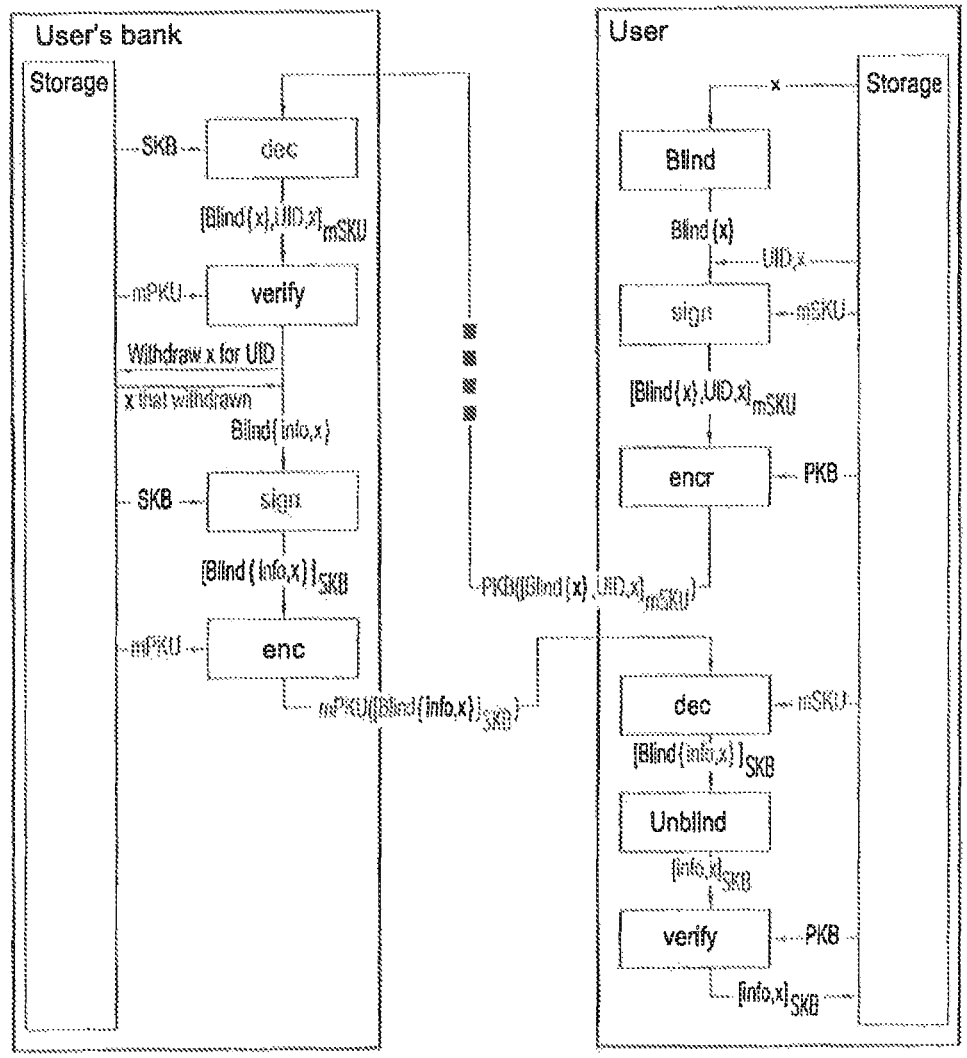
FIG. 6 is an exemplary withdrawal process part 1 according to the first embodiment.

FIGS. 5-9 show the diagrammatic representation of the withdrawal protocol. Referring to FIGS. 5 and 6, the user blinds the amount of digital cash x using any proposed blinding signature scheme, and the signature generating program signs the blinded amount of digital cash Blind {x}, the user real identification UID, and the amount of money to be withdrawn x using the user's master secret key mSKU. The encryption program encrypts the information by using the public key of the user's bank PKB and sends $PKB([Blind\{x\}, UID,x]_{mSKU})$ to the user's bank via a communications path.

The user's bank decryption program decrypts $PKB([Blind\{x\},UID,x]_{mSKU})$ using the user's bank's secret key SKB, and the signature verifying program verifies the validity of the signature for authentication using the master public key of the user mPKU. If the signature is valid, the amount of money x is withdrawn from the user account. The signature generating program signs the blinded information and the amount of digital cash amount Blind(info,x), which may be created through cooperation between the user's bank and the user using any proposed blind signature scheme, using the bank's secret key SKB. The encryption program encrypts [Blind{info,x}]$_{SKB}$ using the master public key of the user mPKU and sends mPKU([BLIND{info,x}]$_{SKB}$) to the user via a communications path.

The user receives mPKU([BLIND{info,x}]$_{SKB}$), and the decryption program decrypts the information using the user's master secret key mSKU. The blind signature scheme unblinds the signed blinded information and the amount of digital cash. The user signature verifying program verifies the validity of the bank's signature using the public key of the user's bank PKB. If the signature is valid, the user stores the signed information and the amount of digital cash [info,x]$_{SKB}$ as a check in the storage device.

Figure 7:
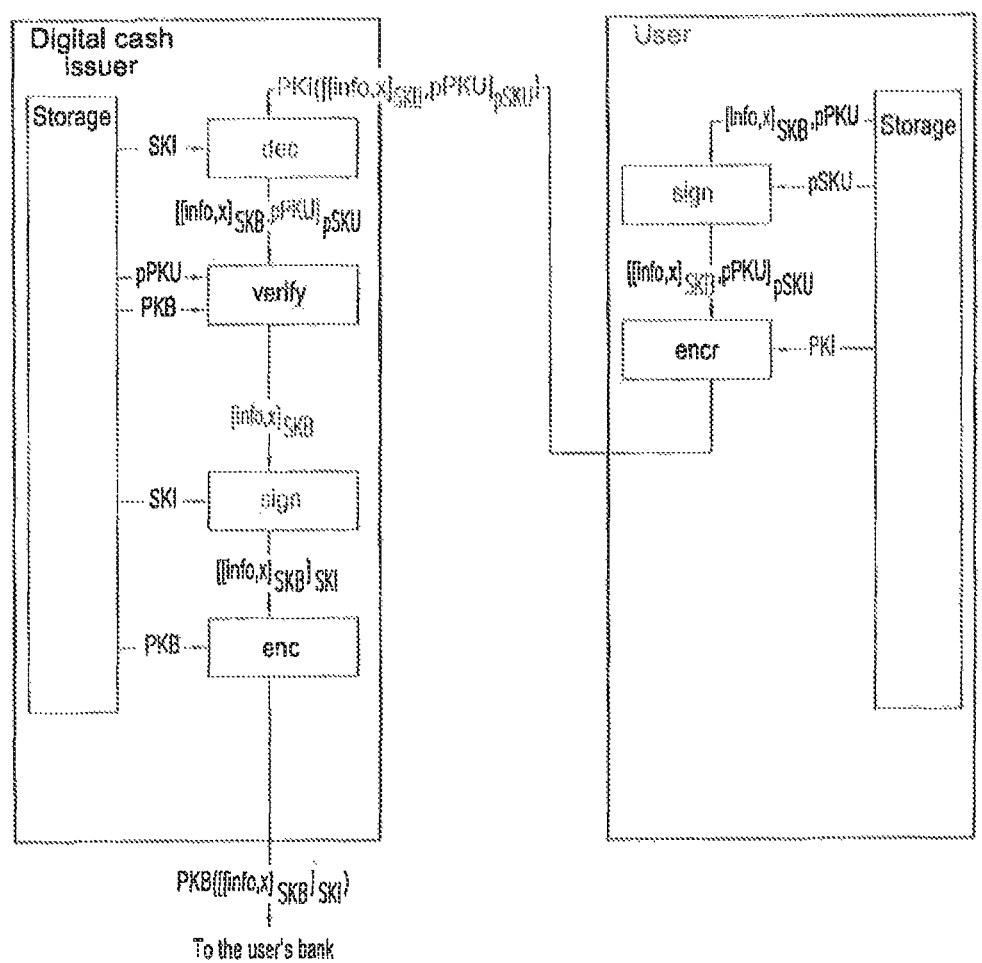
FIG. 7 is an exemplary withdrawal process part 2 according to the first embodiment.

Referring to FIG. 7, the user signature generating program signs the check [info,x]$_{SKB}$ and the user's pseudonym public key pPKU using the user's pseudonym secret key pSKU. The encryption program encrypts [[info,x]$_{SKB}$,pPKU]$_{pSKU}$ using the digital cash issuer's public key PKI and sends PKI ([[info,x]$_{SKB}$,pPKU]$_{pSKU}$) to the digital cash issuer.

The digital cash issuer receives PKI([[info,x]$_{SKB}$, pPKU]$_{pSKU}$), and the decryption program decrypts the information using the digital cash issuer's secret key SKI. The signature verifying program verifies the signature of the user, for authentication, using the user's pseudonym public key pPKU. If the signature is valid, the digital cash issuer signature generating program verifies the signature of the bank [info,x]$_{SKB}$ using the public key of the user's bank PKB. If the signature is valid, the digital cash issuer signature generating program signs the check [info,x]$_{SKB}$ using the digital cash issuer's secret key SKI. The encryption program encrypts [[info,x]$_{SKB}$]$_{SKI}$ using the public key of the user's bank PKB and sends [[info,x]$_{SKB}$]$_{SKI}$) to the user's bank via a communications path.

Figure 8:
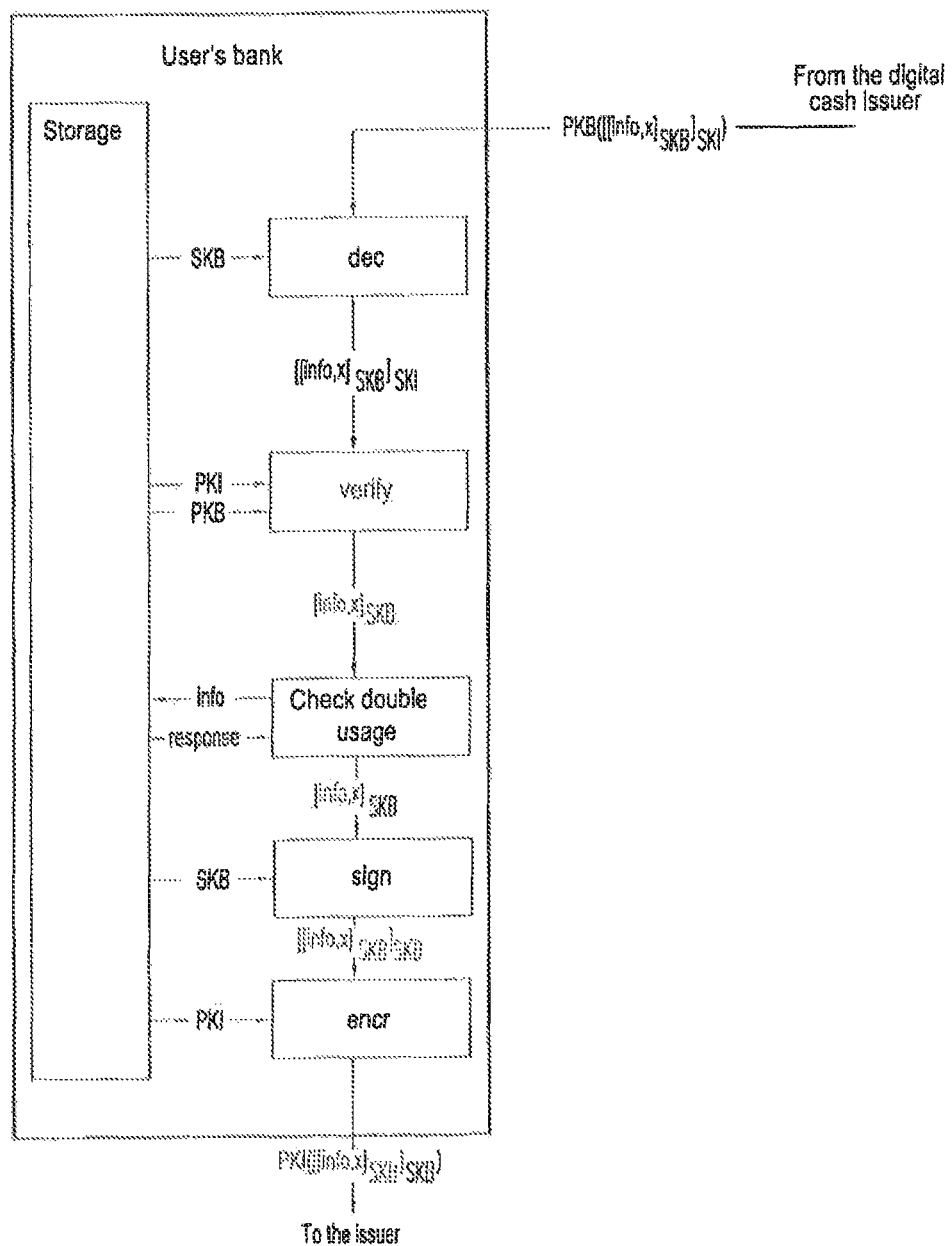
FIG. 8 is an exemplary withdrawal process part 3 according to the first embodiment.

Referring to FIG. 8, the user's bank receives PKB [[info,x]$_{SKB}$]$_{SKI}$), and the decryption program decrypts the information using the secret key of the user's bank. The signature verifying program verifies the signature of the digital cash issuer signature using the digital cash issuer's public key PKI. If the signature is valid, the signature verifying program verifies the signature of the user's bank using the public key of the user's bank. If the signature is valid, the bank determines whether the check [info,x]$_{SKB}$ was used. If the check was not used, the user's bank stores the check in the storage device, and the signature generating program signs the check [info,x]$_{SKB}$ using the secret key of the user's bank SKB. The encryption program encrypts [[info,x]$_{SKB}$]$_{SKI}$ using the digital cash issuer's public key PKI and sends PKI([[info,x]$_{SKB}$]$_{SKI}$) to the digital cash issuer via a communications path.

Figure 9:
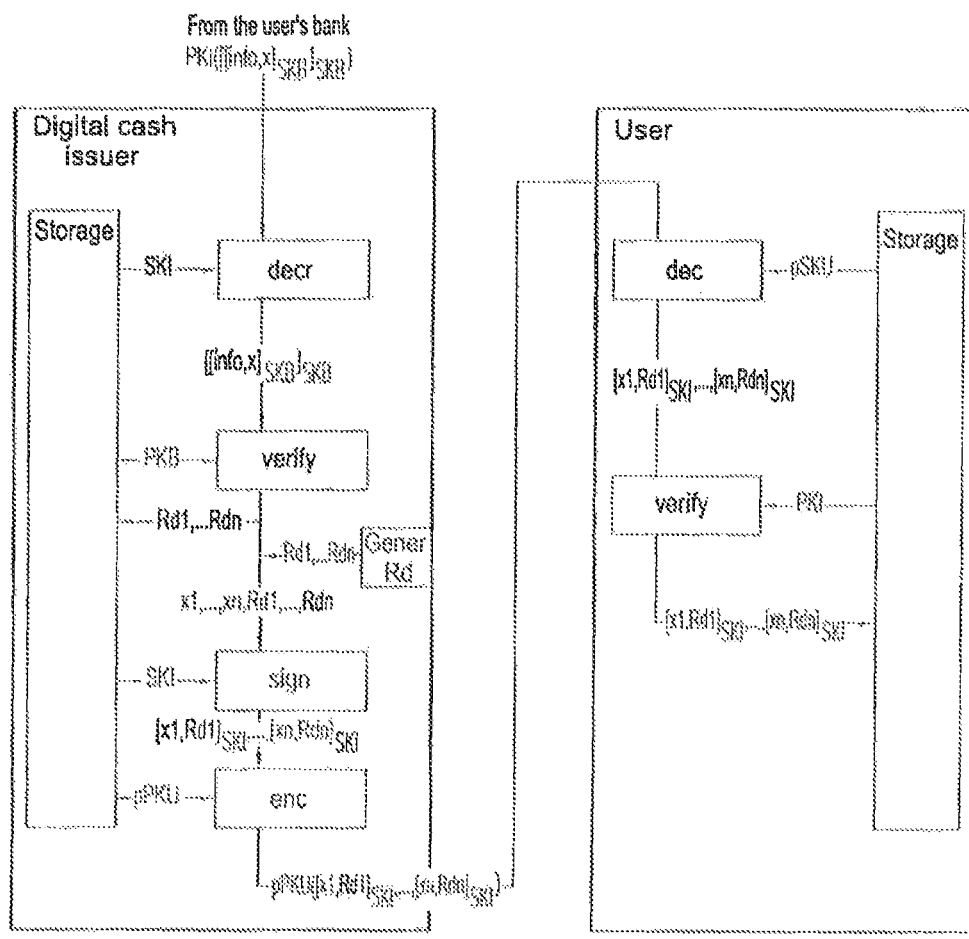
FIG. 9 is an exemplary withdrawal process part 4 according to the first embodiment.

Referring to FIG. 9, the digital cash issuer receives the encrypted information PKI([[info,x]SKB]SKB), and the decryption program decrypts the information by using the digital cash issuer's secret key SKI. The signature verifying program verifies the signature of encrypted information and the check with the user's bank secret key. If the signatures are valid, the digital cash issuer divides the amount of digital cash x to several digital cash tokens. Each digital cash token includes the following information: (i) digital cash amount, and (ii) random number. The digital cash issuer generates random numbers Rd1, . . . , Rdn and stores them in its storage device. The signature generating program signs the digital cash amounts x1, . . . , xn, and random numbers Rd1, . . . , Rdn using the digital cash issuer's secret key SKI. The encryption program encrypts the signed digital cash tokens using the user's pseudonym public key pPKU, and sends the encrypted digital cash tokens pPKU([x1,Rd1]SKI, . . . , [xn,Rdn]SKI) to the user via a communications path.

The user receives the encrypted digital cash tokens pPKU ([x1,Rd1]SKI, . . . , [xn,Rdn]SKI), and the decryption program decrypts the digital cash tokens using the user's pseudonym secret key. The signature verifying program verifies the validity of the digital cash issuer signatures using the digital cash issuer's public key PKI. If the signatures are valid, the digital cash tokens [x1,Rd1]SKI, . . . , [xn,Rdn]SKI are stored in the storage device of the user. According to this embodiment, the user may easily transfer the issued digital cash tokens to another user who has a certified pseudonym public key.

(3) Payment Procedure

Figure 10:
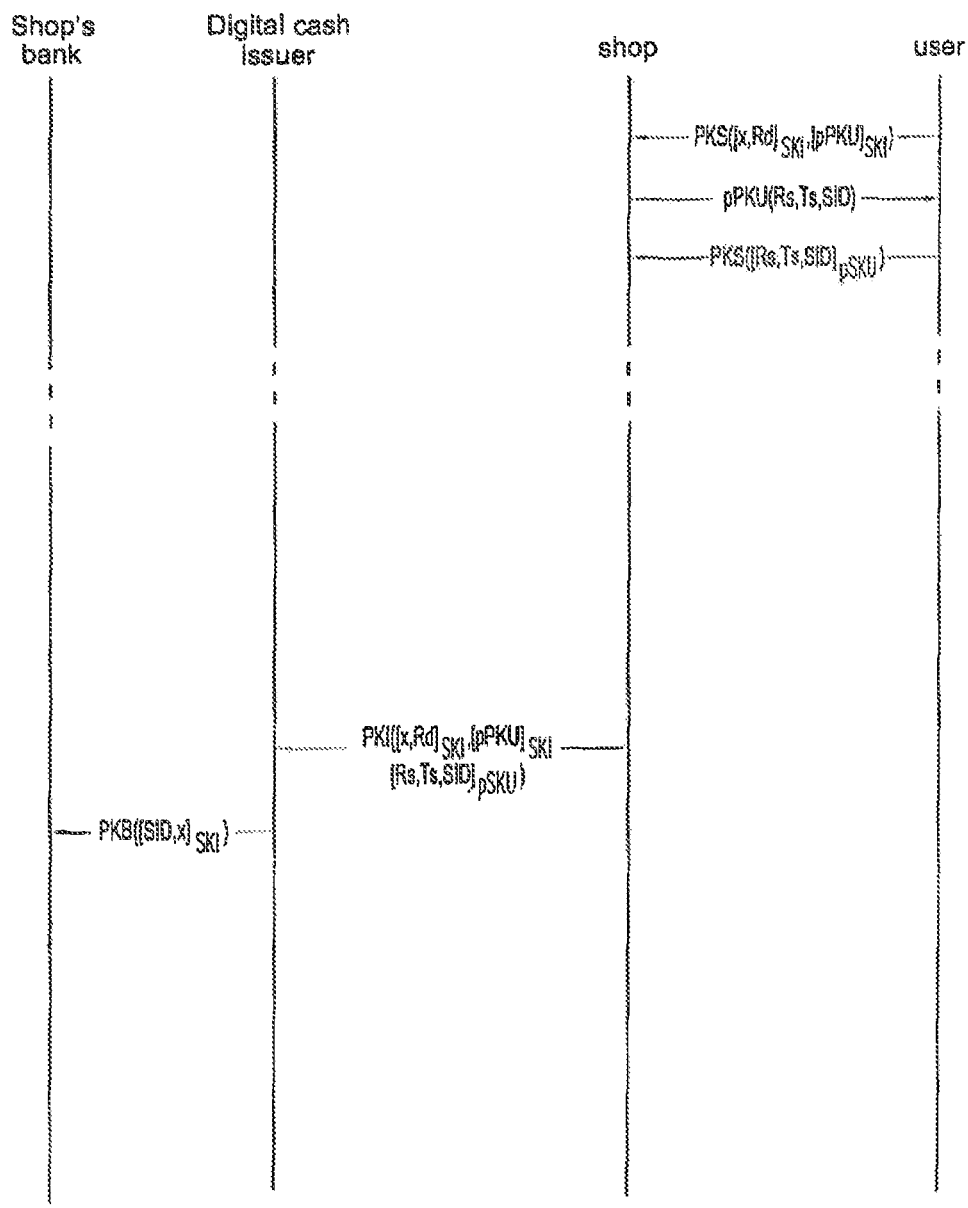
FIG. 10 is an exemplary payment protocol according to the first embodiment.
Figure 11:
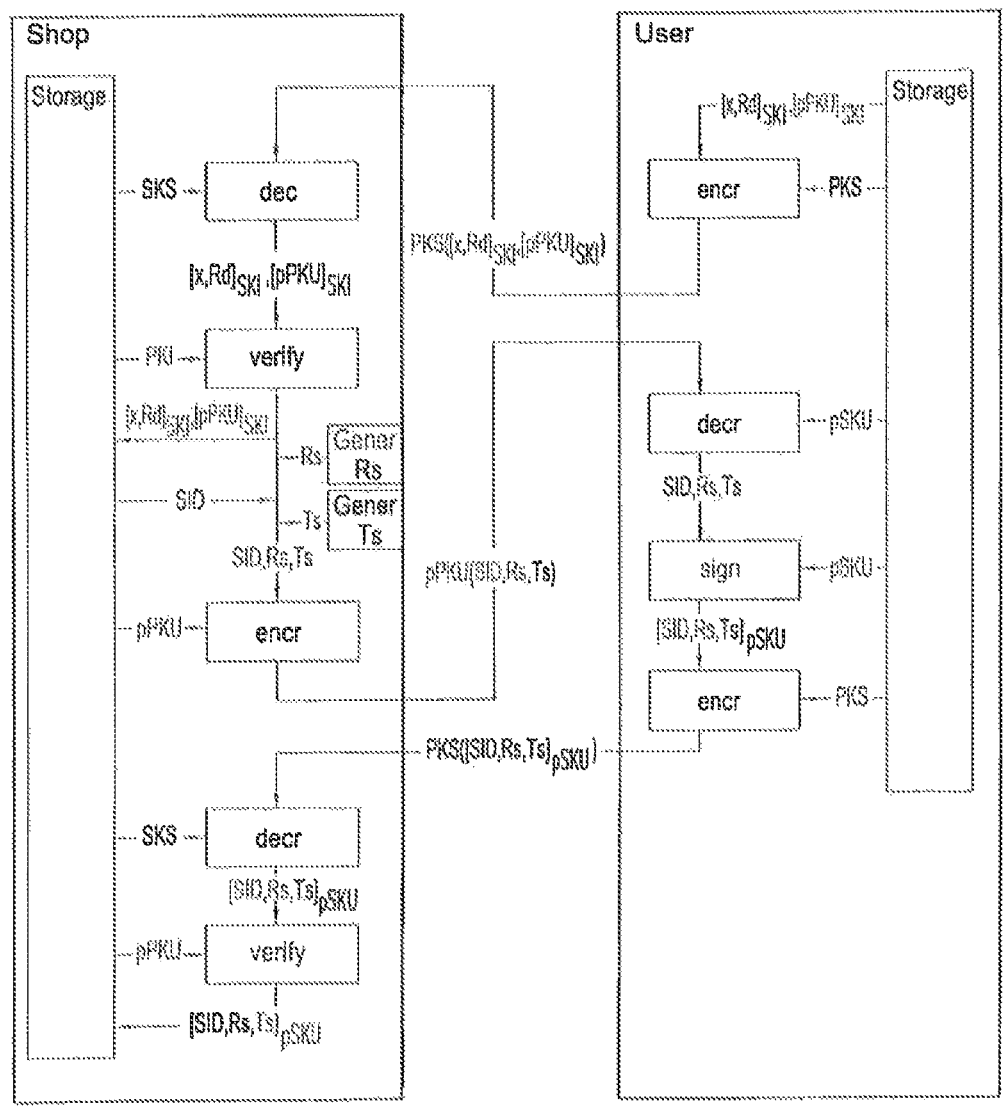
FIG. 11 is an exemplary payment process part 1 according to the first embodiment.

FIGS. 10-13 show the diagrammatic representation of the payment protocol. Referring to FIGS. 10 and 11, the user encryption program encrypts the digital cash token [x,Rd] SKI and the digital cash issuer license [pPKU]SKI using the public key of the shop PKS, and sends the encrypted information to the shop as request for payment. The user can send a payment request using another certified pseudonym public key, because the pseudonym is not associated with digital cash token. As a result, the pseudonym may be changed at the time of payment thereby increasing user flexibility.

The shop decryption program decrypts the encrypted digital cash token and the digital cash issuer license PKS([x,Rd] SKI, [pPKU]SKI) using the shop's secret key SKS. The signature verifying program verifies the signature of the issuer using the digital cash issuer public key PKI. If the signatures are valid, the shop stores the user's digital cash issuer license and the digital cash token. The random number generating program generates a random number Rs, and the time generating program generates a time Ts. The encryption program encrypts Rs, Ts, and the shop identification SID using the user's pseudonym public key pPKU, and sends the encrypted information pPKU(Rs,Ts,SID) to the user via a communications path.

The user receives the encrypted information pPKU(Rs,Ts, SID). The decryption program decrypts the information using the user's pseudonym secret key pSKU. The signature generating program signs the random number Rs, the time Ts, and the shop identification SID using the user's pseudonym secret key pSKU. The encryption program encrypts the information using the public key of the shop PKS, and sends the encrypted information PKS([Rs,Ts,SID]pSKU) to the shop via a communications path.

The shop receives the information PKS([Rs,Ts,SID] pSKU), and the decryption program decrypts the information using the shop's secret key SKS. The signature verifying program verifies the signature using the user's pseudonym public key pPKU. If the signature is valid, the shop stores the challenge and regards the payment as valid.

Figure 12:
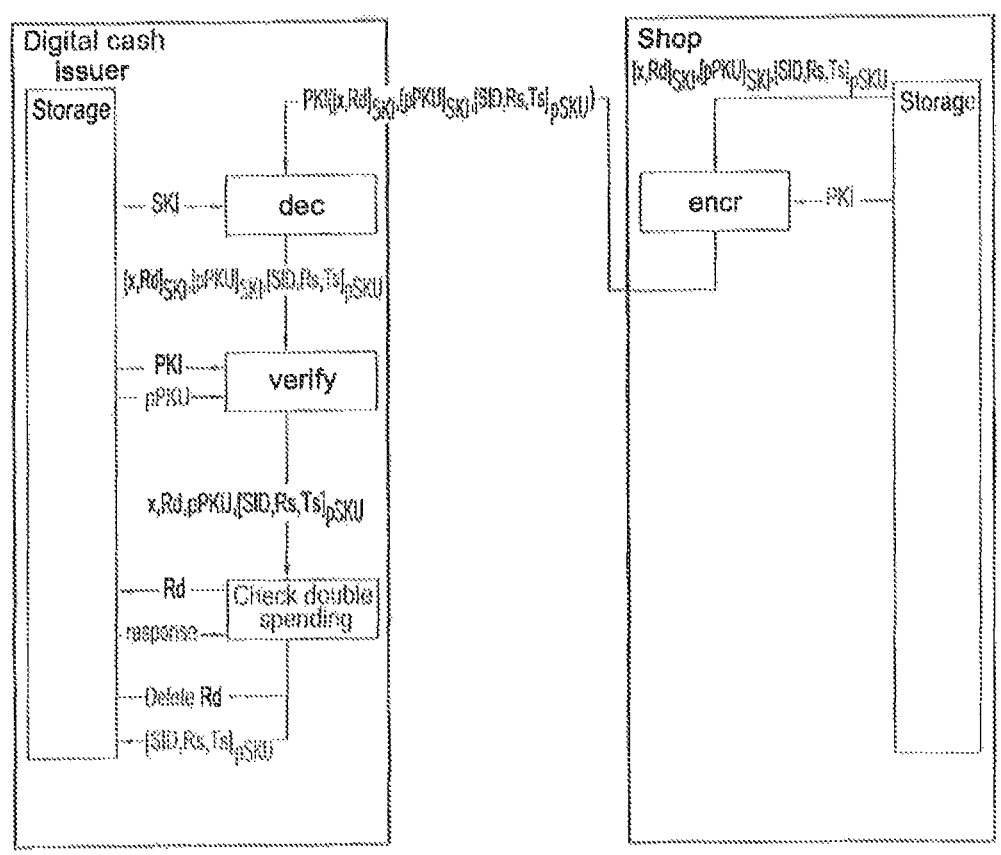
FIG. 12 is an exemplary payment process part 2 according to the first embodiment.

Referring to FIG. 12, after a period of time, the shop encryption program encrypts the information including the challenge that was signed by the user [Rs,Ts,SID]pSKU, the digital cash token [x,Rd]SKI, and the user's digital cash issuer license [pPKU]SKI, using the public key of the digital cash issuer PKI, and sends the information to the digital cash issuer via a communications path.

The digital cash issuer decryption program decrypts PKI ([Rs,Ts,SID]pSKU, [x,Rd]SKI, [pPKU]SKI) using the digital cash issuer's secret key SKI. The signature verifying program verifies the signatures using the digital cash issuer's public key PKI and the user's pseudonym public key pPKU. If the signatures are valid, the issuer checks the random number Rd. If the random number Rd does not exist, it is determined that there is a double spending, and the real identity is revealed by sending the user's pseudonym public key pPKU to the certificate authority. If Rd exists, the random number is deleted, and the digital cash issuer stores the challenge [Rs, Ts,SID]pSKU in the storage device.

Figure 13:
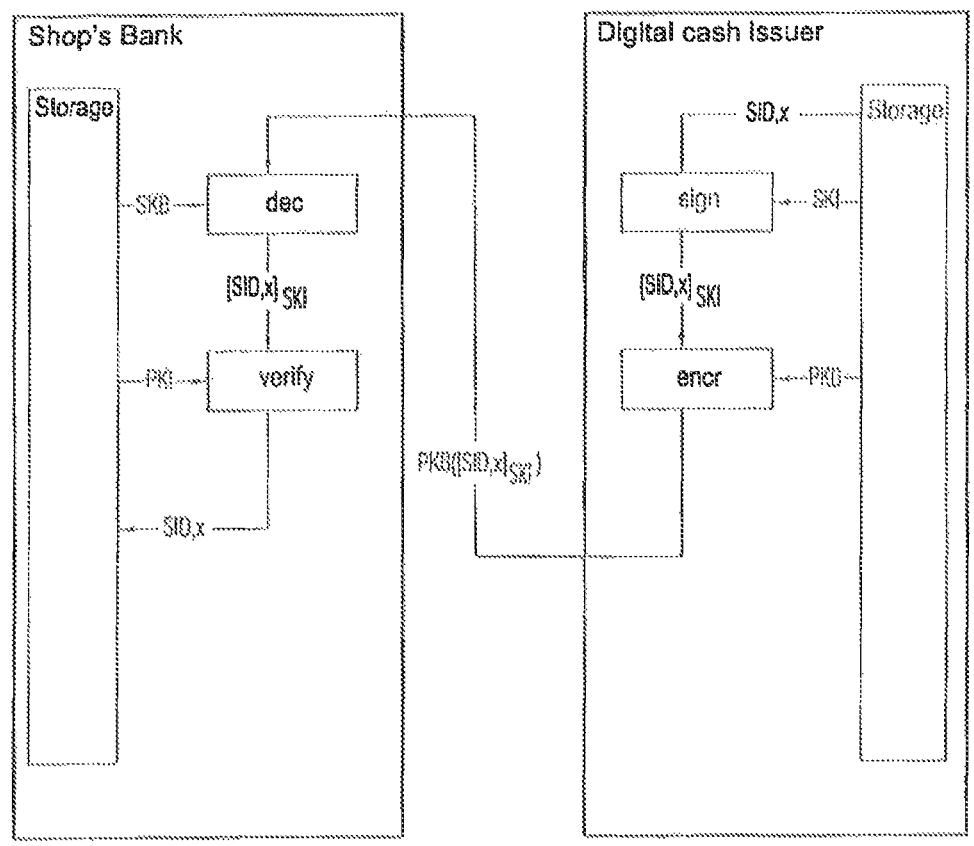
FIG. 13 is an exemplary payment process part 3 according to the first embodiment.

Referring to FIG. 13, the digital cash issuer signature generating program signs the shop identification SID and the amount x to be deposited for the shop with the digital cash issuer's secret key SKI. The encryption program encrypts the information using the public key of the shop's bank PKB, and sends the information PKB([SID,x]SKI) to the shop's bank via a communications path.

The shop's bank receives PKB([SID,x]SKI) and the decryption program decrypts the information using the secret key SKB. The signature verifying program verifies the signature with the public key of the issuer PKI. If the signature is valid, the shop's bank adds the amount of money x to the shop's account.

Second Embodiment

In the previous embodiments, the withdrawal process and the payment process are performed from fixed positions, which require the user to access user station to buy or to get digital cash. For more convenience and accessibility, the following example allows a user to use a mobile device to buy and to get digital cash. The user mobile device in this implementation includes a processing device, a storage device, an encryption program, and a decryption program. However, because the storage and the computational power of most conventional mobile devices are limited, the mobile device implementation may provide only a minimum requirement to protect the security and privacy.

(1) User Registration Procedure

The user registration procedure for this example is the same as described above for FIGS. 2-4.

(2) Withdrawal Procedure (I.E., Electronic Cash Issuing Procedure)

Figure 14:
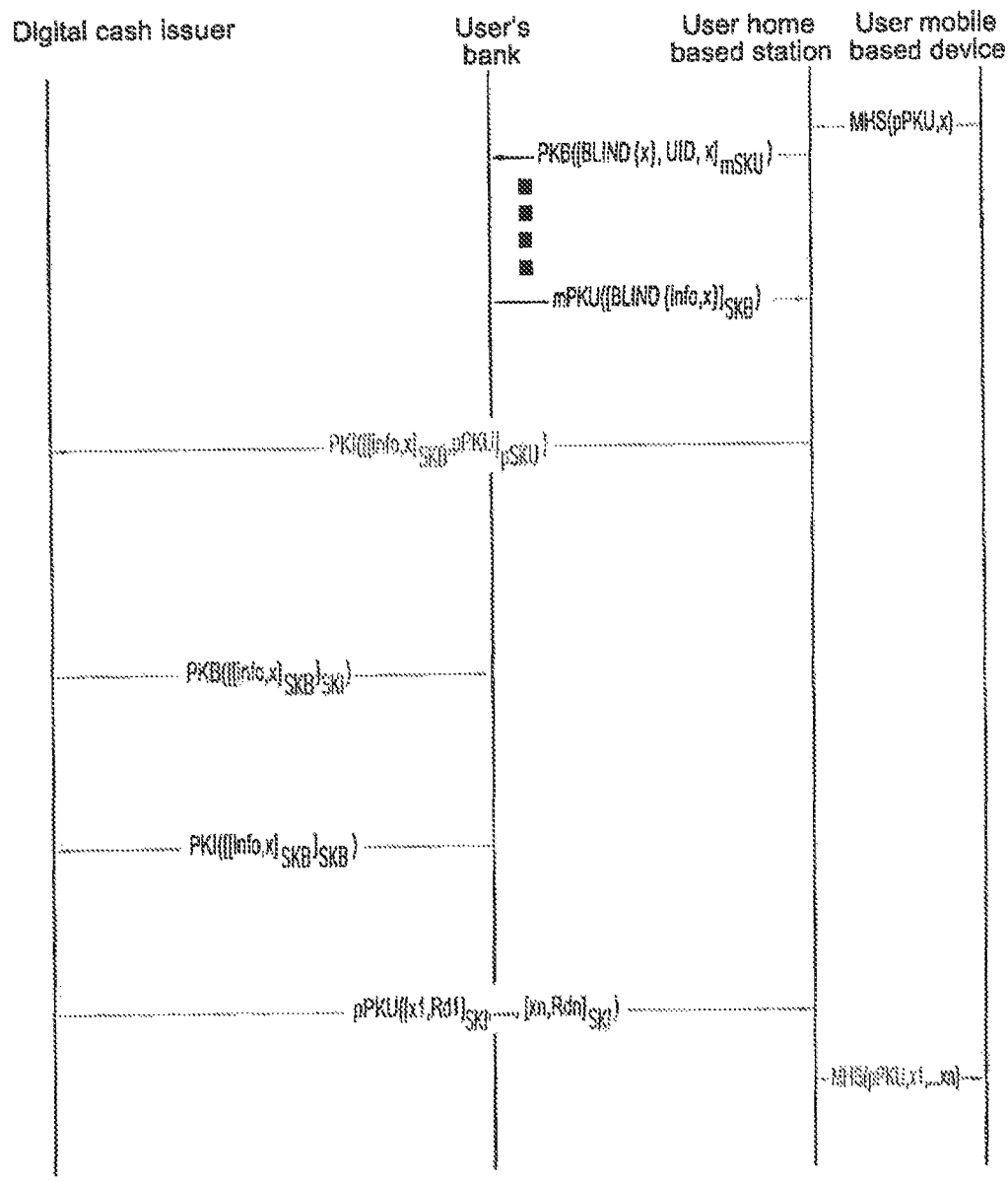
FIG. 14 is an exemplary withdrawal protocol according to the second embodiment.
Figure 15:
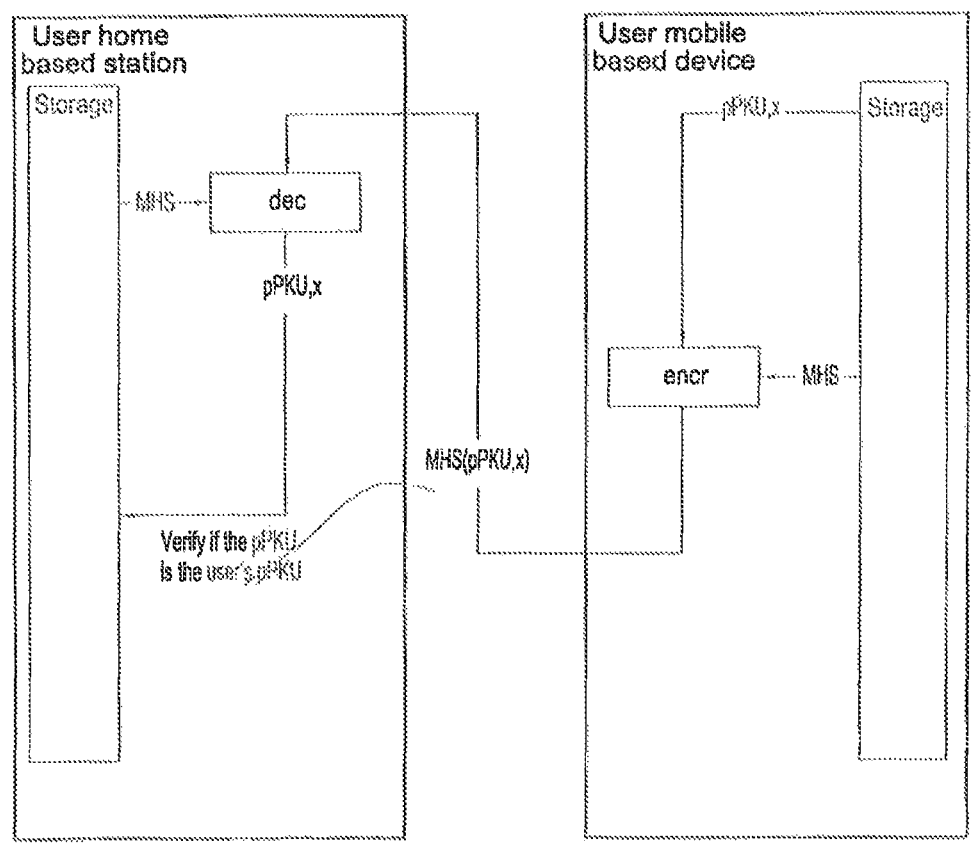
FIG. 15 is an exemplary withdrawal process part 1 according to the second embodiment.

FIGS. 14-19 show the diagrammatic representation of the withdrawal protocol. Referring to FIGS. 14 and 15, the user's mobile device encryption program encrypts the user's pseudonym public key pPKU and the amount of digital cash x using the mobile-home shared secret key MHS, and sends the information MHS(pPKU,x) to the user station via a communications path.

The user station receives the encrypted user's pseudonym public key and the amount of digital cash MHS(pPKU,x) and the decryption program decrypts the information using the mobile/home shared secret key MHS and determines whether the decrypted key matches the user's pseudonym public key. If the keys are equal, the user's mobile device is authenticated by the user station.

Figure 16:
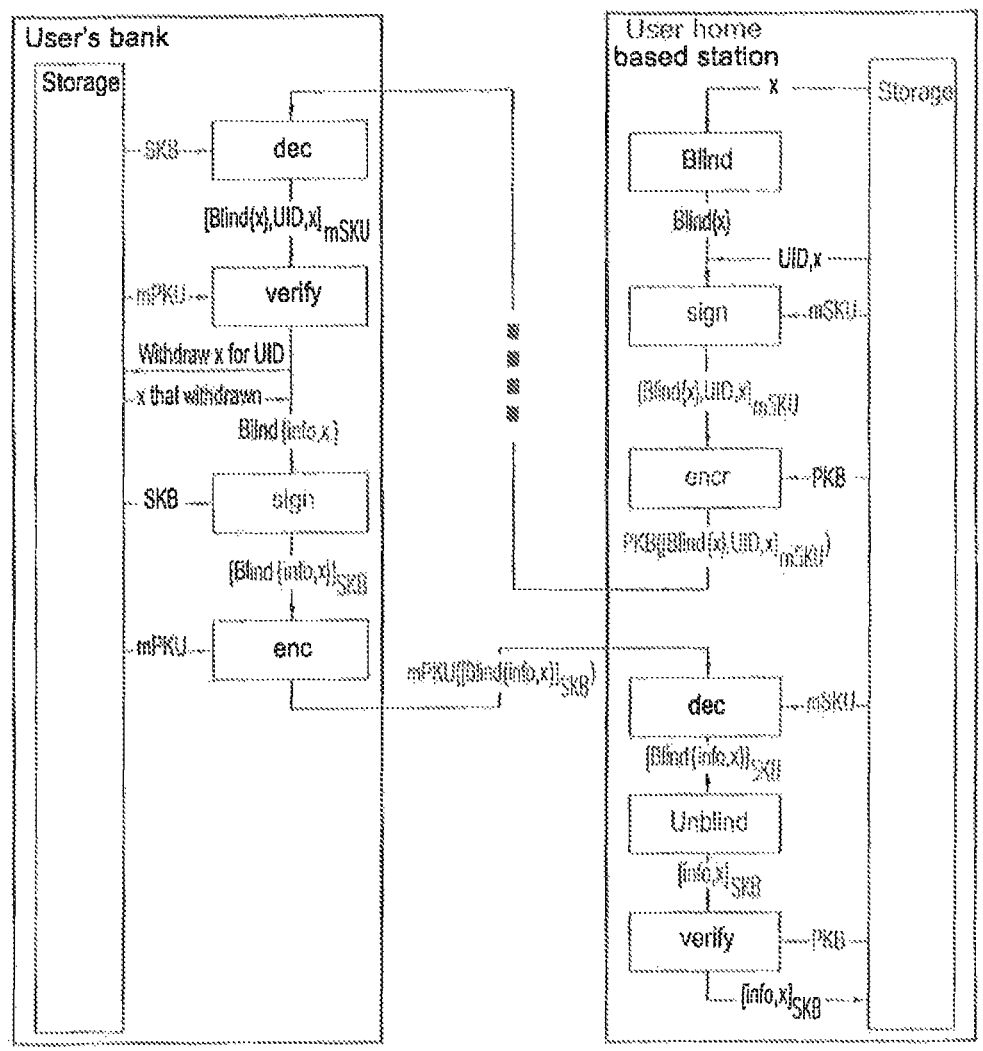
FIG. 16 is an exemplary withdrawal process part 2 according to the second embodiment.

Referring to FIG. 16, the user station blinds the amount of digital cash x using any well known blinding signature scheme. The signature generating program signs the blinded amount of digital cash Blind{x}, the user real identification UID, and the amount of money to be withdrawn x using the user's master secret key mSKU. The encryption program encrypts the information using the public key of the user's bank PKB and sends PKB([Blind{x},UID,x]$_{mSKU}$) to the user's bank via a communications path.

The user's bank decryption program decrypts PKB ([Blind{x},UID,x]$_{mSKU}$) using the user's bank's secret key SKB. The signature verifying program verifies the validity of the signature for authentication using the master public key of the user mPKU. If the signature is valid, the amount of money x is withdrawn from the user account. The signature generating program signs the blinded information and the amount of digital cash amount Blind(info,x), which may be created through cooperation between the user's bank and the user station using any well known blind signature scheme), using the bank's secret key SKB. The encryption program encrypts [Blind{info,x}]$_{SKB}$ using the master public key of the user mPKU and sends mPKU([BLIND{info,x}]$_{SKB}$) to the user station via a communications path.

The user station receives mPKU([BLIND{info,x}]$_{SKB}$). The decryption program decrypts the information using the user's master secret key mSKU and un-blinds the signed, blinded information and the amount of digital cash using any well know blind signature scheme. The use station signature verifying program verifies the validity of the bank's signature using the public key of the user's bank PKB. If the signature is valid, the user station stores the signed information and the amount of digital cash [info,x]$_{SKB}$ as a check in the storage device.

Figure 17:
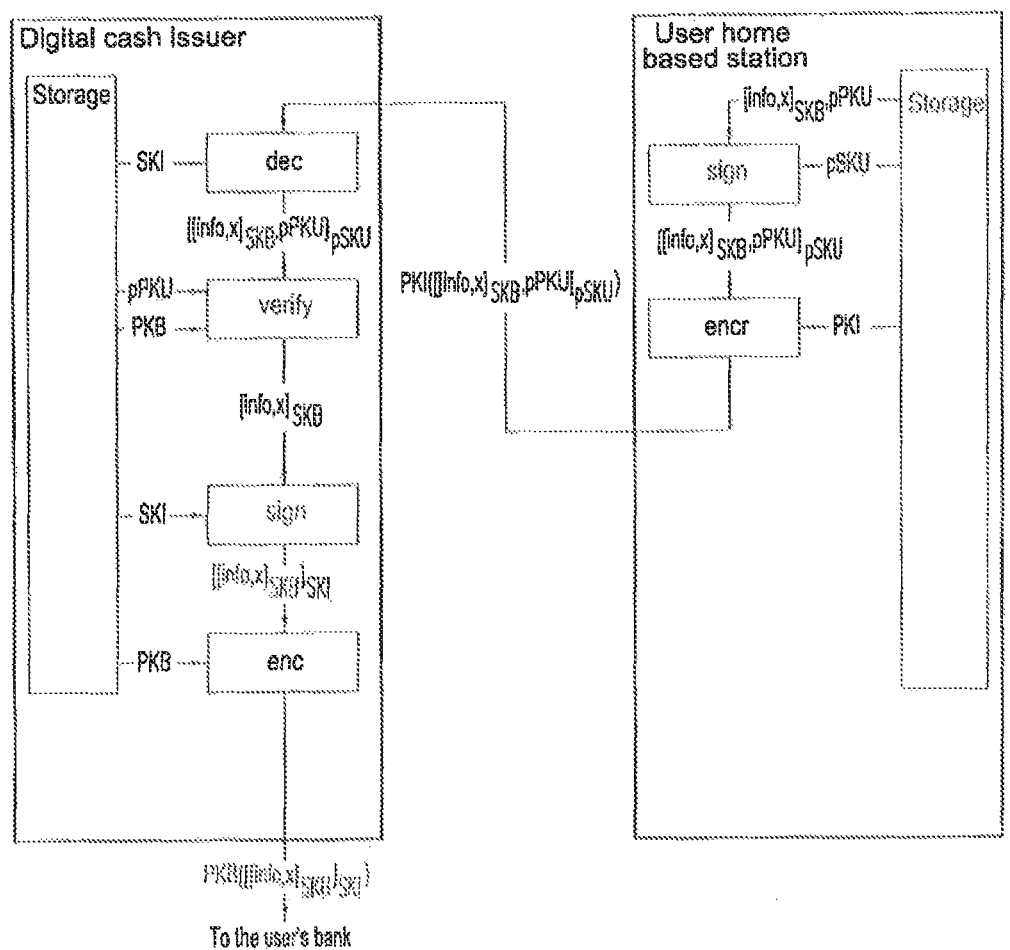
FIG. 17 is an exemplary withdrawal process part 3 according to the second embodiment.

Referring to FIG. 17, the use station signature generating program signs the check [info,x]$_{SKB}$ and the user's pseudonym public key pPKU using the user's pseudonym secret key pSKU. The encryption program encrypts [[info,x]$_{SKB}$, pPKU]$_{pSKU}$ using the digital cash issuer's public key PKI and sends PKI([[info,x]$_{SKB}$,pPKU]$_{pSKU}$) to the digital cash issuer.

The digital cash issuer receives PKI([[info,x]$_{SKB}$, pPKU]$_{pSKU}$), and the decryption program decrypts the information using the digital cash issuer's secret key SKI. The signature verifying program verifies the signature of the user, for authentication, using the user's pseudonym public key pPKU. If the signature is valid, the digital cash issuer signature generating program verifies the signature of the bank [info,x]$_{SKB}$ using the public key of the user's bank PKB. If the signature is valid, the digital cash issuer signature generating program signs the check [info,x]$_{SKB}$ using the digital cash issuer's secret key SKI. The encryption program encrypts [[info,x]$_{SKB}$]$_{SKI}$ using the public key of the user's bank PKB, and sends PKB([[info,x]$_{SKB}$]$_{SKI}$) to the user's bank via a communications path.

Figure 18:
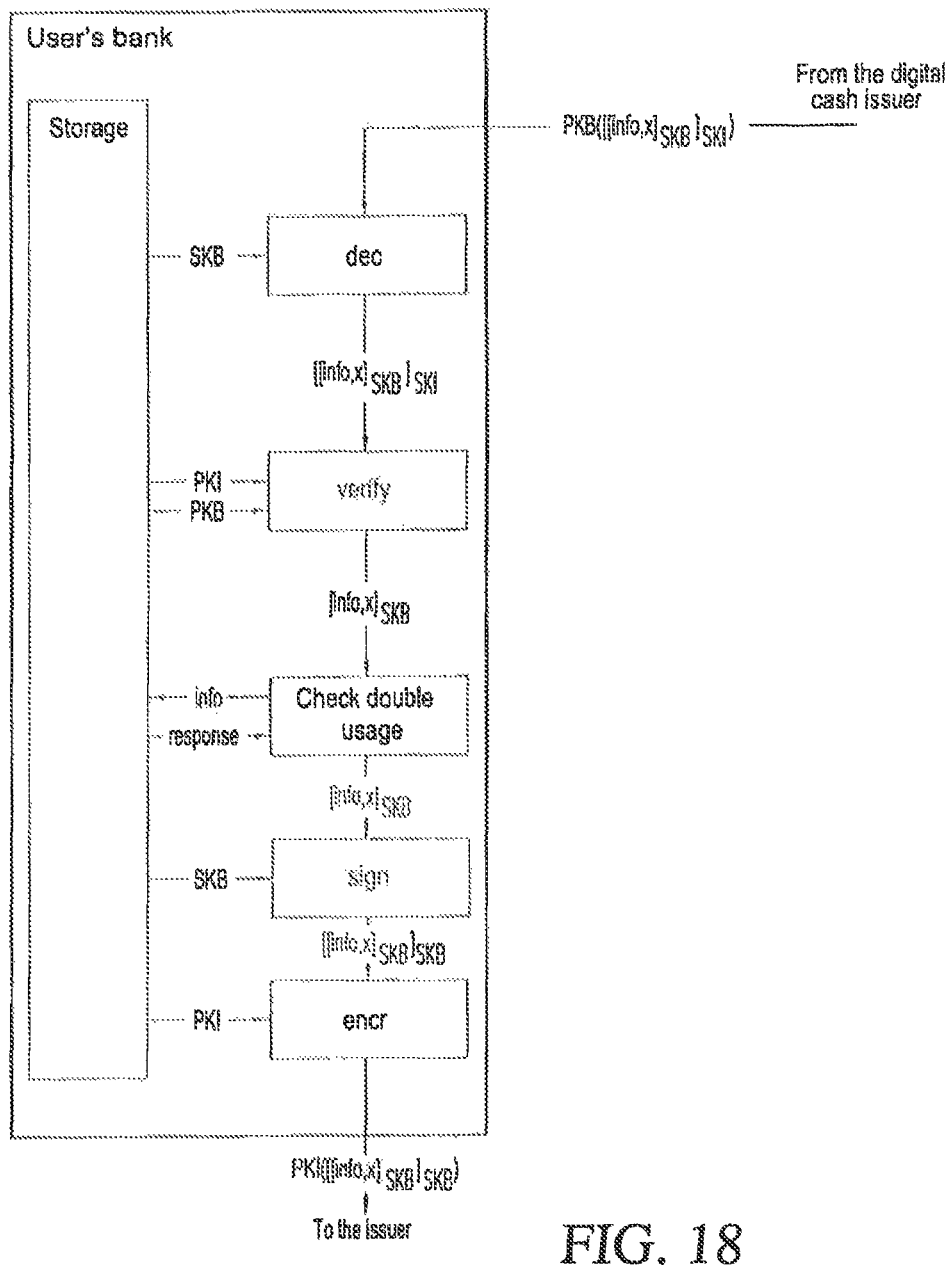
FIG. 18 is an exemplary withdrawal process part 4 according to the second embodiment.

Referring to FIG. 18, the user's bank receives PKB([[info, x]$_{SKB}$]$_{SKI}$), and the decryption program decrypts the information using the secret key of the user's bank. The signature verifying program verifies the signature of the digital cash issuer signature using the digital cash issuer's public key PKI. If the signature is valid, the signature verifying program verifies the signature of the user's bank using the public key of the user's bank. If the signature is valid, the bank determines whether the check [info,x]$_{SKB}$ was used. If the check was not used, the user's bank stores the check in the storage device and the signature generating program signs the check [info, x]$_{SKB}$ using the secret key of the user's bank SKB. The encryption program encrypts [[info,x]$_{SKB}$]$_{SKB}$ using the digital cash issuer's public key PKI and sends PKI ([[info,x]$_{SKB}$]$_{SKB}$) to the digital cash issuer via a communications path.

Figure 19:
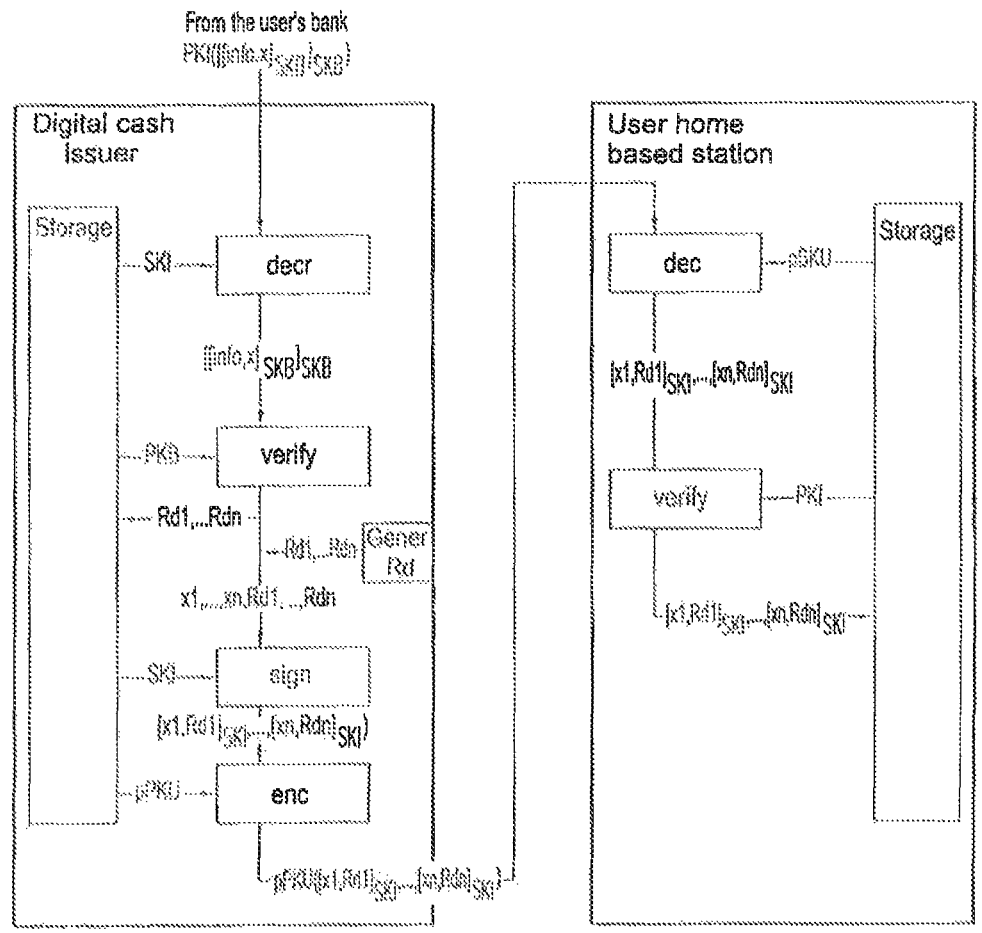
FIG. 19 is an exemplary withdrawal process part 5 according to the second embodiment.

Referring to FIG. 19, the digital cash issuer receives the encrypted information PKI([[info,x]SKB]SKB), and the decryption program decrypts the information using the digital cash issuer's secret key SKI. The signature verifying program verifies the signature of encrypted information and the check with the user's bank secret key. If the signatures are valid, the digital cash issuer divides the amount of digital cash x into several digital cash tokens. Each digital cash token includes the following information: (i) a digital cash amount, (ii) a random number. The digital cash issuer generates the random numbers Rd1, . . . , Rdn and stores them in its storage device. The signature generating program signs digital cash amounts x1, . . . , xn, and random numbers Rd1, . . . , Rdn using the digital cash issuer's secret key SKI. The encryption program encrypts the signed digital cash tokens using the user's pseudonym public key pPKU, and sends the encrypted digital cash tokens pPKU([x1,Rd1]SKI, . . . , [xn,Rdn]SKI) to the user's home station via a communications path.

The user's home station receives the encrypted digital cash tokens pPKU([x1,Rd1]SKI, . . . , [xn,Rdn]SKI), and the decryption program decrypts the digital cash tokens using the user's pseudonym secret key. The signature verifying program verifies the validity of the digital cash issuer signatures using the digital cash issuer's public key PKI. If the signatures are valid, the digital cash tokens [x1,Rd1]SKI, . . . , [xn,Rdn]SKI are stored in the storage device of the user's home station.

Figure 20:
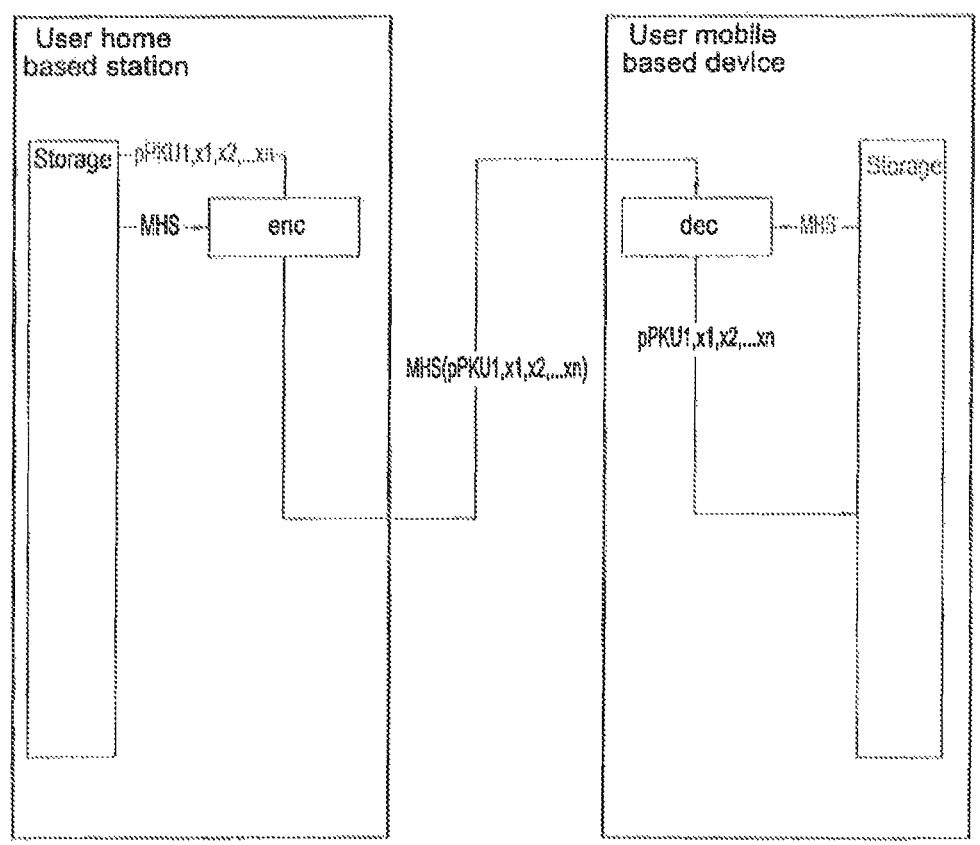
FIG. 20 is an exemplary withdrawal process part 6 according to the second embodiment.

Referring to FIG. 20, the user's home station encryption program encrypts the values of the digital cash tokens x1, . . . , xn and the user's pseudonym public key pPKU using the mobile/home shared secret key MHS. The encrypted information MHS(pPKU,x1, . . . , xn) is sent to the user's mobile device via a communications path.

The user's mobile device receives the encrypted values of the digital cash tokens and the user's pseudonym public key MHS(pPKU,x1, . . . , xn), and the decryption program decrypts the information using the mobile/home shared secret key MHS. The mobile device determines whether the user's pseudonym public key matches the decrypted user pseudonym public key to authenticate the user's home station. If the user's pseudonym public keys match, the user stores the values of the digital cash tokens in the storage device of the user's mobile device. According to this embodiment, the user may easily transfer the issued digital cash token to another user who has certified pseudonym public key.

(3) Payment Procedure

FIGS. 21-25 show the diagrammatic representation of the payment protocol.

Figure 21:
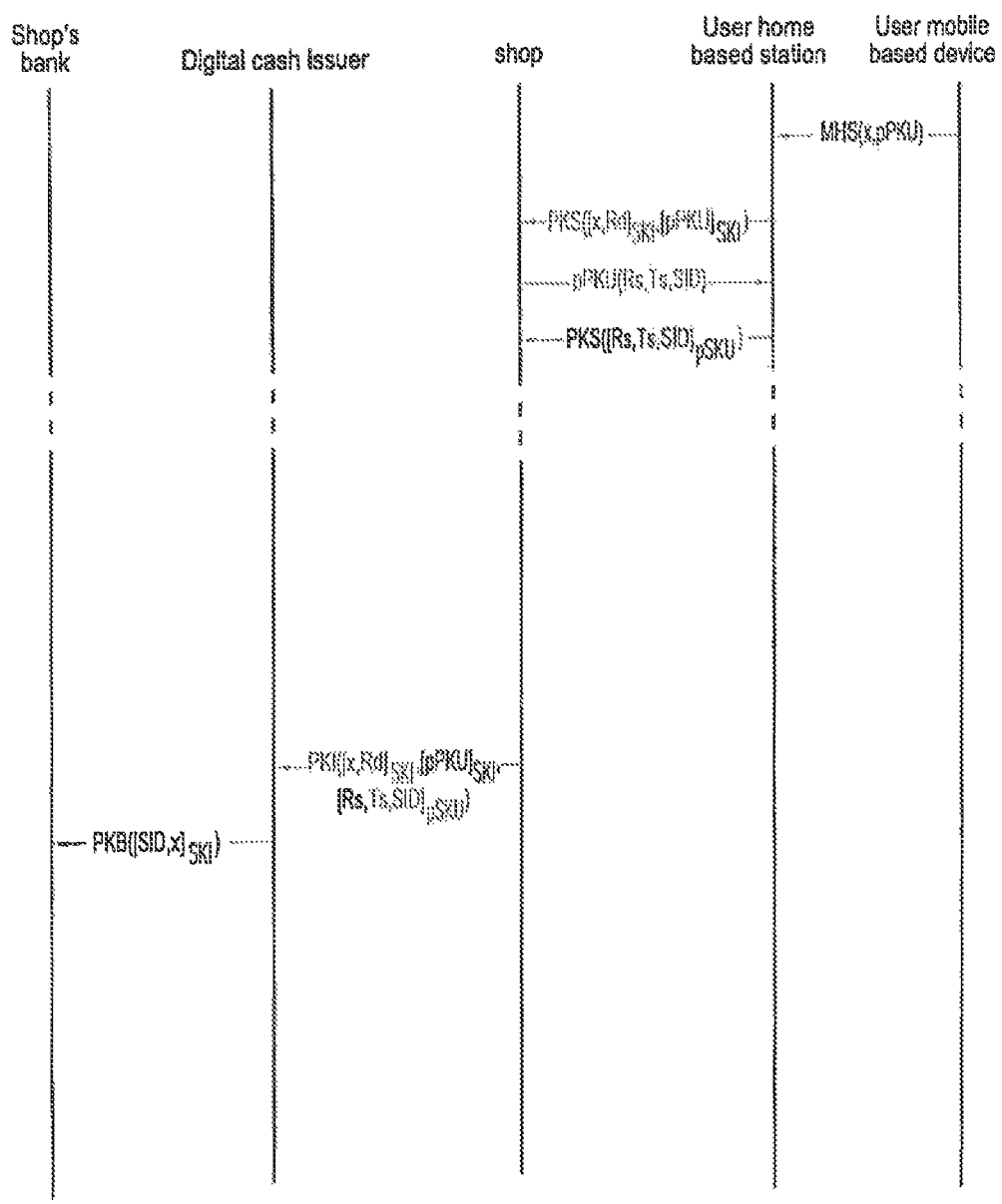
FIG. 21 is an exemplary payment protocol according to the second embodiment.
Figure 22:
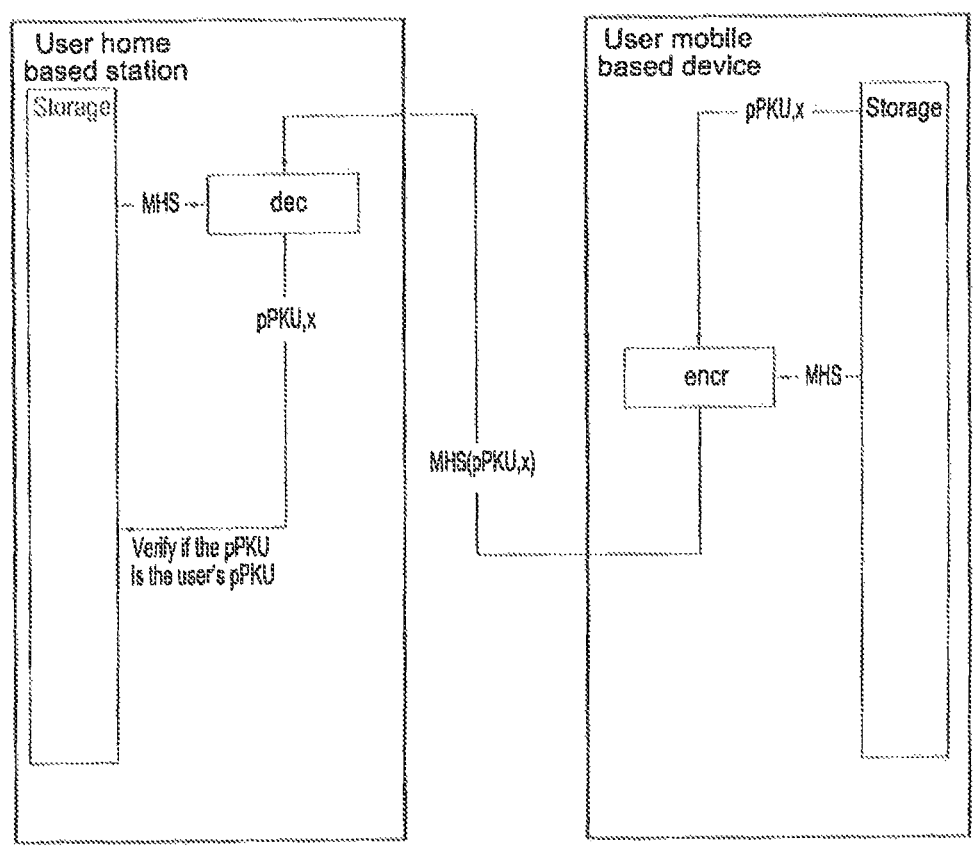
FIG. 22 is an exemplary payment process part 1 according to the second embodiment.

Referring to FIGS. 21 and 22, the user's mobile device chooses the value of the digital cash token x and the encryption program encrypts the value and the user's pseudonym public key pPKU using the mobile/home shared secret key MHS and sends the encrypted information MHS(pPKU,x) to the user's station via a communications path.

The user's home station receives the encrypted information MHS(pPKU,x) and the decryption program decrypts the information using the mobile/home shared secret key MHS and uses the decrypted to authenticate the user's mobile device. If the decrypted user's pseudonym public key matches the user's pseudonym public key, the user's home station finds the digital cash token that is equivalent to the value that was sent by the user's mobile device.

Figure 23:
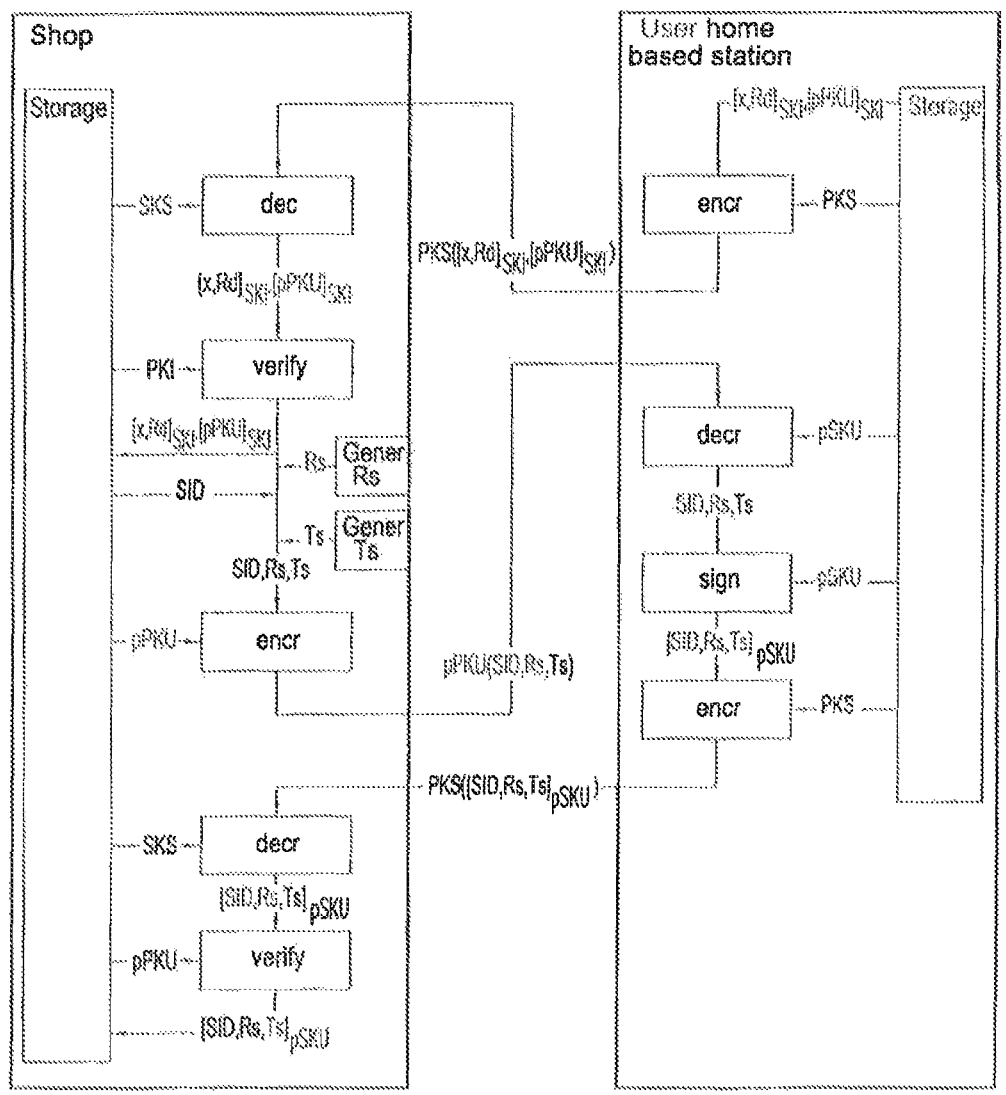
FIG. 23 is an exemplary payment process part 2 according to the second embodiment.

Referring to FIG. 23, the user's home station encryption program encrypts the digital cash token [x,Rd]SKI and the digital cash issuer license [pPKU]SKI using the public key of the shop PKS, and sends the encrypted information to the shop as request for payment. The user's home station may send a payment request using another certified pseudonym public key. As a result, the user may change the pseudonym at the payment time because the pseudonym is not associated with digital cash token, giving the user flexibility in their payment options.

The shop decryption program decrypts the encrypted digital cash token and the digital cash issuer license PKS([x,Rd]SKI, [pPKU]SKI) using the shop's secret key SKS. The signature verifying program verifies the signature of the issuer with the digital cash issuer public key PKI. If the signatures are valid, the shop stores the shop's digital cash issuer license and the digital cash token. The shop random number generating program generates a random number Rs, and the time generating program generates the time Ts. The encryption program encrypt Rs, Ts, and the shop identification SID using the user's pseudonym public key pPKU, and sends the encrypted information pPKU(Rs,Ts,SID) to the user's home station via a communications path.

The user's home station receives the encrypted information pPKU(Rs,Ts,SID). The decryption program decrypts the information using the user's pseudonym secret key pSKU. The signature generating program signs the random number Rs, the time Ts, and the shop identification SID using the user's pseudonym secret key pSKU. The encryption program encrypts the information using the public key of the shop PKS, and sends the encrypted information PKS([Rs,Ts,SID]pSKU) to the shop via a communications path.

The shop receives the encrypted information PKS([Rs,Ts,SID]pSKU). The decryption program decrypts the information using the shop's secret key SKS. The signature verifying program verifies the signature using the user's pseudonym public key pPKU. If the signature is valid, the shop stores the challenge and the shop regards the payment as valid.

Figure 24:
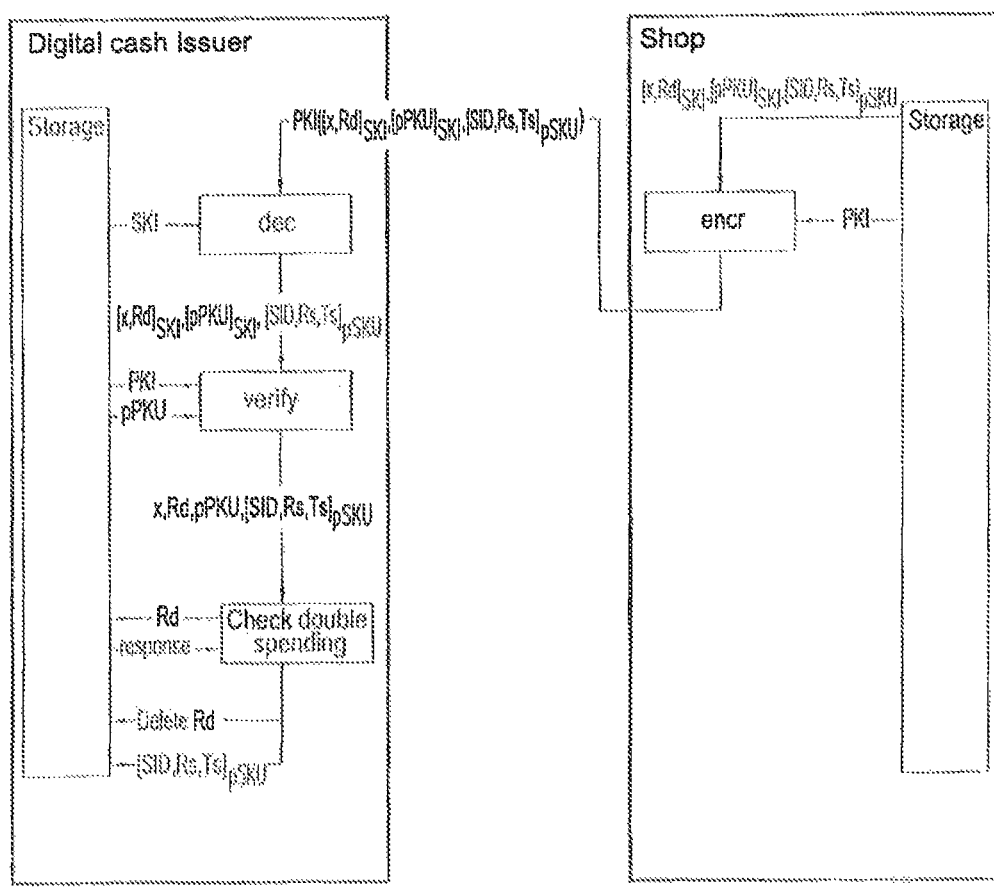
FIG. 24 is an exemplary payment process part 3 according to the second embodiment.

Referring to FIG. 24, after a period of time the shop encryption program encrypts the information that includes the challenge that was signed by the user [Rs,Ts,SID]pSKU, the digital cash token [x,Rd]SKI, and the user's digital cash issuer license [pPKU]SKI, using the public key of the digital cash issuer PKI, and sends the information to the digital cash issuer via a communications path.

The digital cash issuer decryption program decrypts PKI ([Rs,Ts,SID]pSKU, [x,Rd]SKI, [pPKU]SKI) using the digital cash issuer's secret key SKI. The signature verifying program verifies the signatures using the digital cash issuer's public key PKI and the user's pseudonym public key pPKU. If the signatures are valid, the issuer checks the random number Rd. If the random number Rd does not exist, it is determined that there has been a double spending and the real identity is revealed by sending the user's pseudonym public key pPKU to the certificate authority. If the random number Rd exists, the random number is deleted, and the digital cash issuer stores the challenge [Rs,Ts,SID]pSKU in its storage device.

Figure 25:
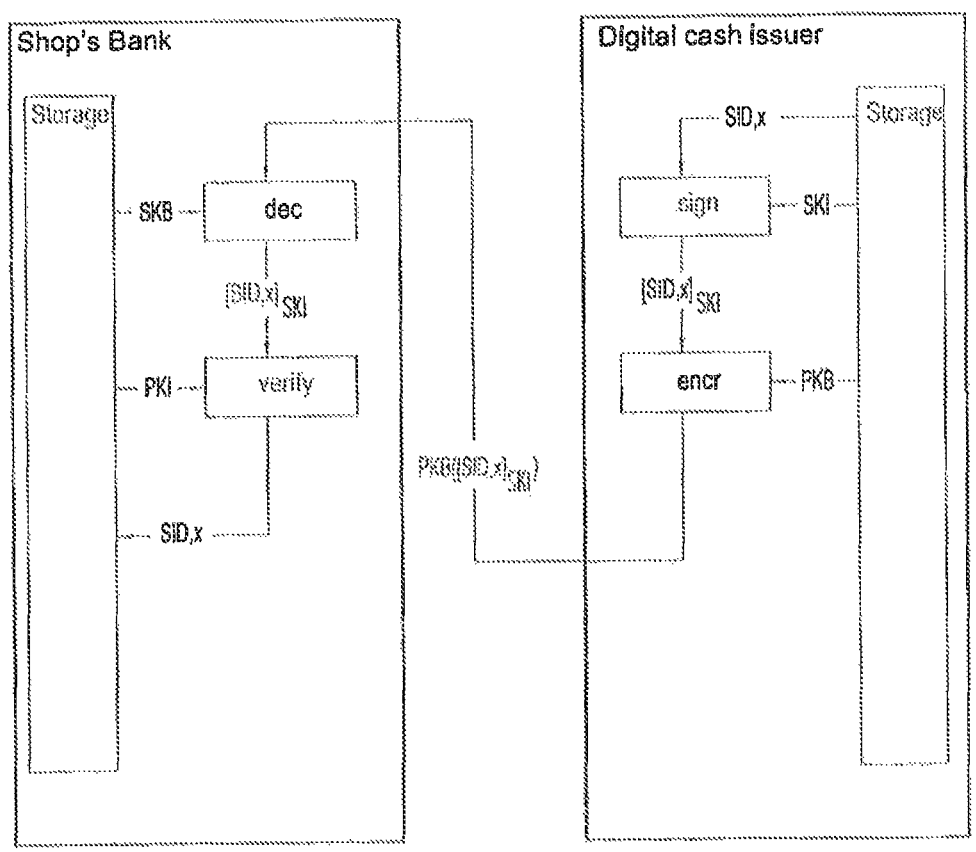
FIG. 25 is an exemplary payment process part 4 according to the second embodiment.

Referring to FIG. 25, the digital cash issuer signature generating program signs the shop identification SID, and the amount x to be deposited for the shop with the digital cash issuer's secret key SKI. The encryption program encrypts the information using the public key of the shop's bank PKB and sends PKB([SID,x]$_{SKI}$) to the shop's bank via a communications path.

The shop's bank receives PKB([SID,x]$_{SKI}$) and the decryption program decrypts the information using the secret key SKB. The signature verifying program verifies the signature with the public key of the issuer PM. If the signature is valid, the shop's bank adds the amount of money x to the shop's account.

Third Embodiment

In the previous embodiments described above public key encryption is used. Public key encryption adds a cost in power and time used to complete a transaction. Therefore, a shared secret key may be used in place of the public key to hide the pseudonym and the amount of the digital cash as described in the following example. In this example, the certificate authority, bank, and user are as described above; however, in addition to the elements described above, the issuer further includes a key pointer KPr generating program.

(1) User Registration Procedure

Figure 26:
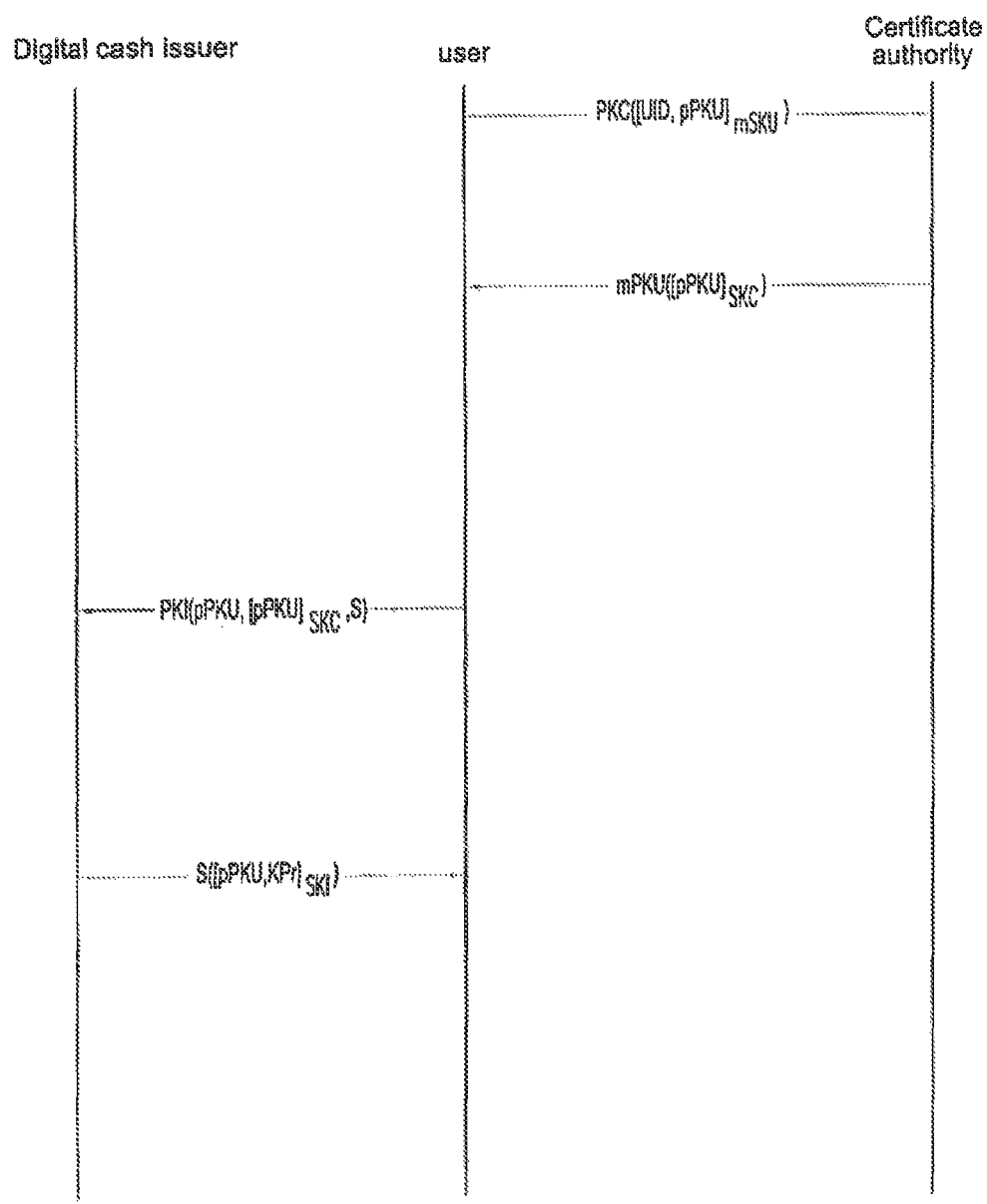
FIG. 26 is an exemplary user registration protocol according to the third embodiment.
Figure 27:
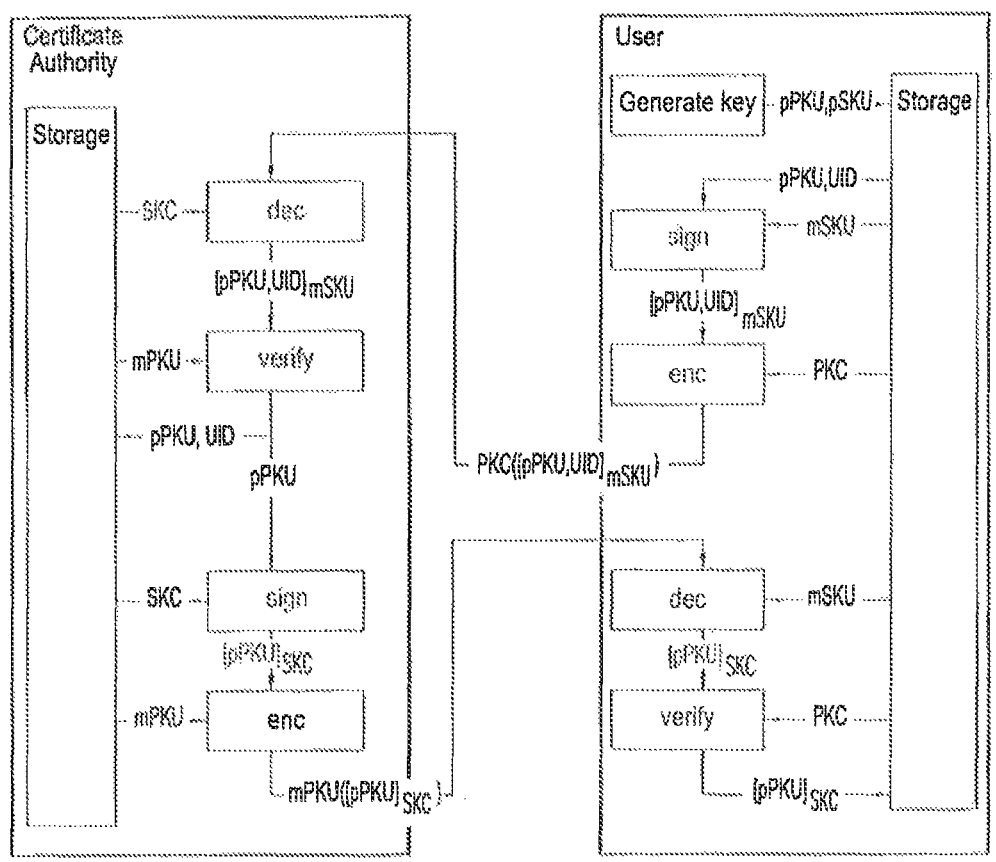
FIG. 27 is an exemplary user registration process part 1 according to the third embodiment.
Figure 28:
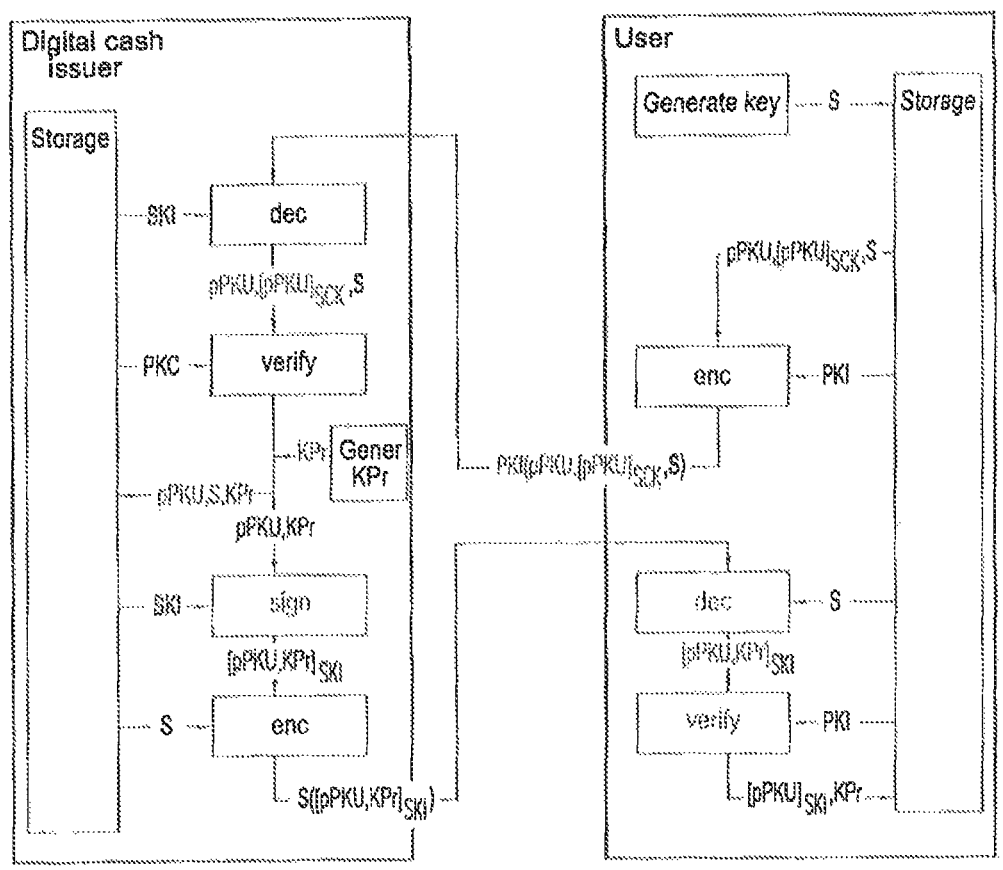
FIG. 28 is an exemplary user registration process part 2 according to the third embodiment.

FIGS. 26-28 show the diagrammatic representation of the registration protocol. Referring to FIGS. 26 and 27, the user the key generating program generates a pseudonym public key and a pseudonym secret key. The signature generating program signs the pseudonym public key and the user real identification using user's master secret key. The encryption program encrypts [UID,pPKU]$_{mSKU}$ using the public key of the certificate authority and sends PKC([UID,pPKU]$_{mSKU}$) to the certificate authority as a request for a certified pseudonym public key (i.e., a request for the issuance of a license).

The certificate authority receives the request (PKC([UID, pPKU]$_{mSKU}$)) and the decryption program decrypts the request using the secret key of the certificate authority SKC. The signature verifying program verifies the validity of the user signature using the user's master public key mPKU. If the signature is valid, the certificate authority the signature generating program generates a signature (i.e., a license) [pPKU]$_{SKC}$ for the user's pseudonym public key using the certificate authority's secret key SKC, and stores the user's pseudonym public key in the storage device in connection with the user's master public key mPKU and the user's real identification UID. The certificate authority encryption program encrypts the license [pPKU]$_{SKC}$ using the user's master public key mPKU and sends mPKU([pPKU]$_{SKC}$) to the user via a communications path.

The user receives the encrypted license mPKU ([pPKU]$_{SKC}$) and the decryption program decrypts the license using the user's master secret key mSKU. The signature verifying program verifies the validity of the license [pPKU]$_{SKC}$ using the public key of the certificate authority PKC. If the signature is valid, the user key generating program establishes a user-issuer shared secret key S and stores the license and the user-issuer shared secret key in the user storage device.

Referring to FIG. 27, the user encryption program encrypts the license [pPKU]$_{SKC}$, pseudonym public key pPKU, and the user-issuer shared secret key S using the public key of the digital cash issuer PM. The user then sends PKI([pPKU]$_{SKC}$, pPKU,S) to the digital cash issuer via a communications path.

The digital cash issuer receives PKI([pPKU]$_{SKC}$,pPKU,S) and the decryption program decrypts the information using the secret key of the digital cash issuer SKI. The digital cash issuer searches for pPKU in its storage device to prevent misuse of other users' pseudonym public key. If the user's pseudonym public key pPKU is not already registered, the digital cash issuer signature verifying program verifies the validity of the license [pPKU]$_{SKC}$ using the certificate authority's public key PKC. If the license valid, the digital cash issuer assigns an empty storage space to the user and generates a key pointer KPr to identify the user-issuer shared secret key S. In addition, the cash issuer also stores the user's pseudonym public key pPKU, the user-issuer shared secret key S and the key pointer KPr in the storage device. The digital cash issuer signature generating program signs the user's pseudonym public key pPKU and the key pointer KPr using the secret key of the issuer SKI. The encryption program encrypts the information using the user-issuer shared secret key S and sends S([pPKU, KPr]$_{SKI}$) as an acknowledgment to the user via a communications path.

The user receives the acknowledgement S([pPKU, KPr]$_{SKI}$), and the decryption program decrypts the information using the user-issuer shared secret key S. The signature verifying program verifies the validity of the digital cash issuer signature using the digital cash issuer's public key PKI. If the signature valid, the digital cash issuer stores the license [pPKU]$_{SKI}$ and the key pointer KPr in the storage device. According to this example, the user may obtain an unlimited number of certified pseudonym public keys.

(2) Withdrawal Procedure (Electronic Cash Issuing Procedure)

Figure 29:
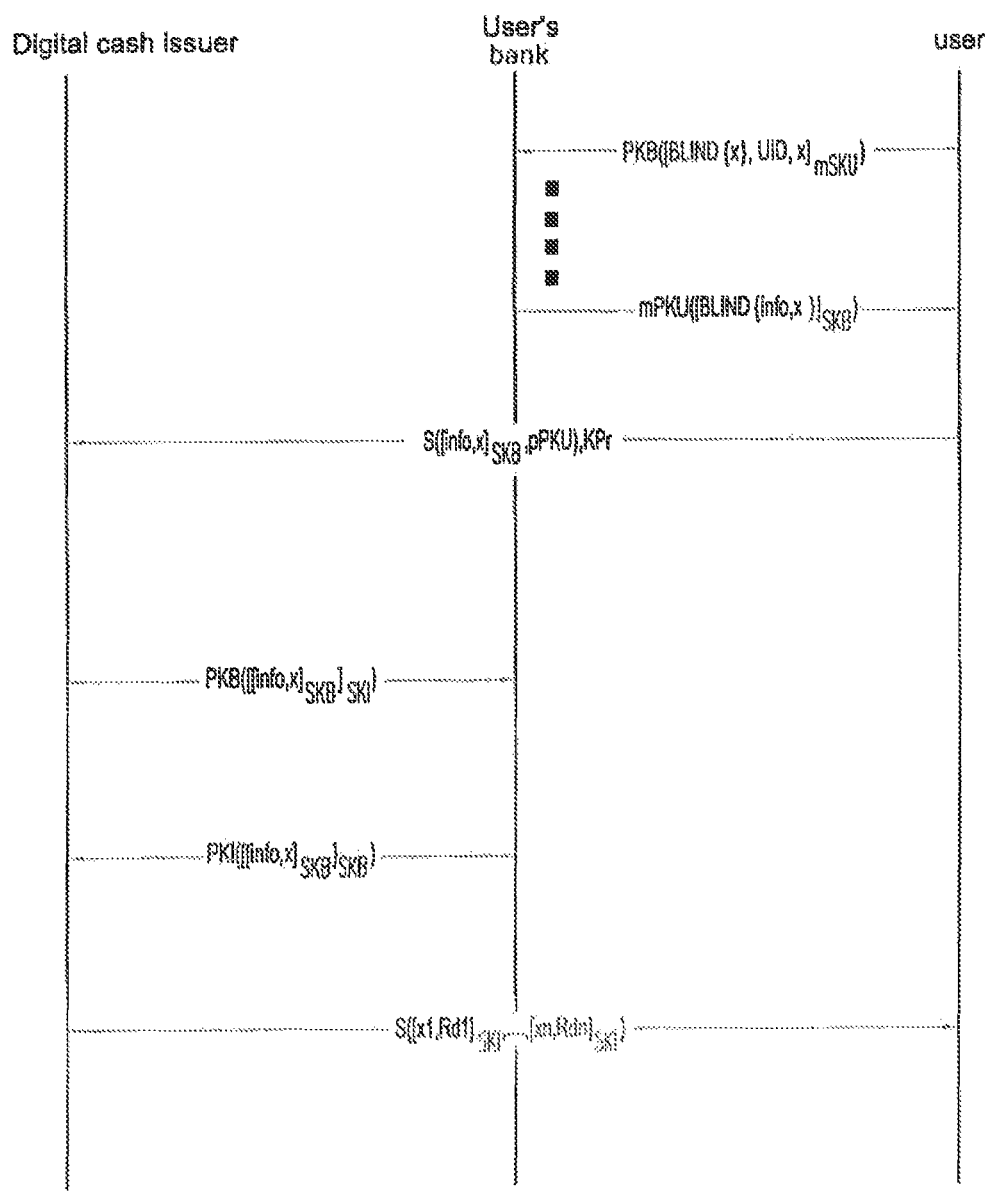
FIG. 29 is an exemplary withdrawal protocol according to the second embodiment.
Figure 30:
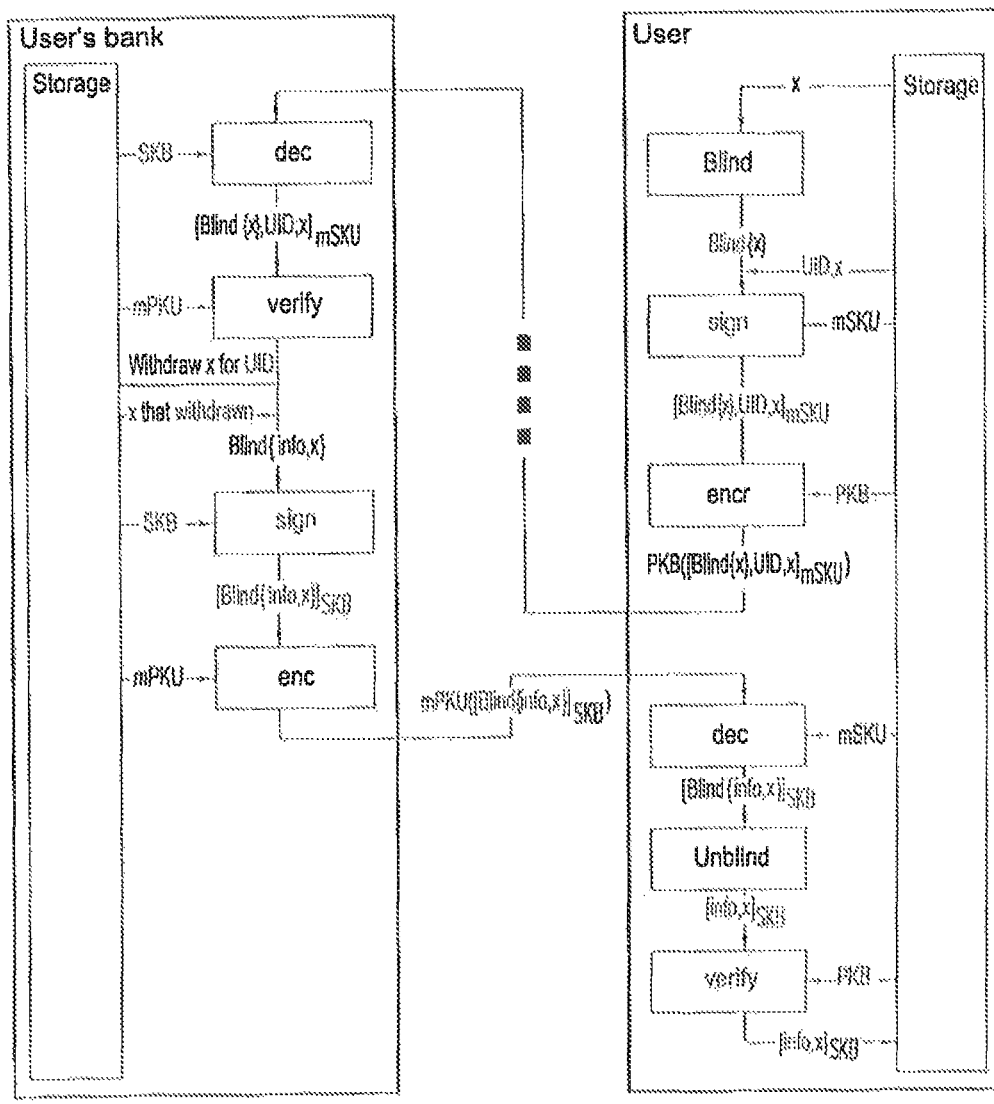
FIG. 30 is an exemplary withdrawal process part 1 according to the third embodiment.

FIGS. 29-33 show the diagrammatic representation of the withdrawal protocol. Referring to FIGS. 29 and 30, the user blinds the amount of digital cash x using any well known blinding signature scheme, and the signature generating program signs the blinded amount of digital cash Blind{x}, the user real identification UID, and the amount of money to be withdrawn x using the user's master secret key mSKU. The encryption program encrypts the information using the public key of the user's bank PKB and sends PKB([Blind{x},UID, x]$_{mSKU}$) to the user's bank via a communications path.

The user's bank decryption program decrypts PKB ([Blind{x},UID,x]$_{mSKU}$) using the user's bank's secret key SKB. The signature verifying program verifies the validity of the signature for authentication by using the master public key of the user mPKU. If the signature is valid, the amount of money x is withdrawn from the user account, and the signature generating program signs the blinded information and the amount of digital cash amount Blind(info,x), which is created by the cooperation between the user's bank and the user using any proposed blind signature scheme, using the bank's secret key SKB. The encryption program encrypts [Blind{info,x}]$_{SKB}$ using the master public key of the user mPKU and sends mPKU([BLIND{info,x}]$_{SKB}$) to the user via a communications path.

The user receives mPKU([BLIND{info,x}]$_{SKB}$), and the decryption program decrypts the information using the user's master secret key mSKU and un-blinds the signed blinded information and the amount of digital cash using any well know blind signature scheme. The user signature verifying program verifies the validity of the bank's signature using the public key of the user's bank PKB. If the signature is valid, the user stores the signed information and the amount of digital cash [info,x]$_{SKB}$ as a check in the storage device.

Figure 31:
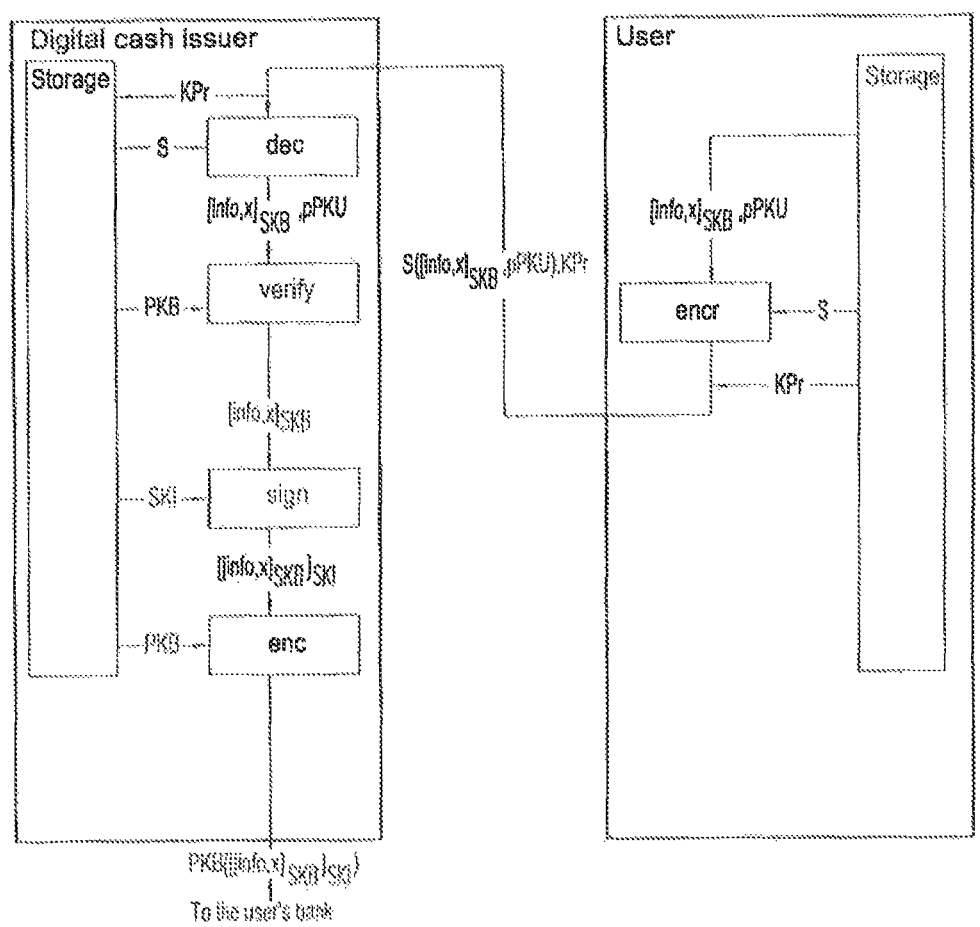
FIG. 31 is an exemplary withdrawal process part 2 according to the third embodiment.

Referring to FIG. 31, the user encryption program encrypts the check [info,x]$_{SKB}$ and the user's pseudonym public key pPKU using the user-issuer shared secret key S and sends S([info,x]$_{SKB}$,pPKU) and the key pointer KPr to the digital cash issuer.

The digital cash issuer receives S([info,x]$_{SKB}$,pPKU) and the key pointer KPr. The digital cash issuer searches for the user-issuer shared secret key S using the key pointer KPr. The decryption program decrypts S([info,x]$_{SKB}$,pPKU) using the user-issuer shared secret key S. The decrypted key is matched the user's pseudonym public key to authenticate the user. If the keys match, the user is authenticated. The digital cash issuer signature generating program verifies the signature of the bank [info,x]$_{SKB}$ using the public key of the user's bank PKB. If the signature is valid, the digital cash issuer signature generating program signs the check [info,x]$_{SKB}$ using the digital cash issuer's secret key SKI. The encryption program encrypts [[info,x]$_{SKB}$]$_{SKI}$ using the public key of the user's bank PKB and sends PKB([[info,x]$_{SKB}$]$_{SKI}$) to the user's bank via a communications path.

Figure 32:
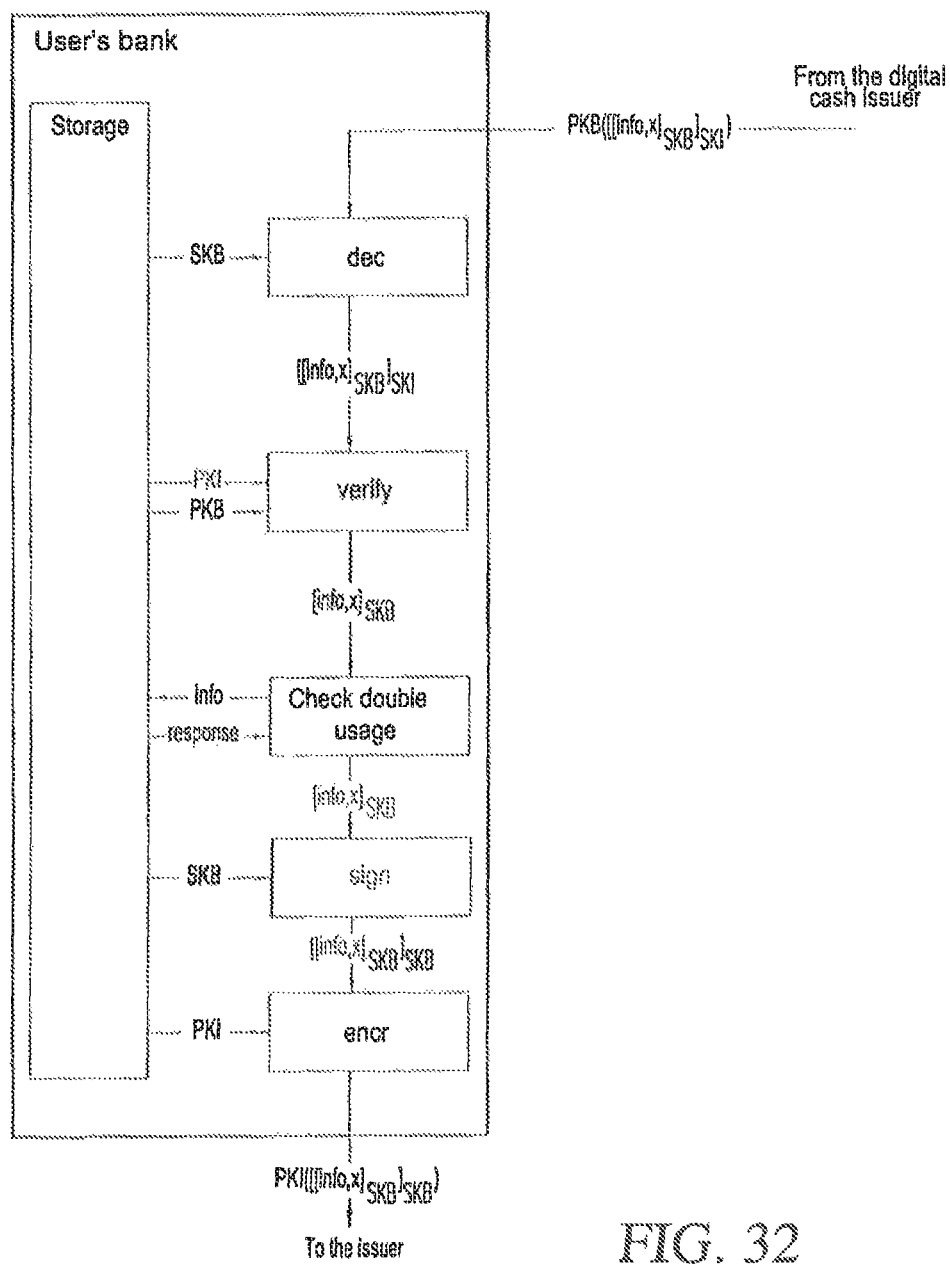
FIG. 32 is an exemplary withdrawal process part 3 according to the third embodiment.

Referring to FIG. 32, the user's bank receives PKB([[info, x]$_{SKB}$]$_{SKI}$), and the decryption program decrypts the information using the secret key of the user's bank. The signature verifying program verifies the signature of the digital cash issuer signature using the digital cash issuer's public key PKI. If the signature is valid, the signature verifying program verifies the signature of the user's bank using the public key of the user's bank. If the signature is valid, the bank determines whether the check [info,x]$_{SKB}$ was used. If the check was not used, the user's bank stores the check in the storage device, and the signature generating program signs the check [info, x]$_{SKB}$ using the secret key of the user's bank SKB. The encryption program encrypts [[info,x]$_{SKB}$]$_{SKB}$ using the digital cash issuer's public key PKI and sends PKI ([[info,x]$_{SKB}$]$_{SKB}$) to the digital cash issuer via a communications path.

Figure 33:
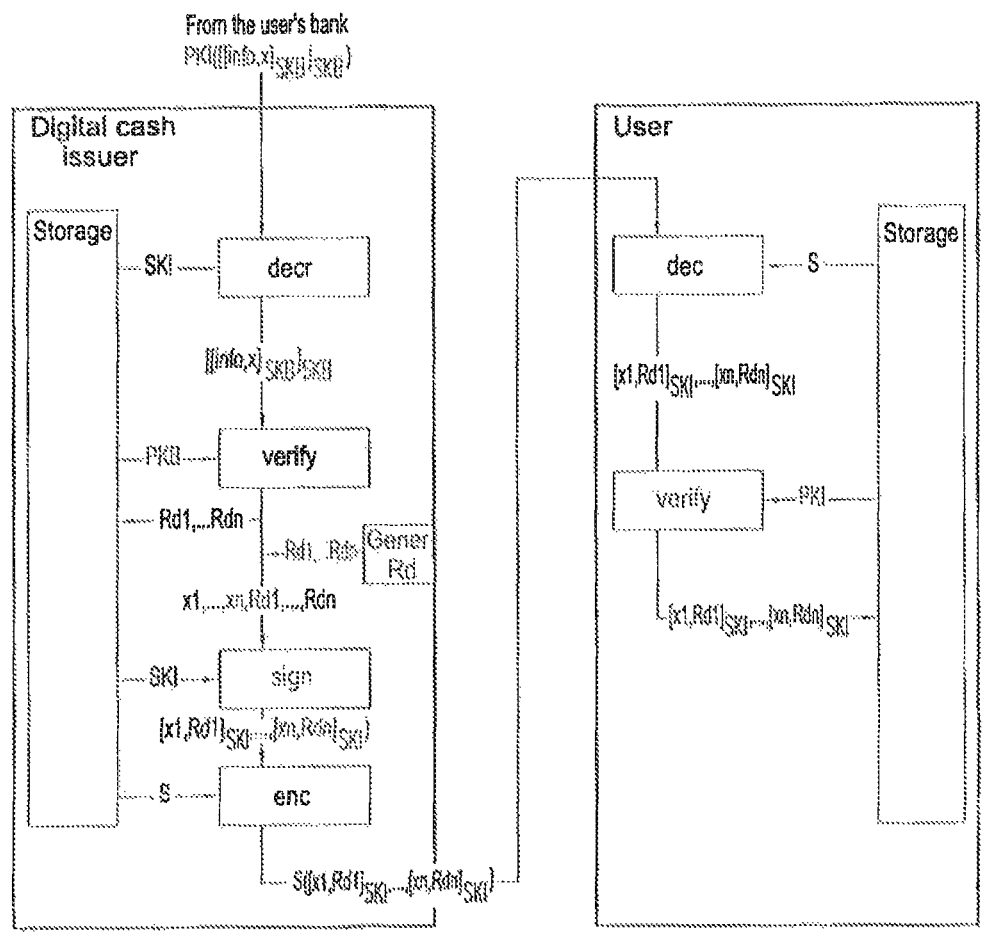
FIG. 33 is an exemplary withdrawal process part 4 according to the third embodiment.

Referring to FIG. 33, the digital cash issuer receives the encrypted information PKI([[info,x]SKB]SKB), and the decryption program decrypts the information by using the digital cash issuer's secret key SKI. The signature verifying program verifies the signature of encrypted information and the check with the user's bank secret key. If the signatures are valid, the digital cash issuer divides the amount of digital cash x to several digital cash tokens. Each digital cash token includes the following information: (i) a digital cash amount, and (ii) a random number. The digital cash issuer generates random numbers Rd1, ..., Rdn and stores them in its storage device. The signature generating program signs the digital cash amounts x1, ..., xn, and random numbers Rd1, ..., Rdn using the digital cash issuer's secret key SKI. The encryption program encrypts the signed digital cash tokens using the user-issuer shared secret key S, and sends the encrypted digital cash tokens S([x1,Rd1]SKI, ..., [xn,Rdn]SKI) to the user.

The user receives the encrypted digital cash tokens S([x1, Rd1]SKI, ..., [xn,Rdn]SKI), and the decryption program decrypts the digital cash tokens using the user-issuer shared secret key S. The signature verifying program verifies the validity of the digital cash issuer signatures using the digital cash issuer's public key PKI. If the signatures are valid, the digital cash tokens [x1,Rd1]SKI, ..., [xn,Rdn]SKI are stored in the storage device of the user. According to this embodiment, the user may easily transfer the issued digital cash token to another user who has certified pseudonym public key.

(3) Payment Procedure

The payment procedure is the same as that described above for FIGS. 10-13

Fourth Embodiment

In the previous embodiments, the withdrawal process and the payment process are done in fixed station, so the user has to go to the fixed station to buy or to get digital cash. For more convenience and accessibility for the user, the user uses mobile based device to buy and to get digital cash. The mobile based device has the minimum requirement to protect the security and privacy, because of the limit on storage and computational power.

(1) User Registration Procedure

The user registration procedure for this example is the same as described above for FIGS. 26-28.

(2) Withdrawal Procedure (Electronic Cash Issuing Procedure)

Figure 34:
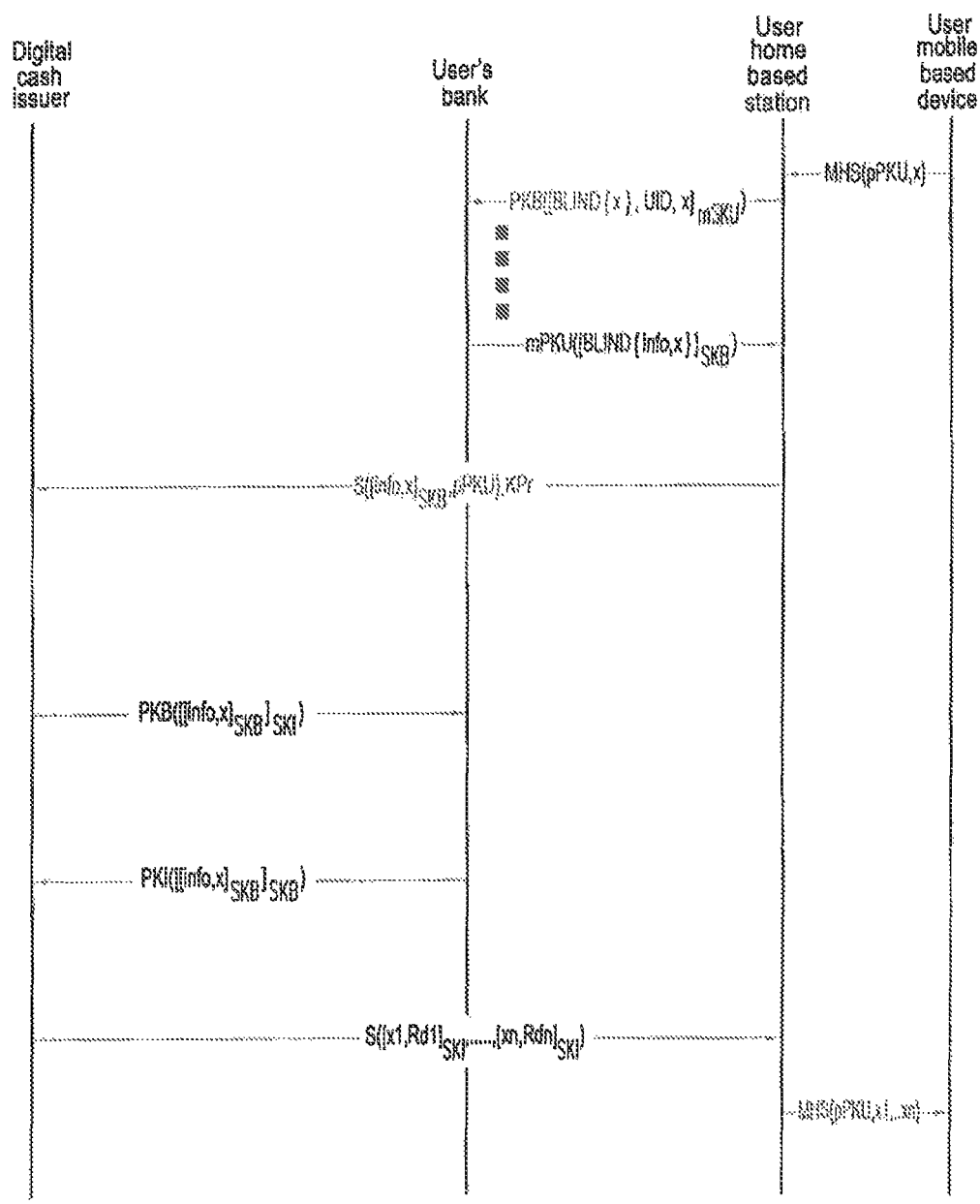
FIG. 34 is an exemplary withdrawal protocol according to the fourth embodiment.
Figure 35:
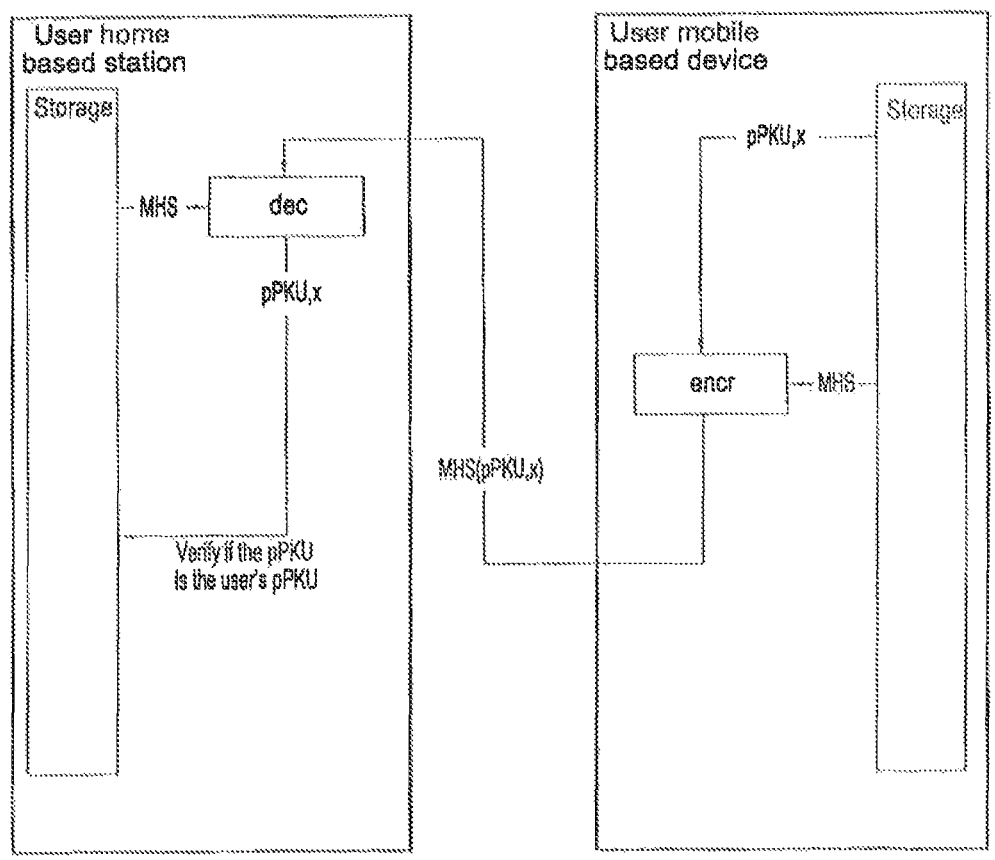
FIG. 35 is an exemplary withdrawal process part 1 according to the fourth embodiment.

FIGS. 34-38 show the diagrammatic representation of the withdrawal protocol. Referring to FIGS. 34 and 35, the user's mobile device encryption program encrypts the user's pseudonym public key pPKU and the amount of digital cash x using the mobile-home shared secret key MHS and sends the information MHS(pPKU,x) to the user's station.

The user's station receives the encrypted user's pseudonym public key and the amount of digital cash MHS(pPKU, x). The decryption program decrypts the information using the mobile-home shared secret key MHS and determines whether the decrypted key matches the user's pseudonym public key. The keys match, the user's mobile device is authenticated.

Figure 36:
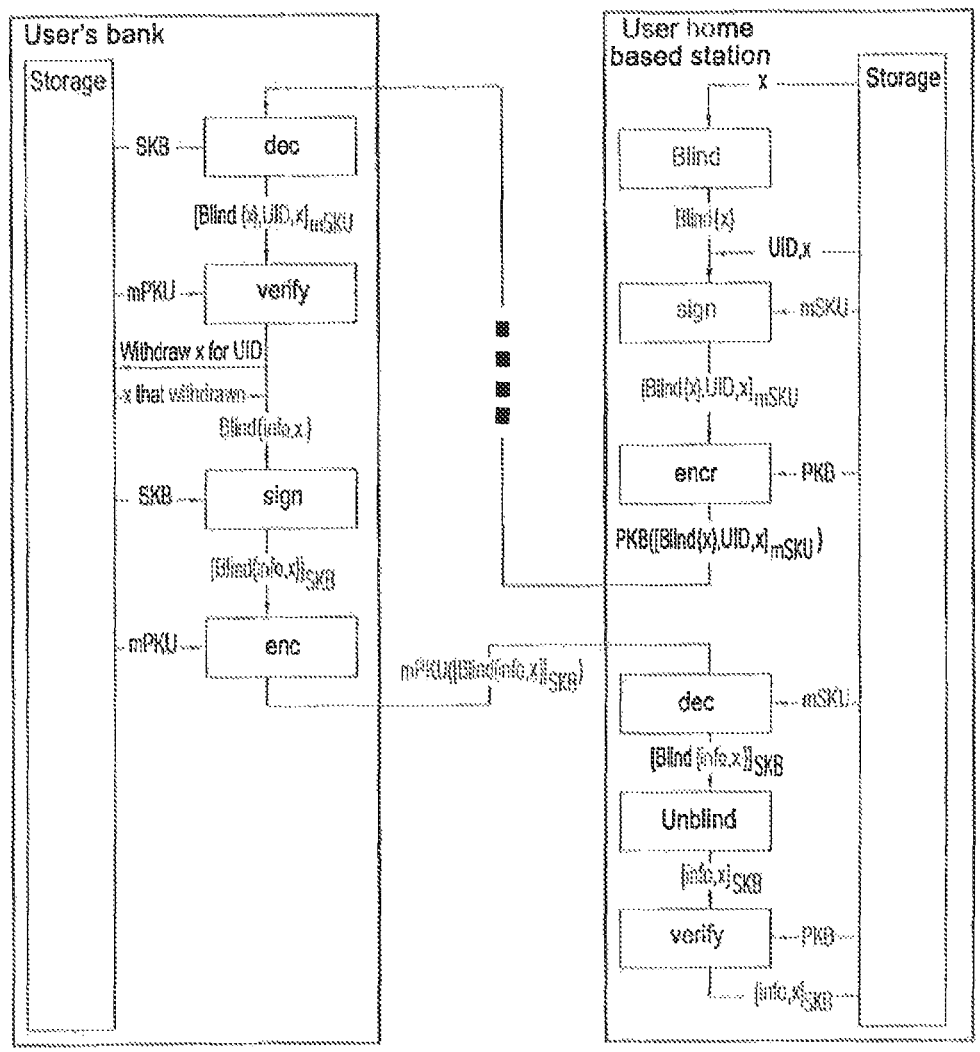
FIG. 36 is an exemplary withdrawal process part 2 according to the fourth embodiment.

Referring to FIG. 36, the user station blinds the amount of digital cash x using any well known blinding signature scheme. The signature generating program signs the blinded amount of digital cash Blind {x}, the user real identification UID, and the amount of money to be withdrawn x using the user's master secret key mSKU. The encryption program encrypts the information using the public key of the user's bank PKB and sends PKB([Blind{x},UID,x]$_{mSKU}$) to the user's bank via a communications path.

The user's bank decryption program decrypts PKB ([Blind{x},UID,x]$_{mSKU}$) using the user's bank's secret key SKB. The signature verifying program verifies the validity of the signature for authentication using the master public key of the user mPKU. If the signature is valid, the amount of money x is withdrawn from the user account. The signature generating program signs the blinded information and the amount of digital cash amount Blind(info,x), which may be created through cooperation between the user's bank and the user station using any well known blind signature scheme), using the bank's secret key SKB. The encryption program encrypts [Blind{info,x}]$_{SKB}$ using the master public key of the user mPKU and sends mPKU([BLIND{info,x}]$_{SKB}$) to the user station via a communications path.

The user receives mPKU([BLIND{info,x}]$_{SKB}$), and the decryption program decrypts the information using the user's master secret key mSKU. The blind signature scheme unblinds the signed blinded information and the amount of digital cash. The user signature verifying program verifies the validity of the bank's signature using the public key of the user's bank PKB. If the signatures is valid, the user stores the signed information and the amount of digital cash [info,x]$_{SKB}$ as a check in the storage device.

Figure 37:
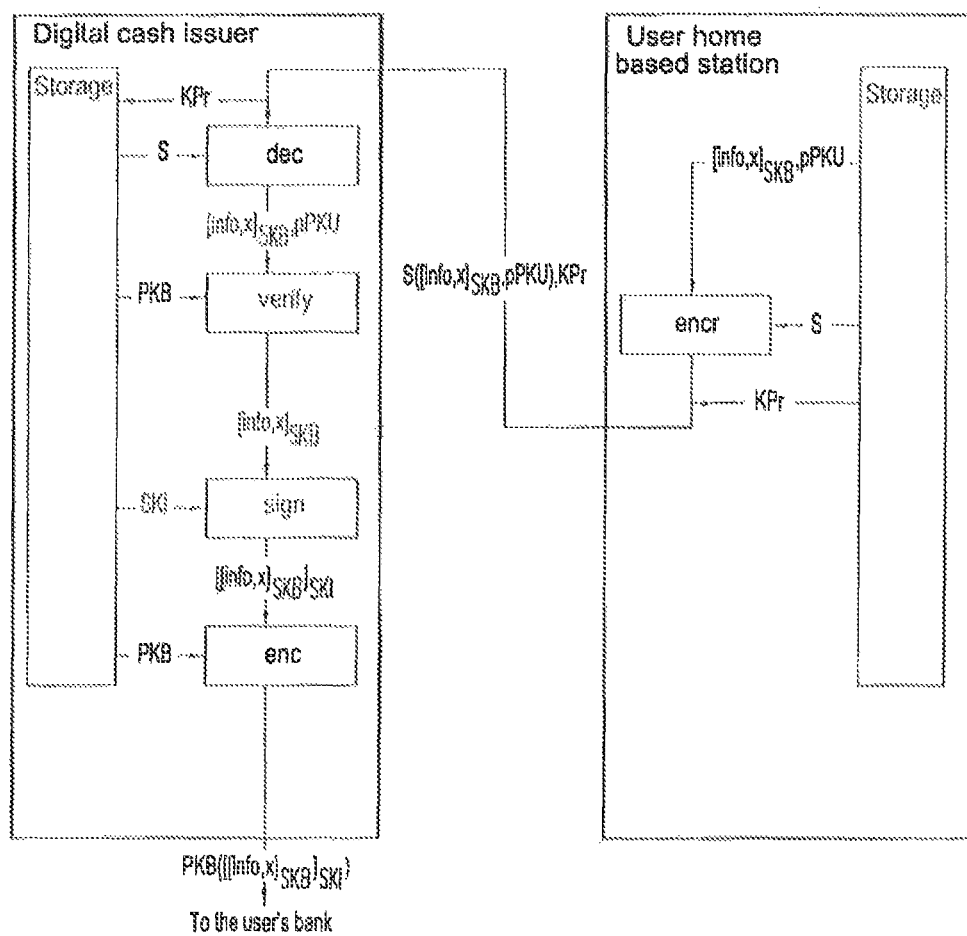
FIG. 37 is an exemplary withdrawal process part 3 according to the fourth embodiment.

Referring to FIG. 37, the user station encryption program encrypts the check [info,x]$_{SKB}$ and the user's pseudonym public key pPKU using the user-issuer shared secret key S and sends S([info,x]$_{SKB}$,pPKU) and the key pointer KPr to the digital cash issuer.

The digital cash issuer receives S([info,x]$_{SKB}$,pPKU) and the key pointer KPr. The digital cash issuer searches for the user-issuer shared secret key S using the key pointer KPr. The decryption program decrypts S([info,x]$_{SKB}$,pPKU) using the user-issuer shared secret key S to authenticate the user by matching the decrypted key with the user's pseudonym public key. If the keys match, the user is authenticated, and the digital cash issuer signature generating program verifies the signature of the bank [info,x]$_{SKB}$ using the public key of the user's bank PKB. If the signature is valid, the digital cash issuer signature generating program signs the check [info,x]$_{SKB}$ using the digital cash issuer's secret key SKI. The encryption program encrypts ([[info,x]$_{SKB}$]$_{SKI}$ using the public key of the user's bank PKB and sends PKB([[info,x]$_{SKB}$]$_{SKI}$) to the user's bank via a communications path.

Figure 38:
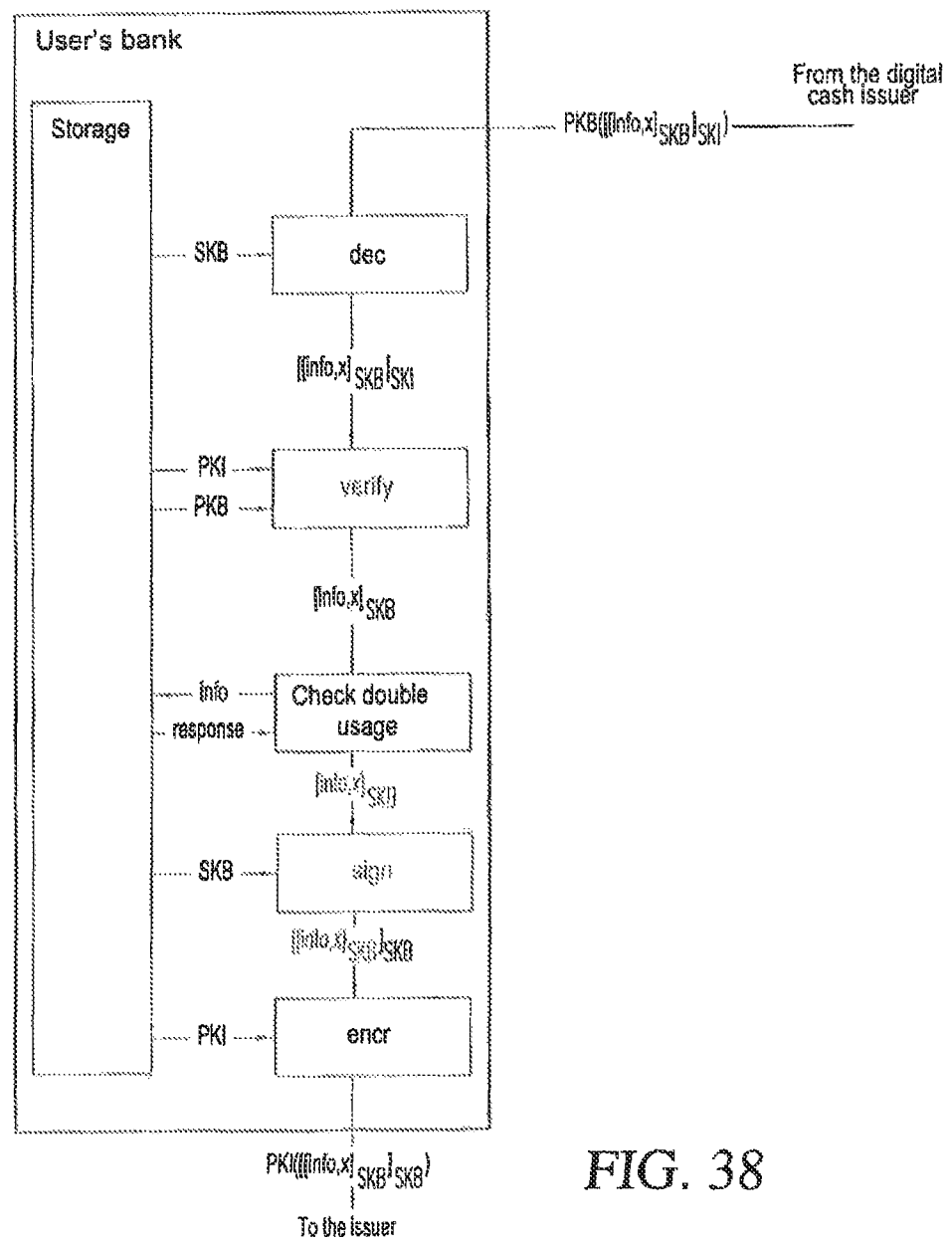
FIG. 38 is an exemplary withdrawal process part 4 according to the fourth embodiment.

Referring to FIG. 38, the user's bank receives PKB([[info, x]$_{SKB}$]$_{SKI}$), and the decryption program decrypts the information using the secret key of the user's bank. The signature verifying program verifies the signature of the digital cash issuer signature using the digital cash issuer's public key PKI. If the signature is valid, the signature verifying program verifies the signature of the user's bank using the public key of the user's bank. If the signature is valid, the bank determines whether the check [info,x]$_{SKB}$ was used. If the check was not used, the user's bank stores the check in the storage device and the signature generating program signs the check [info, x]$_{SKB}$ using the secret key of the user's bank SKB. The encryption program encrypts [[info,x]$_{SKB}$]$_{SKB}$ using the digital cash issuer's public key PKI and sends PKI ([[info,x]$_{SKB}$]$_{SKB}$) to the digital cash issuer via a communications path.

Figure 39:
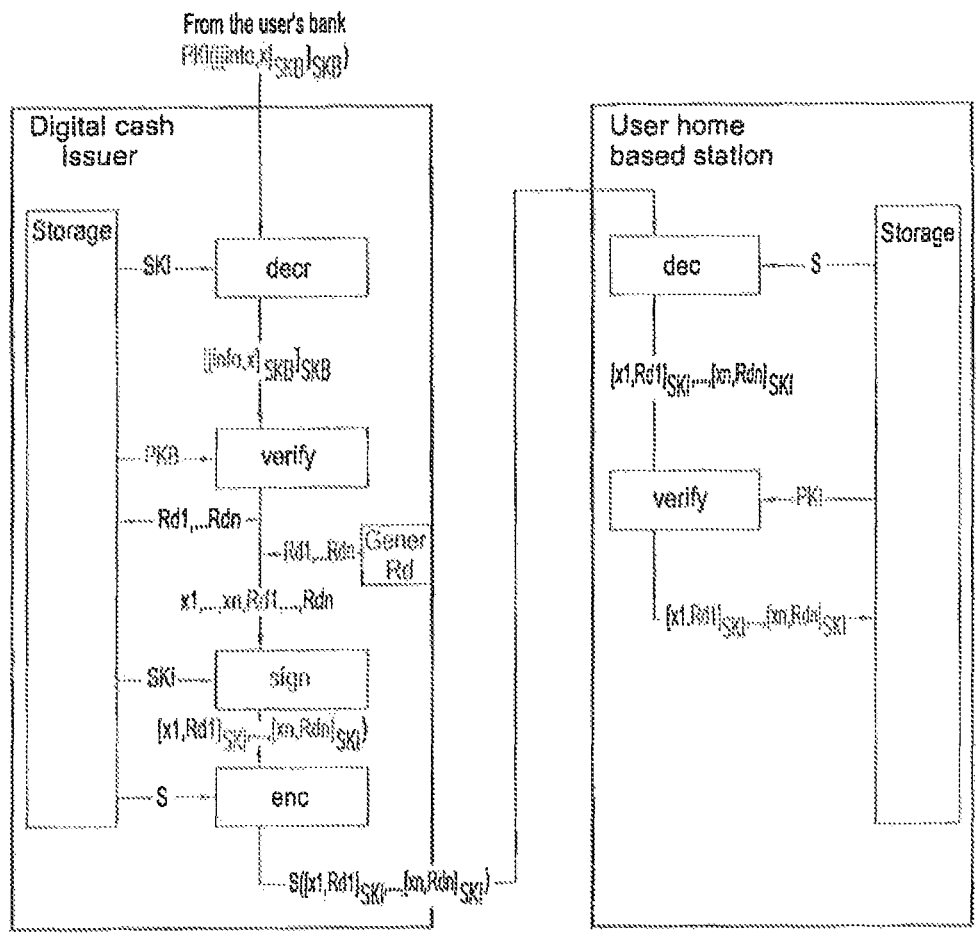
FIG. 39 is an exemplary withdrawal process part 5 according to the fourth embodiment.

Referring to FIG. 39, the digital cash issuer receives the encrypted information PKI([[info,x]SKB]SKB), and the decryption program decrypts the information by using the digital cash issuer's secret key SKI. The signature verifying program verifies the signature of encrypted information and the check with the user's bank secret key. If the signatures are valid, the digital cash issuer divides the amount of digital cash x to several digital cash tokens. Each digital cash token includes the following information: (i) a digital cash amount, and (ii) a random number. The digital cash issuer generates random numbers Rd1, ..., Rdn and stores them in its storage device. The signature generating program signs the digital cash amounts x1, ..., xn, and random numbers Rd1, ..., Rdn using the digital cash issuer's secret key SKI. The encryption program encrypts the signed digital cash tokens using the user-issuer shared secret key S, and sends the encrypted digital cash tokens S([x1,Rd1]SKI, ..., [xn,Rdn]SKI) to the user's home station via a communications path.

The user's home station receives the encrypted digital cash tokens S([x1,Rd1]SKI, ..., [xn,Rdn]SKI), and the decryption program decrypts the digital cash tokens using the user-issuer shared secret key S. The signature verifying program verifies the validity of the digital cash issuer signatures using the digital cash issuer's public key PKI. If the signatures are valid, the digital cash tokens [x1,Rd1]SKI, ..., [xn,Rdn]SKI are stored in the storage device of the user's home station.

Figure 40:
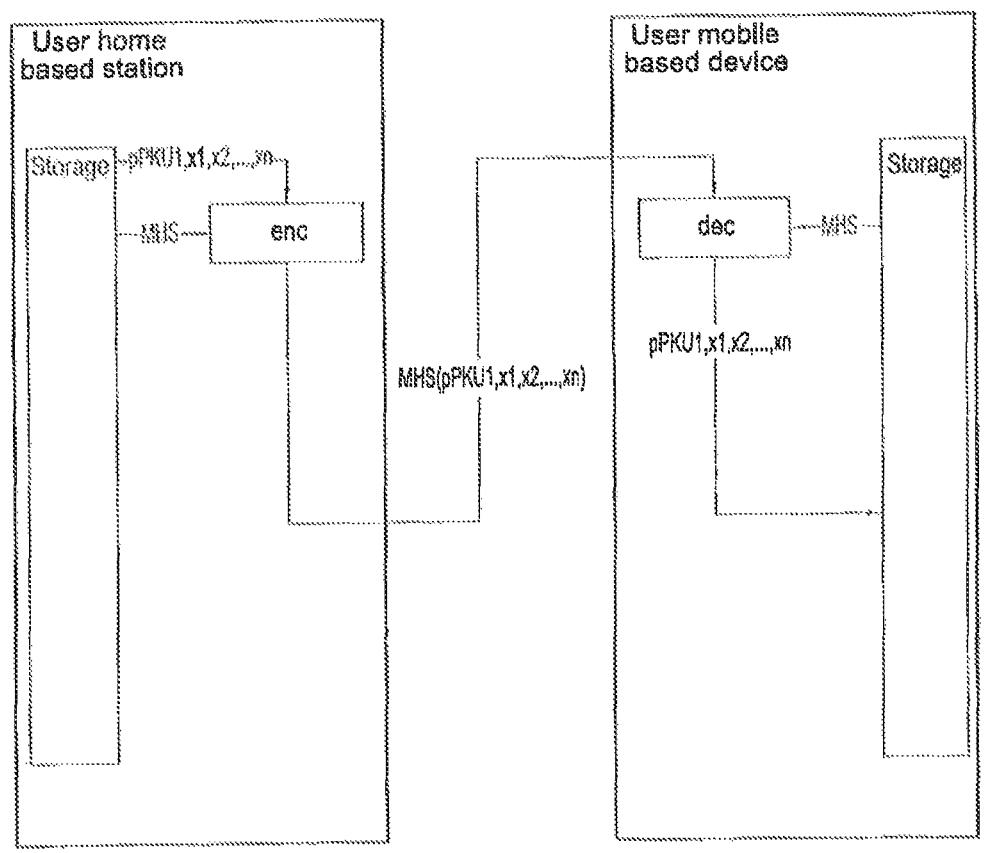
FIG. 40 is an exemplary withdrawal process part 6 according to the fourth embodiment.

Referring to FIG. 40, the user's home station encryption program encrypts the values of the digital cash tokens x1, ..., xn and the user's pseudonym public key pPKU using the mobile/home shared secret key MHS, and sends the encrypted information MHS(pPKU,x1, ..., xn) to the user's mobile device via a communications path.

The user's mobile device receives the encrypted values of the digital cash tokens and the user's pseudonym public key MHS(pPKU,x1, ..., xn), and the decryption program decrypts the information using the mobile/home shared secret key MHS. The user's mobile device determines whether the decrypted user's pseudonym public key and the user's pseudonym public key match to authenticate the user's home station. If the user's pseudonym public keys match, the user mobile device stores the values of digital cash tokens in its storage device. According to this embodiment, the user may easily transfer the issued digital cash token to another user who has certified pseudonym public key.

(3) Payment Procedure

The payment procedure is the same as that described above for FIGS. 21-25.

Fifth Embodiment

The previous embodiments described above are implemented as off-line protocols. However, these protocols may be modified for on-line operation. One possible example follows.

(1) User Registration Procedure

The user registration protocol is the same as described above for FIGS. 2-4.

(2) Withdrawal Procedure (Electronic Cash Issuing Procedure)

The withdrawal procedure is the same as that described above for FIGS. 5-9.

(3) Payment Procedure

Figure 41:
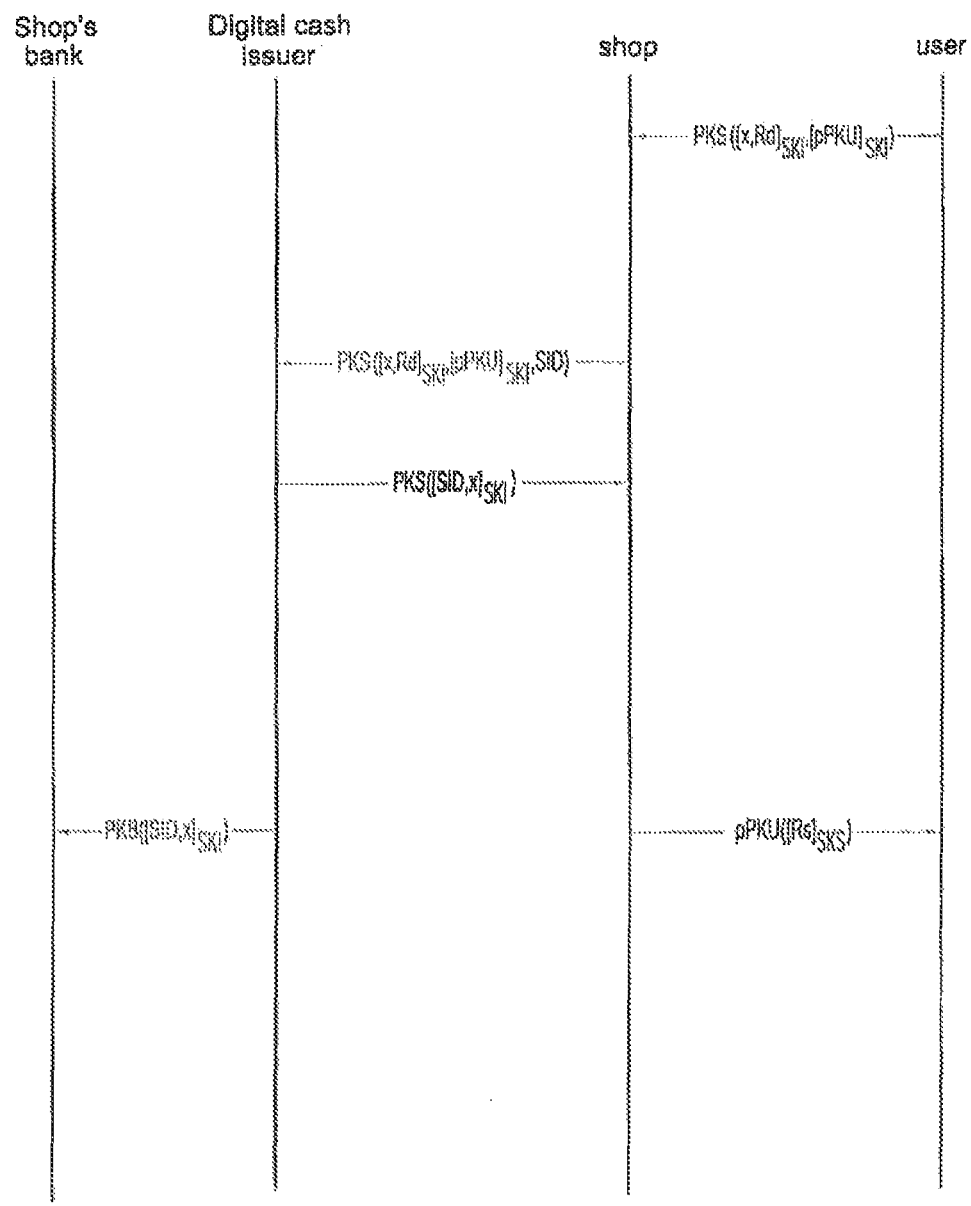
FIG. 41 is an exemplary payment protocol according to the fifth embodiment.
Figure 42:
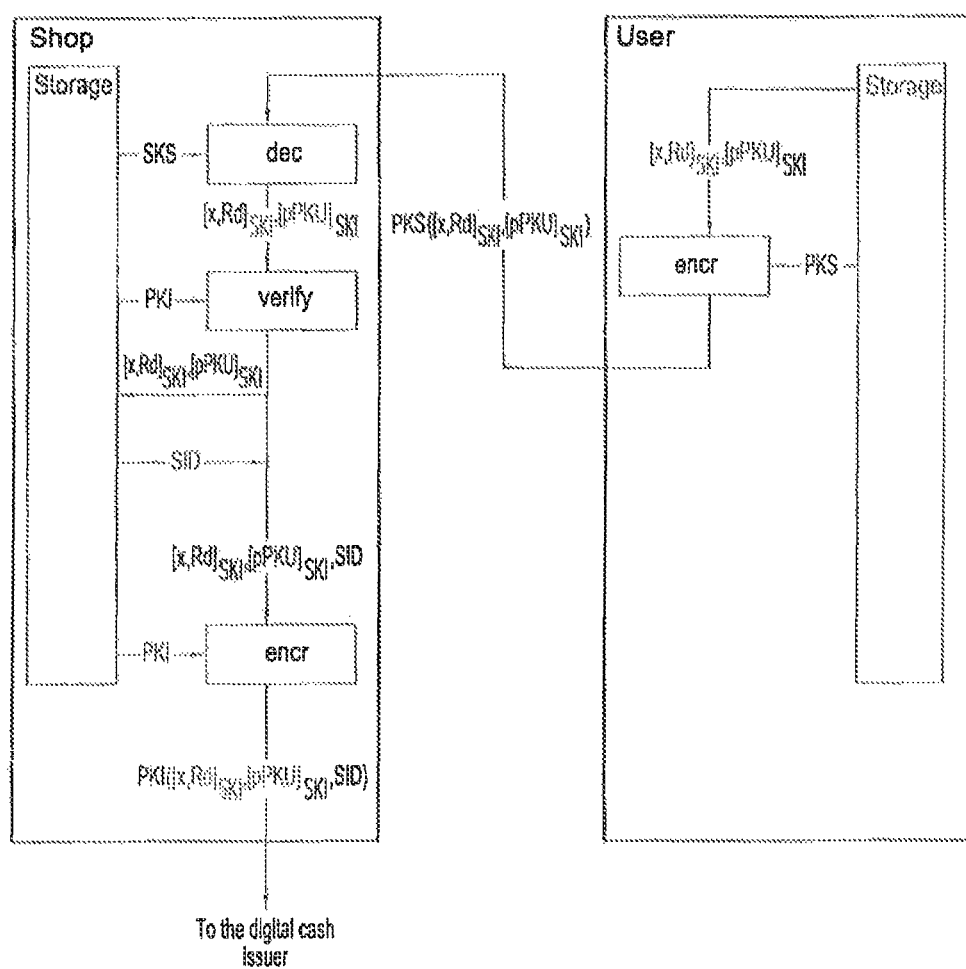
FIG. 42 is an exemplary payment process part 1 according to the fifth embodiment.

FIGS. 41-45 show a diagrammatic representation of the payment protocol. Referring to FIGS. 41 and 42, the user encryption program encrypts the digital cash token [x,Rd] SKI and the digital cash issuer license [pPKU]SKI using the public key of the shop PKS, and sends the encrypted information to the shop as request for payment.

The user can send a payment request using another certified pseudonym public key, because the pseudonym is not associated with digital cash token. As a result, the pseudonym may be changed at the time of payment thereby increasing user payment options.

The shop decryption program decrypts the encrypted digital cash token and the digital cash issuer license PKS([x,Rd] SKI, [pPKU]SKI) using the shop's secret key SKS. The signature verifying program verifies the signature of the issuer with the digital cash issuer public key PKI. If the signatures are valid, the shop encryption program encrypts the digital cash token [x,Rd]SKI, the user's digital cash issuer license [pPKU]SKI, and the shop identification SID using the public key of the digital cash issuer PKI, and sends the encrypted digital cash token PKI([x,Rd]SKI, [pPKU]SKI, SID) to the digital cash issuer via a communications path.

Figure 43:
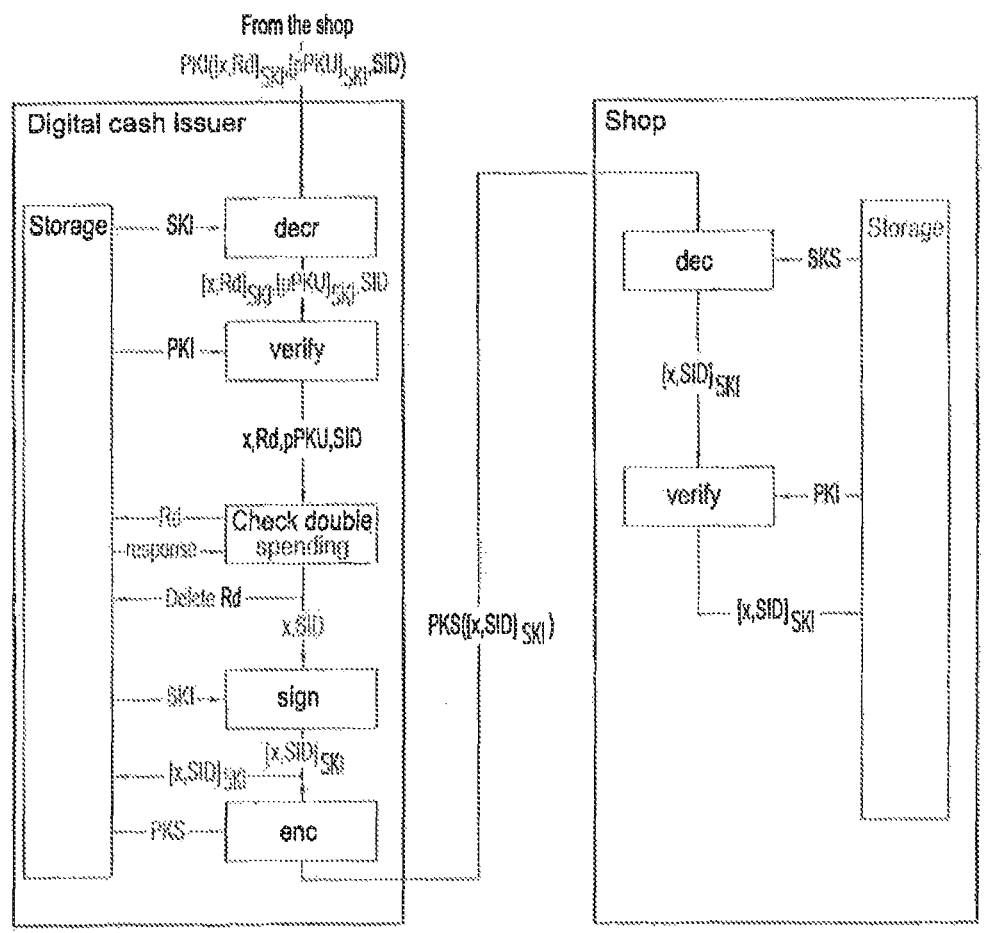
FIG. 43 is an exemplary payment process part 2 according to the fifth embodiment.

Referring to FIG. 43, the digital cash issuer decryption program decrypts the encrypted digital cash token PKI([x, Rd]SKI, [pPKU]SKI, SID) using the secret key of the digital cash issuer SKI. The signature verifying program verifies the validity of the digital cash token using the digital cash issuer's public key PKI. If the signature is valid, the digital cash issuer determines whether the token has already been spent. If the token has not been spent, the random number is deleted. The digital cash issuer signature generating program signs the shop identification SID and the amount of digital cash x with the digital cash issuer's secret key SKI and stores [SID,x]SKI temporarily, to send it to the shop's bank. The encryption program encrypts the information using the public key of the shop PKS, and sends the encrypted information PKS([SID, x]SKI) to the shop via a communications path.

Figure 44:
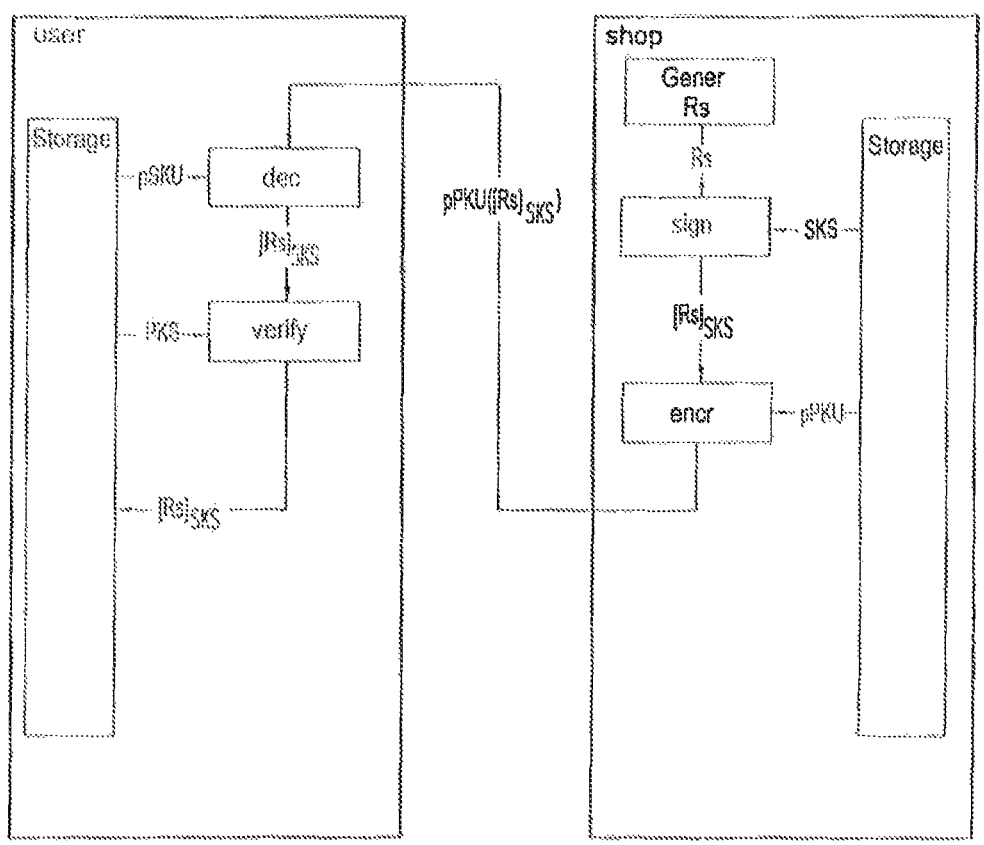
FIG. 44 is an exemplary payment process part 3 according to the fifth embodiment.

The shop receives PKS([SID,x]$_{SKI}$) and the decryption program decrypts the information using the secret key SKS. The signature verifying program verifies the signature with the public key of the issuer PKI. Referring to FIG. 44, if the signature is valid, the shop random number generating program generates a random number Rs then the signature generating program signs Rs with the shop's secret key SKS. The encryption program encrypts the signed random number [Rs]$_{SKS}$ using the user's pseudonym public key pPKU and sends pPKU([Rs]$_{SKS}$) to the user via a communications path.

The user receives pPKU([Rs]$_{SKS}$) and the decryption program decrypts it using the user's pseudonym secret key pSKU and stores [Rs]$_{SKB}$ in the storage device.

Figure 45:
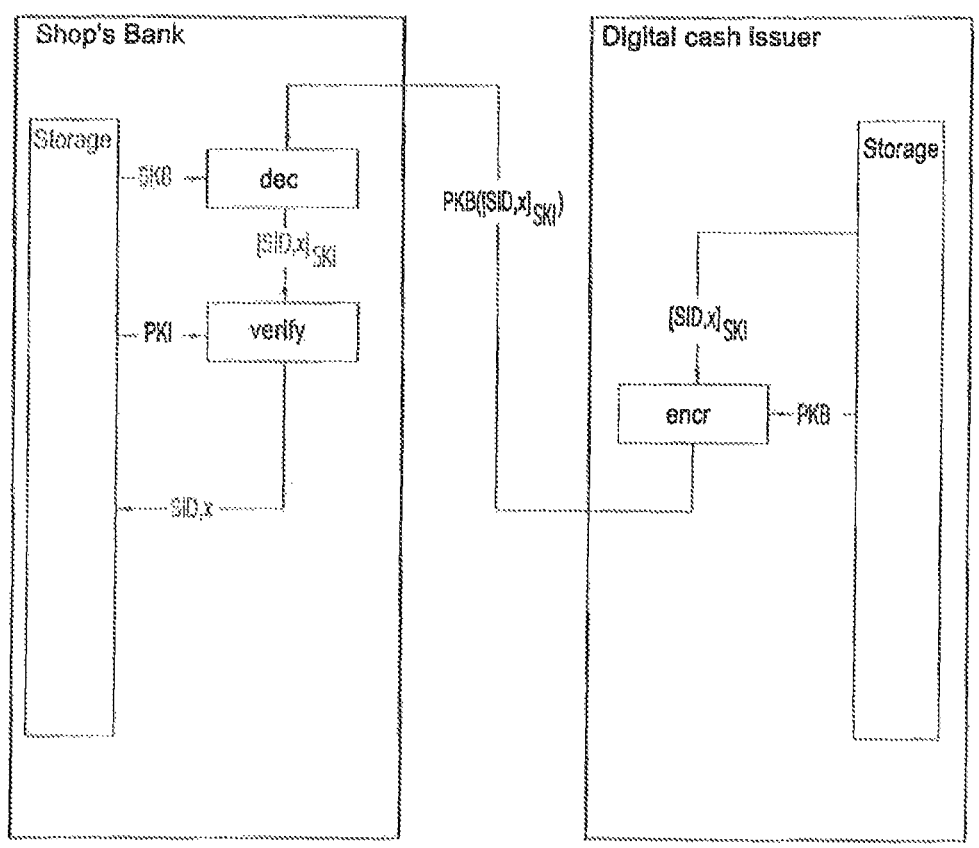
FIG. 45 is an exemplary payment process part 4 according to the fifth embodiment.

Referring to FIG. 45, the digital cash issuer retrieves the signed shop identification SID and the signed amount x to be deposited for the shop [SID,x]$_{SKI}$, and the encryption program encrypts the information by using the public key of the shop's bank PKB before it sends PKB([SID,x]$_{SKI}$) to the shop's bank via a communications path.

The shop's bank receives PKB([SID,x]$_{SKI}$), and the decryption program decrypts the information using the secret key SKB. The signature verifying program verifies the signature with the public key of the issuer PKI. If the signature is valid, the shop's bank adds the amount of money x to the shop account.

Sixth Embodiment

This is an online protocol with a mobile device.

(1) User Registration Procedure

The user registration procedure for this example is the same as described above for FIGS. 2-4.

(2) Withdrawal Procedure (Electronic Cash Issuing Procedure)

The withdrawal procedure for this example is the same as described above for FIGS. 14-20.

(3) Payment Procedure

Figure 46:
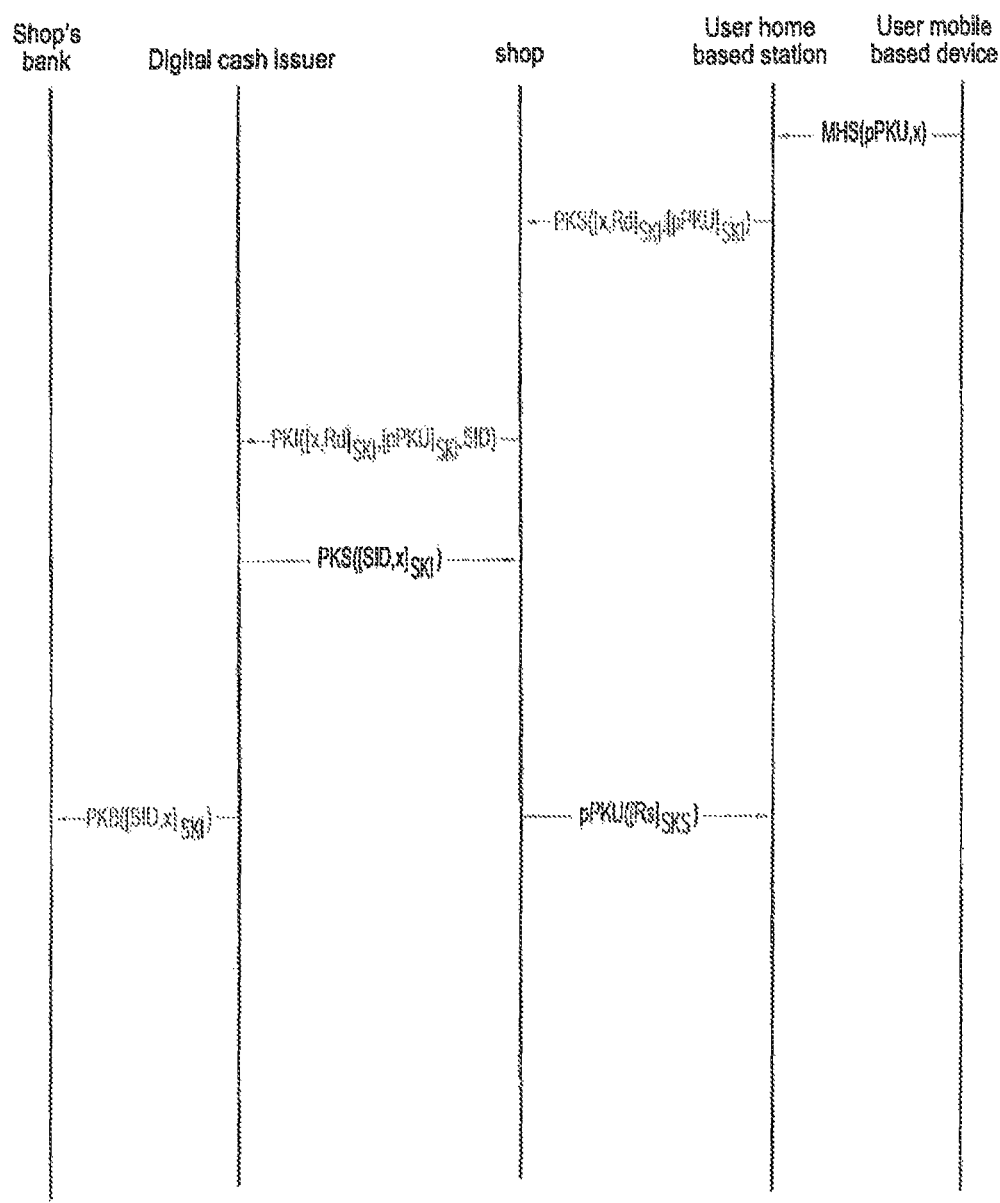
FIG. 46 is an exemplary payment protocol according to the sixth embodiment.
Figure 47:
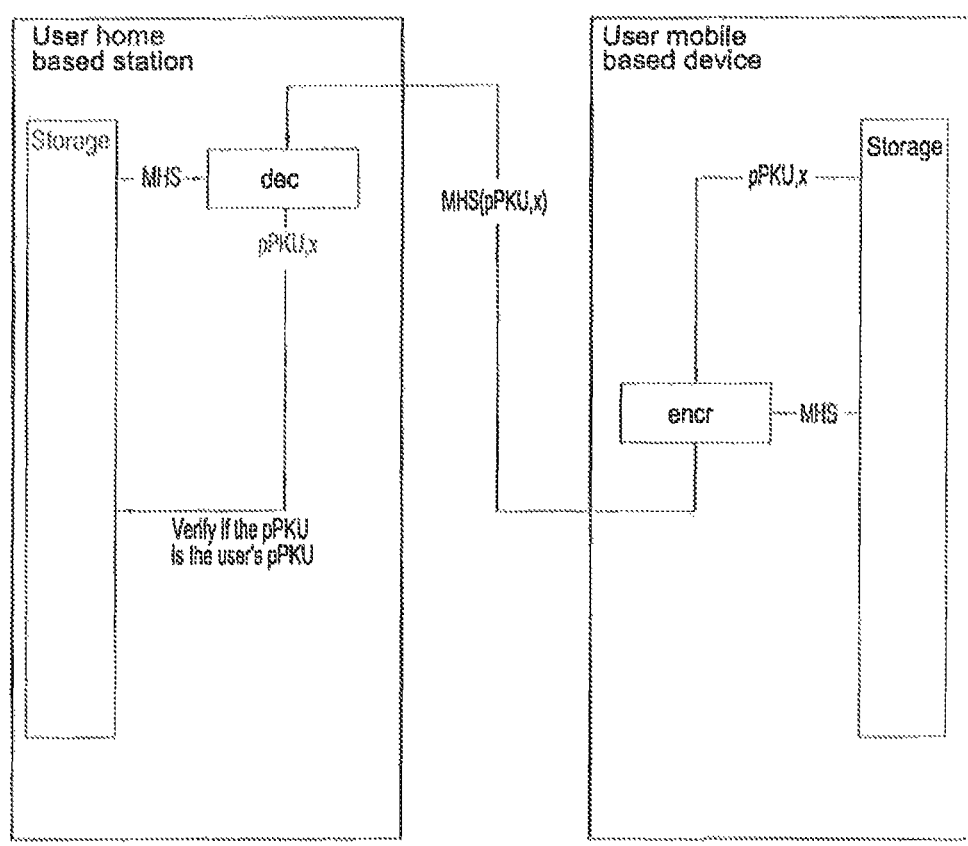
FIG. 47 is an exemplary payment process part 1 according to the sixth embodiment.

FIGS. 46-51 show a diagrammatic representation of the payment protocol. Referring to FIGS. 46 and 47, the user's mobile device chooses the value of the digital cash token x, and the encryption program encrypts the value and the user's pseudonym public key pPKU using the mobile/home shared secret key MHS. The mobile device sends the encrypted information MHS(pPKU,x) to the user's home station via a communications path.

The user's home station receives the encrypted information MHS(pPKU,x), and the decryption program decrypts the information using the mobile/home shared secret key MHS. The user's home station determines if user's pseudonym public key matches the decrypted pseudonym public key to authenticate the user's mobile based device. If the user's pseudonym public key matches, the mobile device is authenticated and the user's home station finds the digital cash token that is equivalent to the value that is sent by the user's mobile device.

Figure 48:
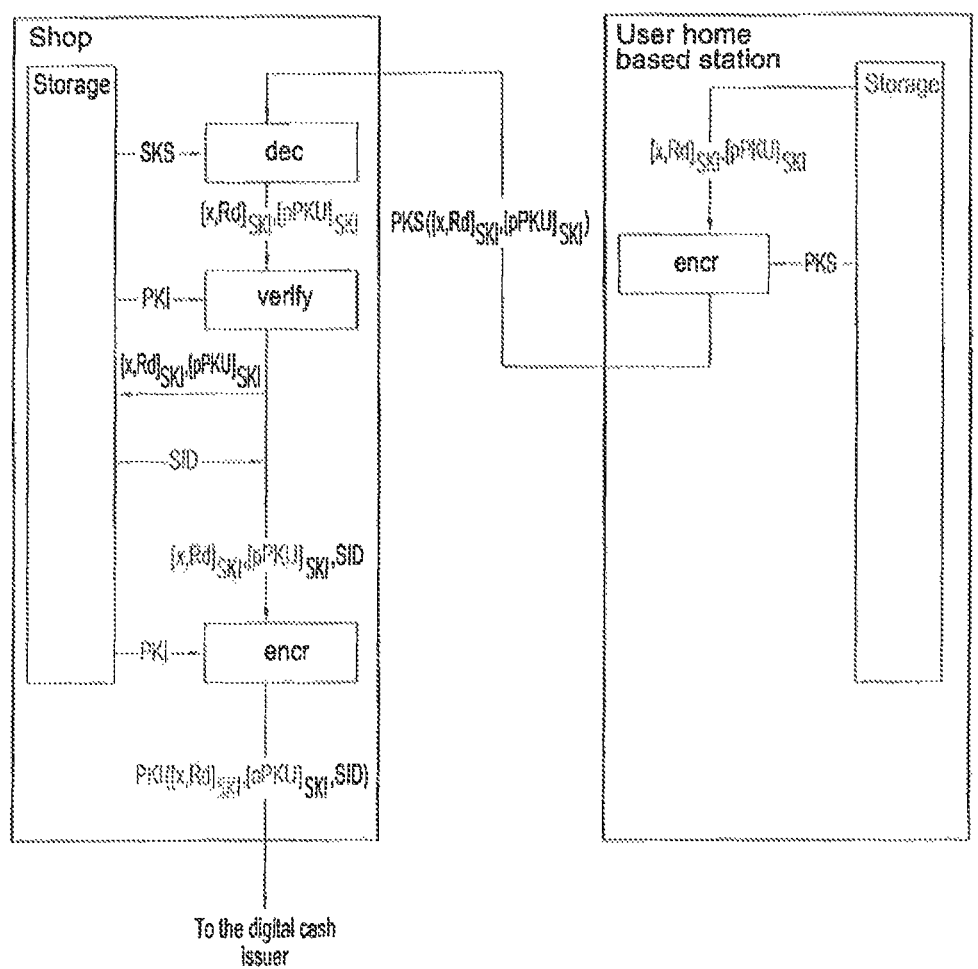
FIG. 48 is an exemplary payment process part 2 according to the sixth embodiment.

Referring to FIG. 48, the user's home station encryption program encrypts the digital cash token [x,Rd]SKI and the digital cash issuer license [pPKU]SKI using the public key of the shop PKS. The user's home station sends the encrypted information to the shop via a communications path as request for payment.

The user's home based station can send a payment request using another certified pseudonym public key, because the pseudonym is not associated with digital cash token. As a result, the pseudonym may be changed at the time of payment thereby increasing user payment options.

The shop decrypts decryption program the encrypted digital cash token and the digital cash issuer license PKS([x,Rd]SKI, [pPKU]SKI) using the shop's secret key SKS. The signature verifying program verifies the signature of the issuer with the digital cash issuer public key PKI. If the signature is valid, the shop encryption program encrypts the digital cash token [x,Rd]SKI, the user's digital cash issuer license [pPKU]SKI, and the shop identification SID using the public key of the digital cash issuer PKI, and sends the encrypted digital cash token PKI([x,Rd]SKI, [pPKU]SKI, SID) to the digital cash issuer via a communications path.

Figure 49:
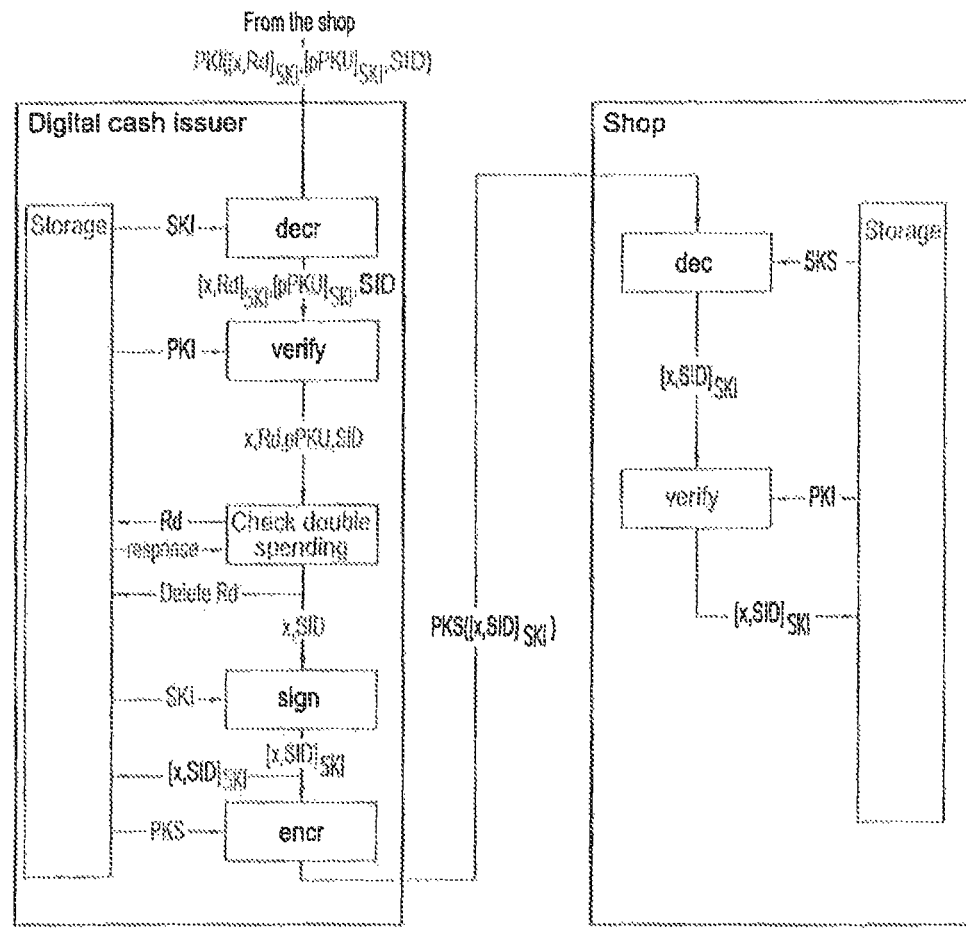
FIG. 49 is an exemplary payment process part 3 according to the sixth embodiment.

Referring to FIG. 49, the digital cash issuer decryption program decrypts the encrypted digital cash token PKI([x, Rd]SKI, [pPKU]SKI, SID) using the secret key of the digital cash issuer SKI. The signature verifying program verifies the validity of the digital cash token using the digital cash issuer's public key PKI. If the signature is valid, the digital cash issuer determines whether the token has already been spent. If the token has not been spent, the random number is deleted, and the digital cash issuer signature generating program signs the shop identification SID and the amount of digital cash x with the digital cash issuer's secret key SKI. The cash issuer then stores [SID,x]SKI temporarily, to send it to the shop's bank, and the encryption program encrypts the information using the public key of the shop PKS, then sends the encrypted information PKS([SID,x]SKI) to the shop via a communications path.

Figure 50:
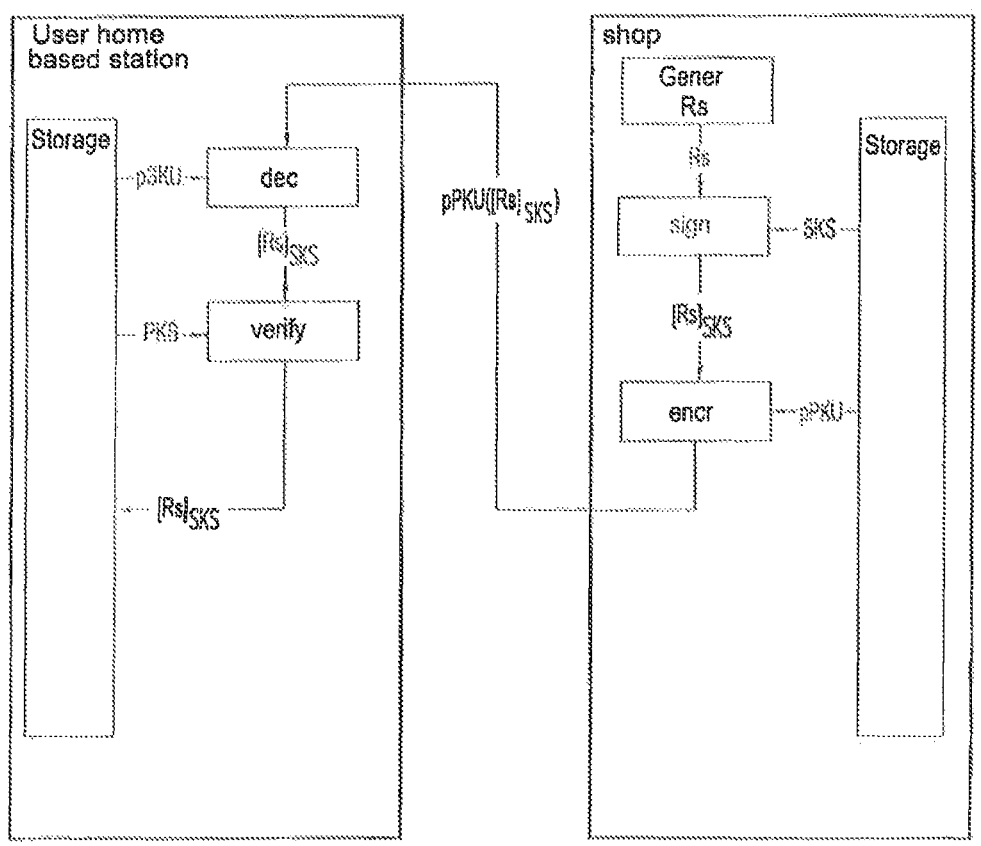
FIG. 50 is an exemplary payment process part 4 according to the sixth embodiment.

The shop receives PKS([SID,x]$_{SKI}$), and the decryption program decrypts the information using the secret key SKS. The signature verifying program verifies the signature with the public key of the issuer PKI. Referring to FIG. 50, if the signature is valid, the shop random number generating program generates a random number Rs and the signature generating program signs Rs with the shop's secret key SKS. The encryption program encrypts the signed random number [Rs]$_{SKS}$ using the user's pseudonym public key pPKU and sends pPKU([Rs]$_{SKS}$) to the user station via a communications path.

The user station receives pPKU([Rs]$_{SKS}$). The decryption program decrypts the information using the user's pseudonym secret key pSKU and stores [Rs]$_{SKS}$ in the storage device.

Figure 51:
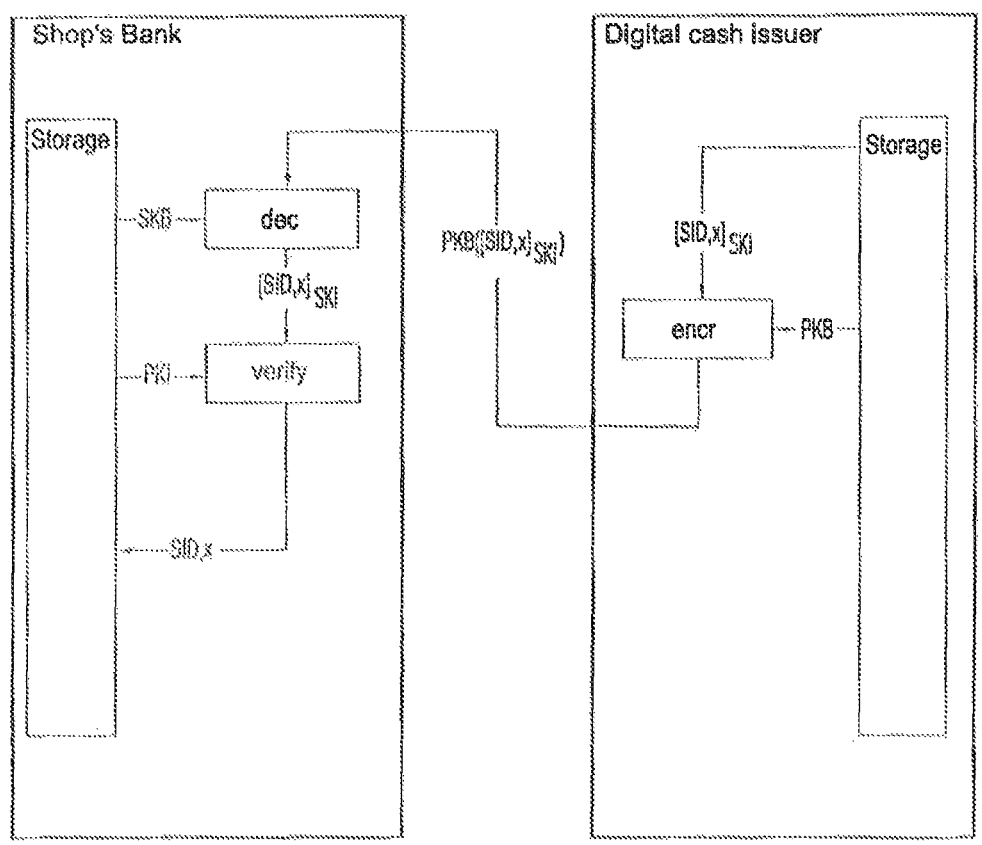
FIG. 51 is an exemplary payment process part 5 according to the sixth embodiment.
Figure 52:
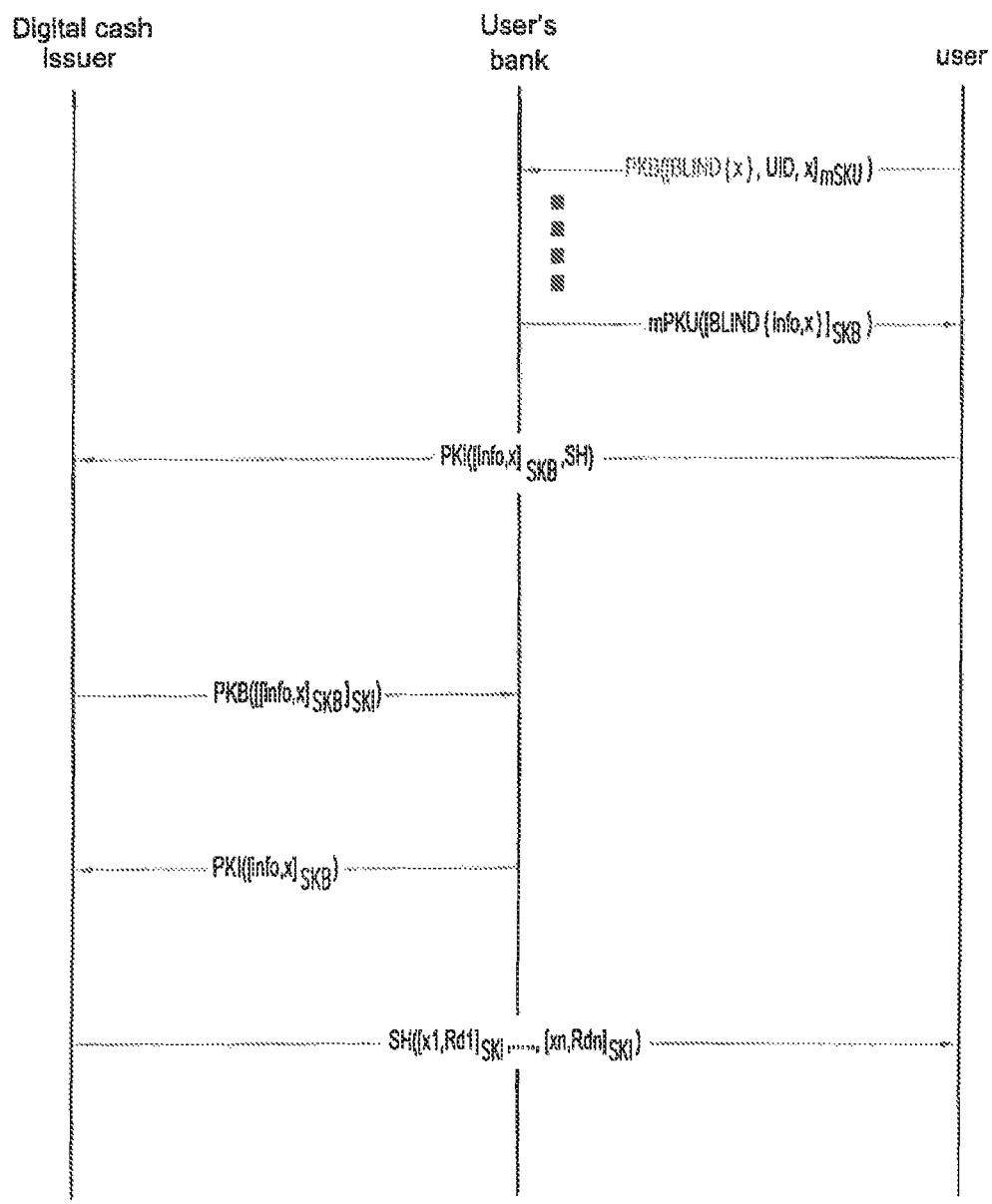
FIG. 52 is an exemplary withdrawal protocol according to the seventh embodiment.
Figure 53:
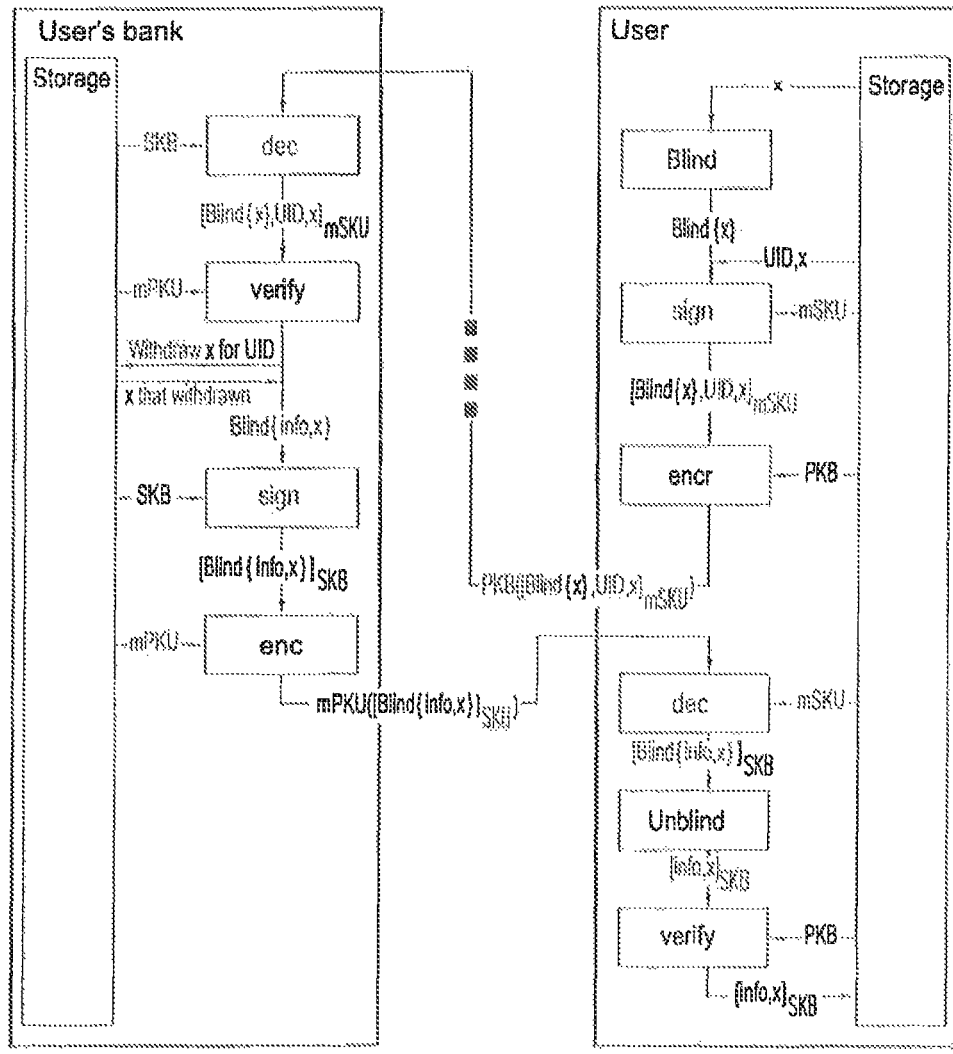
FIG. 53 is an exemplary withdrawal process part 1 according to the seventh embodiment.
Figure 54:
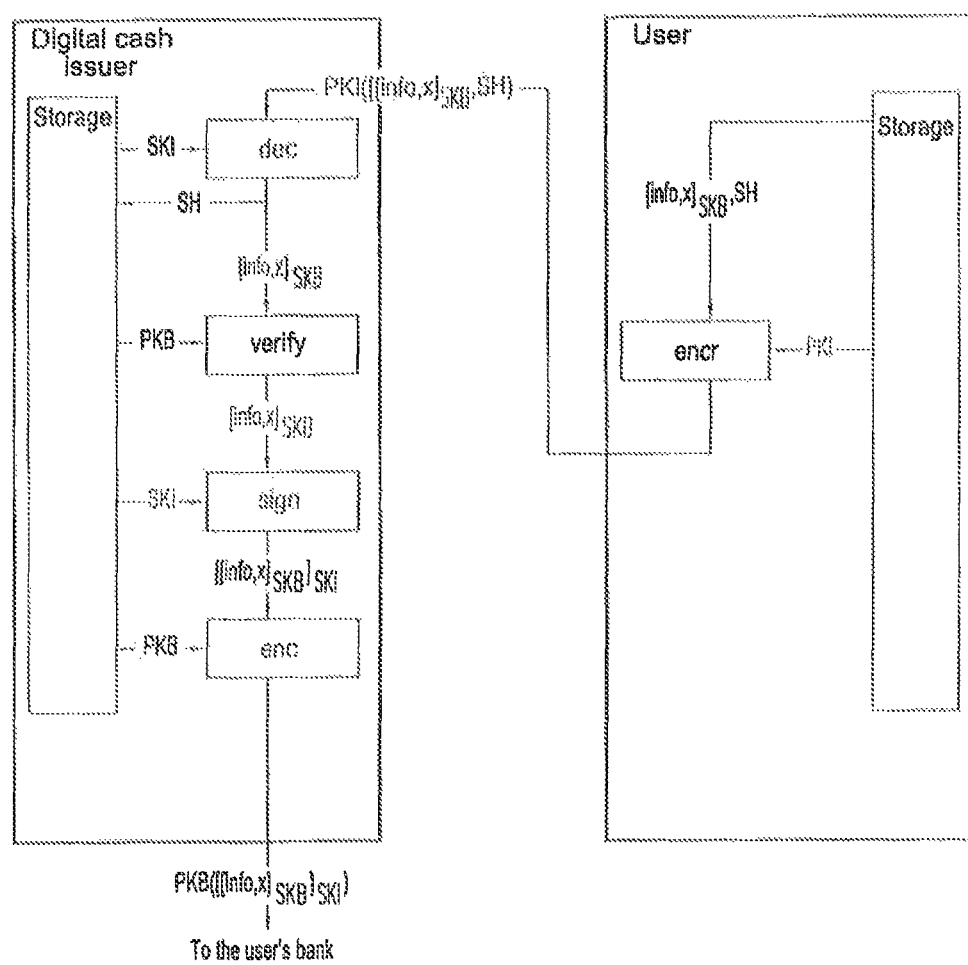
FIG. 54 is an exemplary withdrawal process part 2 according to the seventh embodiment.

Referring to FIG. 51, the digital cash issuer retrieves the signed shop identification SID and the signed amount x to be deposited for the shop [SID,x]$_{SKI}$. The encryption program encrypts the information using the public key of the shop's bank PKB and sends PKB([SID,x]$_{SKI}$) to the shop's bank via a communications path.

The shop's bank receives PKB([SID,x]$_{SKI}$), and the decryption program decrypts the information by using the secret key SKB. The signature verifying program verifies the signature with the public key of the issuer PKI. If the signature is valid, the shop's bank adds the amount of money x to the shop account.

Seventh Embodiment (1) Withdrawal Procedure (Electronic Cash Issuing Procedure)

FIGS. 52-56 show the diagrammatic representation of the withdrawal protocol. Referring to FIGS. 5 and 6, the user blinds the amount of digital cash x using any proposed blinding signature scheme, and the signature generating program signs the blinded amount of digital cash Blind{x}, the user real identification UID, and the amount of money to be withdrawn x using the user's master secret key mSKU. The encryption program encrypts the information by using the public key of the user's bank PKB and sends PKB([Blind{x}, UID,x]$_{mSKU}$) to the user's bank via a communications path.

The user's bank decryption program decrypts PKB ([Blind{x},UID,x]$_{mSKU}$) using the user's bank's secret key SKB, and the signature verifying program verifies the validity of the signature for authentication using the master public key of the user mPKU. If the signature is valid, the amount of money x is withdrawn from the user account. The signature generating program signs the blinded information and the amount of digital cash amount Blind(info,x), which may be created through cooperation between the user's bank and the user using any proposed blind signature scheme, using the bank's secret key SKB. The encryption program encrypts [Blind{info,x}]$_{SKB}$ using the master public key of the user mPKU and sends mPKU([BLIND{info,x}]$_{SKB}$) to the user via a communications path.

The user receives mPKU([BLIND{info,x}]$_{SKB}$), and the decryption program decrypts the information using the user's master secret key mSKU. The blind signature scheme unblinds the signed blinded information and the amount of digital cash. The user signature verifying program verifies the validity of the bank's signature using the public key of the user's bank PKB. If the signature is valid, the user stores the signed information and the amount of digital cash [info,x]$_{SKB}$ as a check in the storage device.

Figure 55:
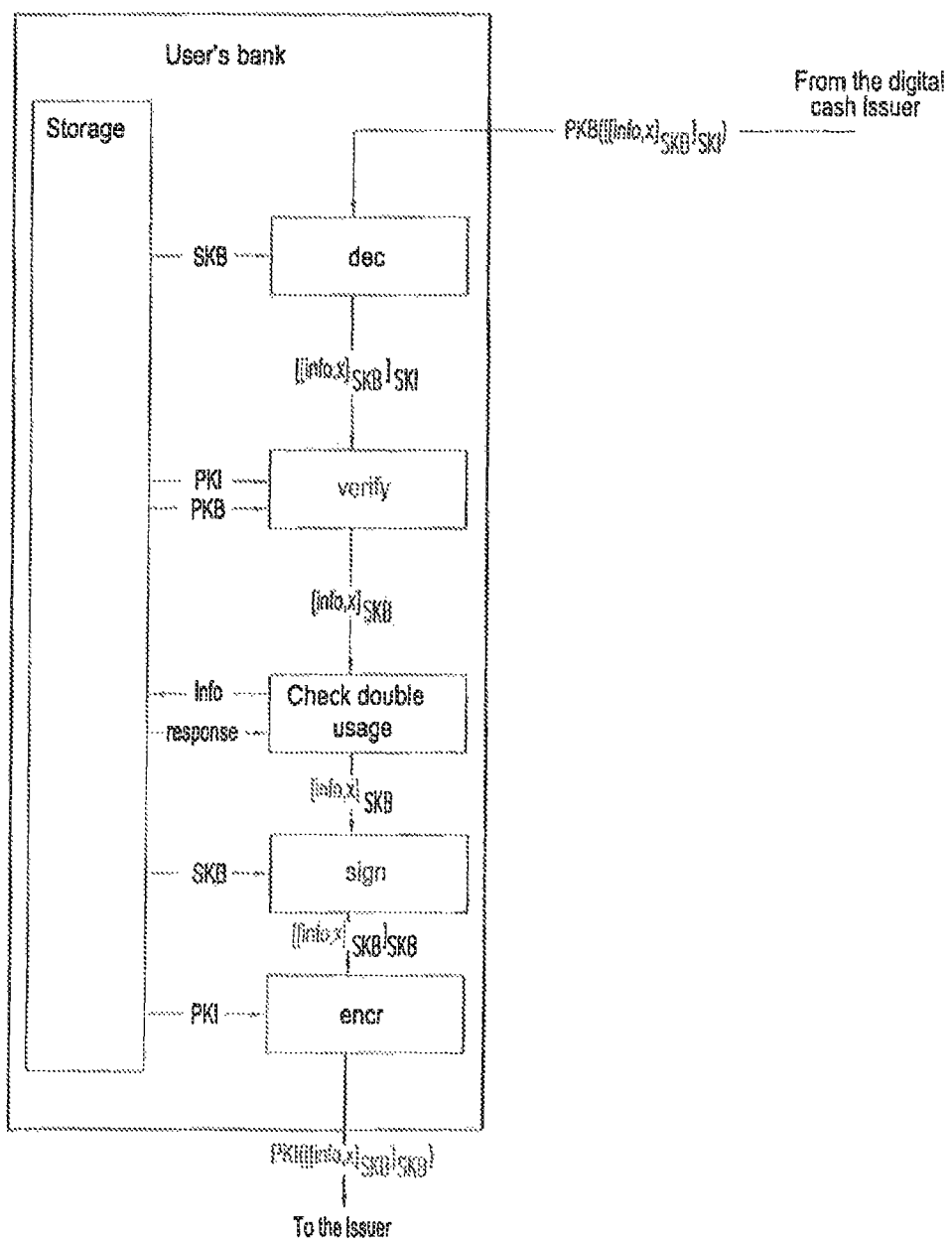
FIG. 55 is an exemplary withdrawal process part 3 according to the seventh embodiment.
Figure 56:
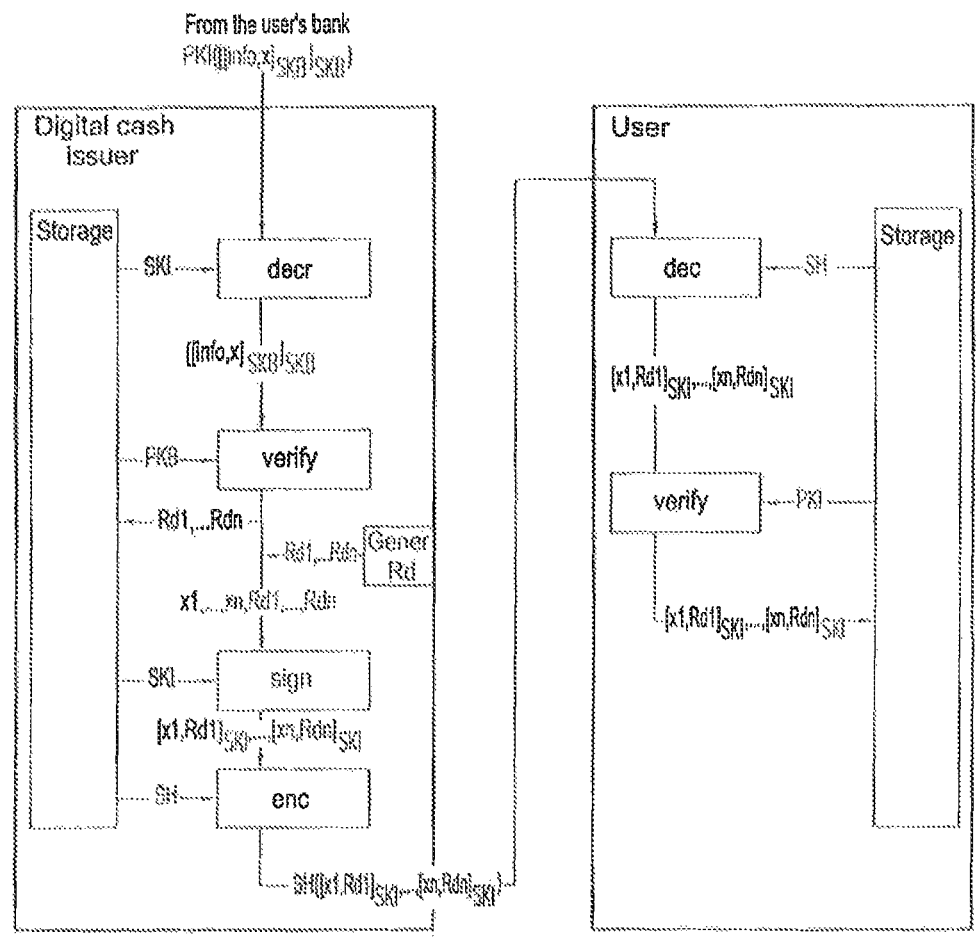
FIG. 56 is an exemplary withdrawal process part 4 according to the seventh embodiment.

Referring to FIG. 55, the user encryption program encrypts the check [info,x]SKB and a random shared secret key SH using the digital cash issuer's public key PKI, and sends the encrypted information PKI([info,x]SKB,SH) to the digital cash issuer via a communications path.

The digital cash issuer receives the encrypted information PKI([info,x]SKB,SH), and the decryption program decrypts the information using the digital cash issuer's secret key SKI. The signature generating program verifies the signature of the bank [info,x]SKB using the public key of the user's bank PKB. If the signature is valid, the digital cash issuer signature generating program signs the check [info,x]SKB using the digital cash issuer's secret key SKI. The encryption program encrypts the signed check [[info,x]SKB]SKI using the public key of the user's bank PKB, and sends the encrypted check PKB([[info,x]SKB]SKI) to the user's bank via a communications path.

Referring to FIG. 8, the user's bank receives PKB([[info, x]$_{SKB}$]$_{SKI}$), and the decryption program decrypts the information using the secret key of the user's bank. The signature verifying program verifies the signature of the digital cash issuer signature using the digital cash issuer's public key PKI.

If the signature is valid, the signature verifying program verifies the signature of the user's bank using the public key of the user's bank. If the signature is valid, the bank determines whether the check [info,x]$_{SKB}$ was used. If the check was not used, the user's bank stores the check in the storage device, and the signature generating program signs the check [info, x]$_{SKB}$ using the secret key of the user's bank SKB. The encryption program encrypts ([[info,x]$_{SKB}$]$_{SKB}$ using the digital cash issuer's public key PKI and sends PKI ([[info,x]$_{SKB}$]$_{SKB}$) to the digital cash issuer via a communications path.

Figure 57:
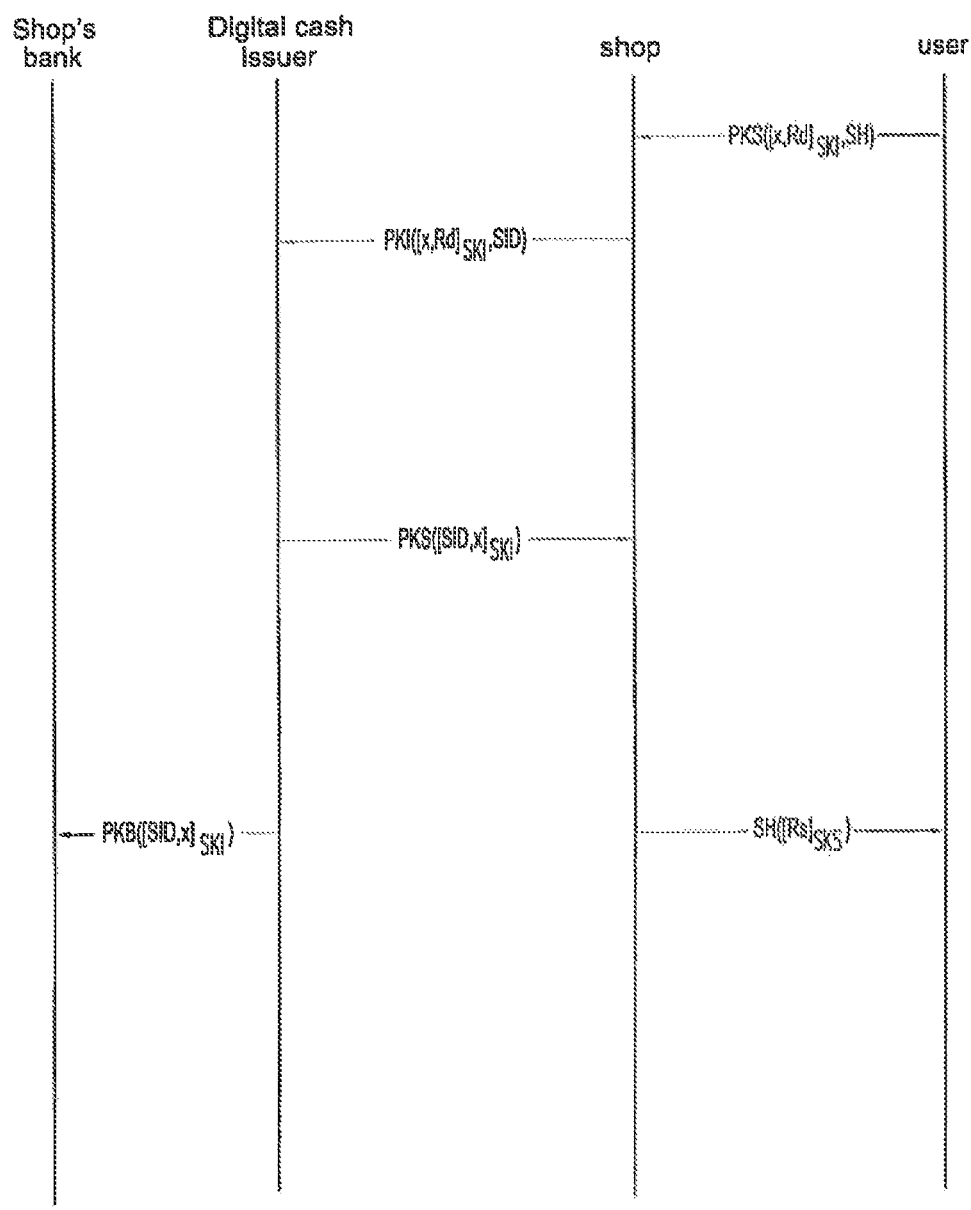
FIG. 57 is an exemplary payment protocol according to the seventh embodiment.
Figure 58:
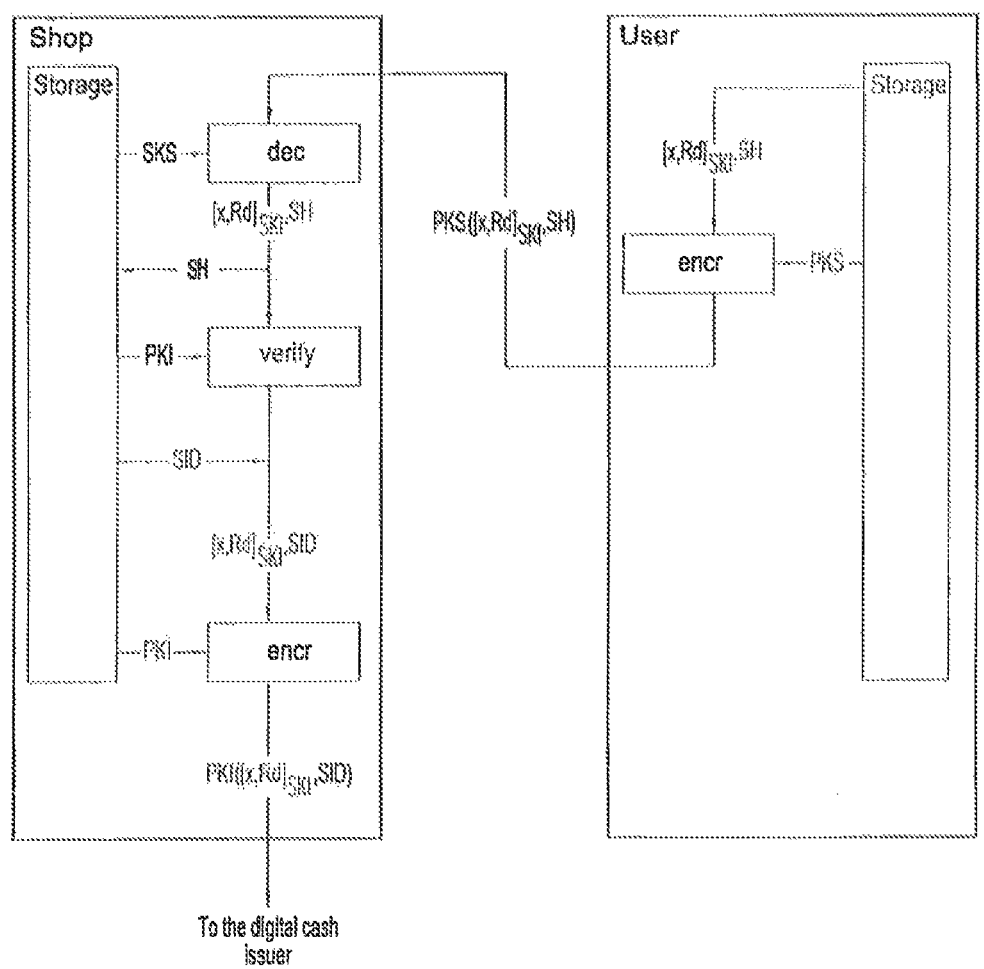
FIG. 58 is an exemplary payment process part 1 according to the seventh embodiment.
Figure 59:
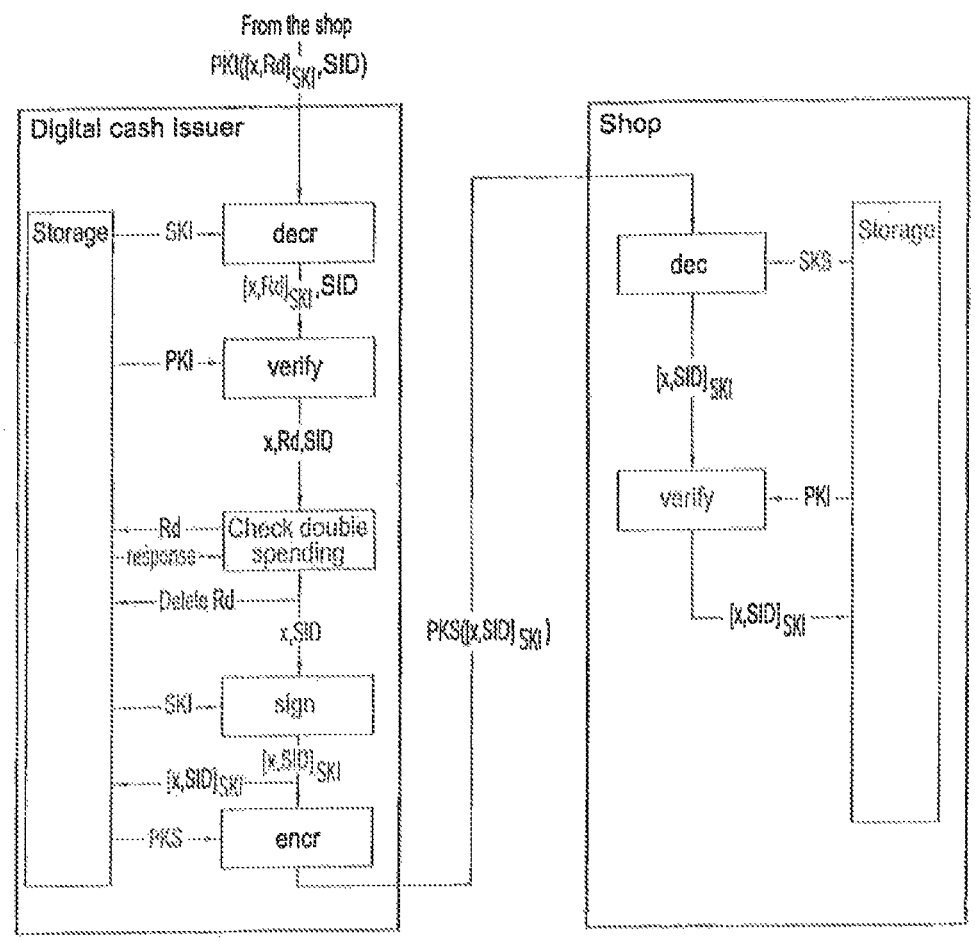
FIG. 59 is an exemplary payment process part 2 according to the seventh embodiment.
Figure 60:
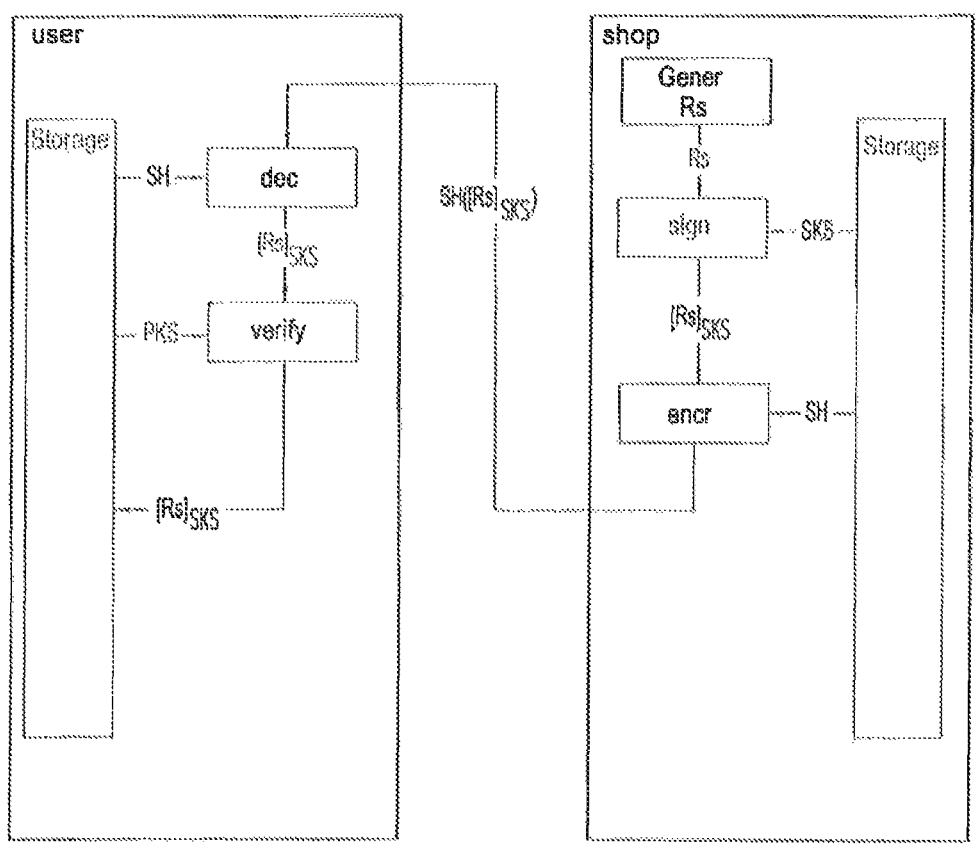
FIG. 60 is an exemplary payment process part 3 according to the seventh embodiment.

Referring to FIG. 57, the digital cash issuer receives the encrypted information PKI([[info,x]SKB]SKB), and the decryption program decrypts the information by using the digital cash issuer's secret key SKI. The signature verifying program verifies the signature of encrypted information and the check with the user's bank secret key. If the signatures are valid, the digital cash issuer divides the amount of digital cash x to several digital cash tokens. Each digital cash token includes the following information: (i) a digital cash amount, and (ii) a random number. The digital cash issuer generates random numbers Rd1, . . . , Rdn and stores them in its storage device. The signature generating program signs the digital cash amounts x1, . . . , xn, and random numbers Rd1, . . . , Rdn using the digital cash issuer's secret key SKI. The encryption program encrypts the signed digital cash tokens using the random shared secret key SH, and sends the encrypted digital cash tokens SH([x1,Rd1]SKI, . . . , [xn,Rdn]SKI) to the user.

The user receives the encrypted digital cash tokens SH([x1, Rd1]SKI, . . . , [xn,Rdn]SKI), and the decryption program decrypts the digital cash tokens using the random shared secret key SH. The signature verifying program verifies the validity of the digital cash issuer signatures using the digital cash issuer's public key PKI. If the signatures are valid, the digital cash tokens [x1,Rd1]SKI, . . . , [xn,Rdn]SKI are stored in the storage device of the user. According to this embodiment, the user may easily transfer the issued digital cash token to another user who has certified pseudonym public key.

(2) Payment Procedure

Figure 61:
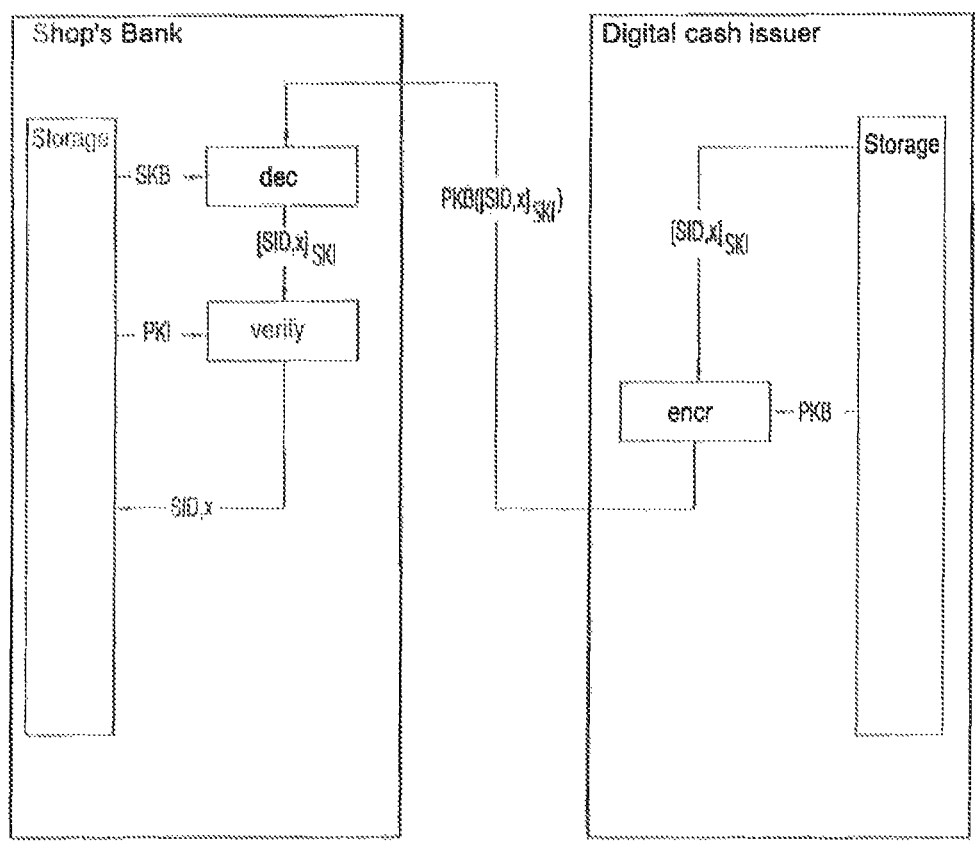
FIG. 61 is an exemplary payment process part 4 according to the seventh embodiment.

FIGS. 60-64 show the diagrammatic representation of the payment protocol. Referring to FIG. 61, the user encryption program encrypts the digital cash token [x,Rd]SKI and a random shared secret key SH using the public of the shop PKS then sends it to the shop as request for payment.

The shop decryption program decrypts the encrypted digital cash token and the random shared secret key PKS([x,Rd] SKI,SH) using the shop's secret key SKS. The signature verifying program verifies the signature of the issuer with the digital cash issuer public key PKI. If the signature is valid, the shop stores the random shared secret key temporally in its storage device, and the encryption program encrypts the digital cash token [x,Rd]SKI and the shop identification SID using the public key of the digital cash issuer PKI. The encrypted digital cash token PKI([x,Rd]SKI,SID) is then sent to the digital cash issuer via a communications path.

Referring to FIG. 62, the digital cash issuer decryption program decrypts the information PKI([x,Rd]SKI, SID) using the secret key of the digital cash issuer SKI. The signature verifying program verifies the validity of the digital cash token using the digital cash issuer's public key PKI. If the token is valid, the digital cash issuer determines whether the token has already been spent. If the token has not been spent, the random number is deleted, and the digital cash issuer signature generating program signs the shop identification SID and the amount of digital cash x with the digital cash issuer's secret key SKI. The digital cash issuer stores signed shop identification and amount [SID,x]SKI temporarily, to send it to the shop's bank, and the encryption program encrypts the information using the public key of the shop PKS. The encrypted information PKS([SID,x]SKI) is then sent to the shop via a communications path.

Referring to FIG. 63, the shop receives the encrypted information PKS([SID,x]SKI), and the decryption program decrypts the information using the secret key SKS. The signature verifying program verifies the signature with the public key of the issuer PKI. If the signature is valid, the shop random number generating program generates a random number Rs, and the signature generating program signs Rs with the shop's secret key SKS. The encryption program encrypts the signed random number [Rs]SKS using the user's random shared secret key SH, and sends SH([Rs]SKS) to the user via a communications path.

The user receives the encrypted information SH([Rs]SKS), and the decryption program decrypts the information using the random shared secret key SH. The user stores the signed random number [Rs]SKS in its storage device.

Referring to FIG. 64, the digital cash issuer retrieves the signed shop identification SID and the signed amount x to be deposited for the shop [SID,x]SKI. The encryption program encrypts the information using the public key of the shop's bank PKB, and sends the encrypted information PKB([SID, x]SKI) to the shop's bank via a communications path.

The shop's bank receives the encrypted information PKB ([SID,x]SKI), and tge decryption program decrypts the information using the secret key SKB. The signature verifying program verifies the signature with the public key of the issuer PKI. If the signature is valid, the shop's bank adds x amount of money to the shop account.

As mentioned, most of the conventional token based digital cash protocols use blind signature to protect the privacy of the user which is not efficient and is vulnerable to fraud. In addition, some offline protocols do not use blind signature but still have deficiency in privacy protection and deficiency in authentications. The protocol provided herein may be implemented in a token based digital cash system that provides: (i) strong protection of user's privacy (ii) authenticated protocol, (iii) traceability, and (iv) achieving all of these without using blind signature schemes.

The protocols described above provide strong protection of privacy for the user by separating information about the user's bank accounts identified with the real identity of the user from the information about digital cash tokens of the same user under a pseudonym by using two pairs of keys where one pair is linked to the real identity of the user, while the other pair is linked to the pseudonym identity of the user. The use of the two pair of keys allows the users to use one pair of keys for authenticating the user with an entity that holds information that is linked to the user's real identity such as a bank, and for encrypting information sent to the user by such entities. At the same time, the user can use another pair of keys to authenticate the user with an entity that holds information that is linked to the user's pseudonym identity such as an issuer of digital cash tokens, and for encrypting information sent to the user by such entities.

Because there is no link between the master public key of the user with the pseudonym public key of the same user, there is no link between the real identity of the user and the user's pseudonym. The only exception to this is a certificate authority which certifies the pseudonym public key of a user given a user's master public key and id. There is no shared information about the user between the user's bank and the issuer of digital cash tokens. The bank stores the user id and the amount of money, and the user's master pubic key as the user account information. The issuer of digital cash tokens can store the user's pseudonym public key and the digital cash tokens that are issued to the user. This separation makes it very difficult to link the real identity of the user with the user's pseudonym public key. Any leak of the private key of the bank or the issuer of digital cash tokes is useless to break the privacy of the user. Since the user's master public key is not linked to digital cash tokens and is not used for payments, the user's privacy is maintained. Therefore, strong protection is provided to maintain the user privacy without involving any blind signature scheme.

In the protocols described above, the user has two pair of keys wherein one pair represents master keys while the other pair represents pseudonym keys and wherein each public key is certified by a certifying authority using a separate certificate. Digital signatures with master keys are used for authentication with the certificate authority and the bank, wherein digital signatures with pseudonym keys are used for authentication with the issuer of digital cash tokens and the shop. Since all transactions are authenticated using digital signatures, this prevents anyone from pretending to be someone else by providing information related to the real user.

Traceability is ensured since (i) all transactions are made with certified public keys, (ii) a certifying authority can link the master public key with a pseudonym public key, and (iii) by keeping records of digital cash tokens issued to/spent by user's pseudonym public key.

A number of exemplary implementations have been described. Nevertheless, it will be understood that various modifications may be made. For example, suitable results may be achieved if the steps of described techniques are performed in a different order and/or if components in a described system, architecture, device, or circuit are combined in a different manner and/or replaced or supplemented by other components. Accordingly, other implementations are within the scope of the following claims.

What is claimed is:

1. A method of providing digital cash tokens, the method comprising:
   providing a user with at least two pairs of keys including a master pair having a private and a public key and at least a pseudonym pair having a private and public key, wherein said master pair is used to authenticate a real identity of a user, said pseudonym pair is used to authenticate a user pseudonym identity, said master pair is not linked with said pseudonym pair and said pseudonym pair is not linked with another pseudonym pair;
   registering the user known under one or more pseudonyms in a digital cash token issuer;
   blinding digital signatures based on the master pair of keys for requesting a voucher from a bank, said voucher is blinded by the user and signed by the bank after withdrawing an amount of money from a user account associated with said real identity of the user, wherein the blinding digital signatures is performed by a processing device of the user, and said voucher is usable as a proof of withdrawal of the amount of money from said bank and to request digital cash tokens from a digital cash token issuer;
   requesting said digital cash tokens using said voucher and said pseudonym pair, said voucher being sent to said bank to check that the voucher has not been used twice, said pseudonym pair is used for authentication without revealing said real identity of the user;
   issuing digital cash as digital cash tokens from a digital cash token issuer for the user using the voucher, wherein the user is known by the user pseudonym identity;
   issuing a license from a certificate authority for the pseudonym public key in response to a request that is signed by the master private key of the user; and
   spending the digital cash tokens using the pseudonym pair of keys.

2. The method of claim 1 wherein the digital cash tokens include a digital cash amount associated only with a random number both signed by a secret key of the digital cash token issuer.

3. The method of claim 1 further comprising:
   revealing the identity of the pseudonym public key by the certificate authority when there is misuse of digital cash tokens.

4. The method of claim 1 further comprising:
   associating a user identification and a certified master public key to authenticate said real identity of the user, the association known by at least the bank.

5. The method of claim 4, wherein the association is known by one or more of other users, a certificate authority, or a digital cash token issuer.

6. The method of claim 1 wherein the pseudonym is not associated with the digital cash token.

7. The method of claim 1 further comprising:
   certifying by a certificate authority the pseudonym public key of the user given a master public key and identification of the user.

8. The method of claim 7 wherein the user may transfer an issued digital cash token to another user that has a certified pseudonym public key.

9. The method of claim 1 wherein the user has one pair of master keys and a plurality of pairs of pseudonym keys and each public key is certified by a certifying authority using separate certificates.

* * * * *